(12) United States Patent
Isobe et al.

(10) Patent No.: US 6,256,047 B1
(45) Date of Patent: Jul. 3, 2001

(54) METHOD OF JUDGING HITS AND COMPUTER-READABLE STORAGE MEDIUM STORING GAME DATA

(75) Inventors: Keiichi Isobe; Teisaku Seki; Kazue Seki; Katsuya Kawarazaki, all of Tokyo; Takayuki Kobayashi, Kisai, all of (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/088,157

(22) Filed: Jun. 1, 1998

(30) Foreign Application Priority Data

Jun. 4, 1997 (JP) .................................................. 9-160671
Jun. 4, 1997 (JP) .................................................. 9-160672
Jun. 4, 1997 (JP) .................................................. 9-160673
Jun. 4, 1997 (JP) .................................................. 9-160674
Jun. 4, 1997 (JP) .................................................. 9-160675

(51) Int. Cl.⁷ .................................................. G06T 15/70
(52) U.S. Cl. .................. 345/473; 345/121; 345/123; 345/158; 345/161; 345/163; 463/1; 463/2; 463/6
(58) Field of Search ..................... 273/438; 341/20; 345/161, 158, 473, 123, 121, 163; 382/296; 463/1, 2, 6, 52, 69

(56) References Cited

U.S. PATENT DOCUMENTS

| | | | | |
|---|---|---|---|---|
| 5,405,152 | * | 4/1995 | Katanics et al. | 273/438 |
| 5,734,373 | * | 3/1998 | Rosenberg et al. | 345/161 |
| 5,872,872 | * | 2/1999 | Kajawara | 382/296 |
| 6,024,576 | * | 2/2000 | Bevert et al. | 345/158 |
| 6,061,004 | * | 5/2000 | Rosenberg | 341/20 |

* cited by examiner

Primary Examiner—Mark Zimmerman
Assistant Examiner—Kimbinh T. Nguyen
(74) Attorney, Agent, or Firm—Jordan and Hamburg LLP

(57) ABSTRACT

The invention provides a method of of judging a hit between at least two objects in a game system, the game system being adapted to display a plurality of objects on a screen such that at least one or more objects are moved on the screen in accordance with the operation performed by a player with a controller and/or such that at least on or more objects are moved on the screen by a CPU, the method being characterized in that each object comprises image information to be displayed and a plurality of areas used to judge a hit. Preferably, the plurality of areas are moved in accordance with the motion of each corresponding object.

12 Claims, 38 Drawing Sheets

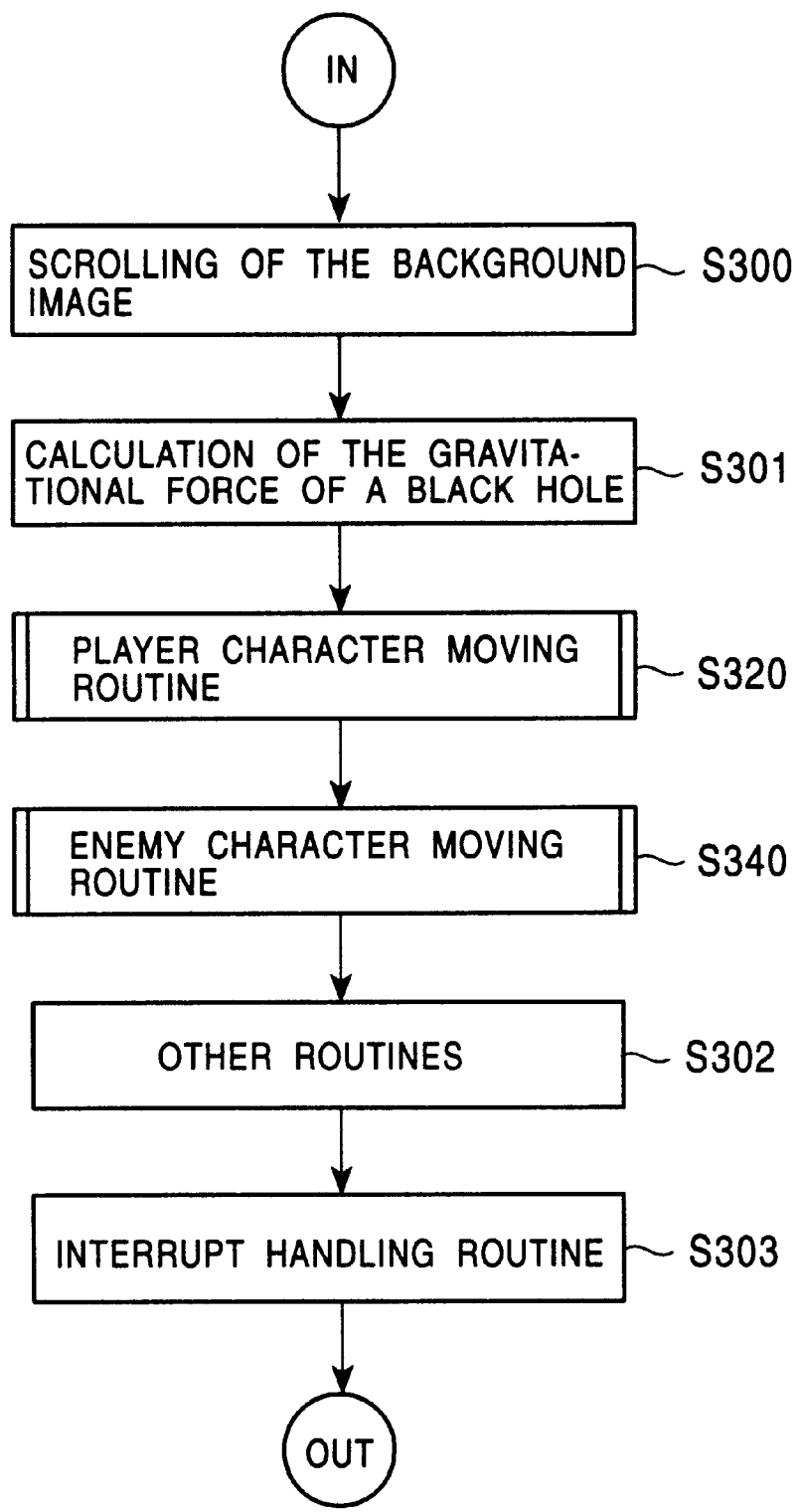

METHOD OF JUDGING HITS AND COMPUTER-READABLE STORAGE MEDIUM STORING GAME DATA

BACKGROUND OF THE INVENTION

1. Field of the Invention

The present invention relates to a method of judging a hit, suitable for use in a game system using a cassette-type storage medium including an optical disk, a magnetic disk, or a semiconductor memory storing program data, and also to a computer-readable storage medium storing game data.

2. Description of the Related Art

A great number of game systems have been proposed. They include a home system consisting of a game machine combined with a television monitor, a game machine for use in an amusement arcade, a system consisting of a personal computer or a work station, a display, and an audio output device, etc. In any case, the system includes a controller used by a player to play a game, a storage medium storing game program data, a CPU for controlling the system to generate sounds and images in accordance with the game program data, a processor for generating images, a processor for generating sounds, a CRT for displaying the images, and a loudspeaker for outputting the sounds. As for the storage medium, a CD-ROM, a semiconductor memory, and a cassette including a semiconductor memory are widely used.

One of popular games using such a system is a shooting game. In the shooting game, a player operates a controller so as to move a character (hereinafter referred to as a player character) in a game space and shoot a bullet or a laser beam from the player character toward a character (enemy character) operated by a CPU. If a bullet or a laser beam hits an enemy character, that enemy character disappears from the game scene and the player gets a score. In such a shooting game, it is known to scroll the player character either in a vertical direction or in a horizontal direction. The shooting game usually includes a plurality of events called stages. At each stage, the player is expected to eliminate all enemy characters appearing at that stage while avoiding the player character from being hit by bullets or laser beams shot by enemy characters. In many shooting games, the player character is allowed to be shot by enemies as many times as n. However, if the player character is shot n+1 times, the game is over.

As described above, the shooting game is a simple game in which a player character is operated so as to delete enemy characters. Although an extremely great number of shooting games are proposed by various game software vendors, they are similar to each other and are not very attractive.

In view of the above, it is an object of the present invention to provide a computer-readable storage medium storing program data of an attractive game.

SUMMARY OF THE INVENTION

According to an aspect of the present invention, there is provided a method of judging a hit between at least two objects in a game system, said game system being adapted to display a plurality of objects on a screen such that at least one or more objects are moved on the screen in accordance with the operation performed by a player with a controller and/or such that at least on or more objects are moved on the screen by a CPU, said method being characterized in that each said object comprises image information to be displayed and a plurality of areas used to judge a hit.

Preferably, the plurality of areas are moved in accordance with the motion of each corresponding object.

According to another aspect of the present invention, there is provided a computer-readable storage medium storing data of a game in which a plurality of objects are displayed on a screen such that at least one or more objects are moved on the screen in accordance with the operation performed by a player with a controller and/or such that at least on or more objects are moved on the screen by a CPU, and a hit between at least two objects is judged, said computer-readable storage medium being characterized in that each said object in the game data comprises image information to be displayed and a plurality of areas used to judge a hit.

In this computer-readable storage medium, the plurality of areas are preferably moved in accordance with the motion of each corresponding object.

According to another aspect of the present invention, there is provided a method of judging a hit in a game system including a game space in which there are a plurality of objects each having a predefined outer shape, each said object being adapted to move in accordance with a command input by a player via operating means and/or in accordance with a command given by motion control means, said method being adapted to judge a hit by detecting a contact or an overlap between the outer shapes of at least two objects of said plurality of objects in the game space, said method being characterized in that: an area is provided in each said object in addition to the outer shape, said area serving as an area used to detect the contact or overlap between the outer shapes; and a contact or an overlap between the outer shapes of the objects is detected by detecting an overlap between said areas.

In this method, a plurality of said areas may be provided in each said object, and a contact or an overlap between the outer shapes of the objects may be detected by detecting an overlap between any of the plurality of areas of an object and any of the plurality of areas of another object.

Preferably, the area of each object is set to be smaller than the outer shape of the corresponding object.

The areas of each object may be defined in accordance with the outer shape of the corresponding object.

Preferably, the area moves in accordance with the motion of the corresponding object in the game space.

The outer shape of each object can be varied in the game space, and the size of said area is varied in accordance with the variation of the outer shape of the corresponding object.

According to still another aspect of the invention there is provided a game system comprising object storing means for storing a plurality of objects each having a predefined outer shape; operating means for receiving a command given by a player and outputting a command signal corresponding to the command given by the player; and motion control means for moving said objects in the game space in accordance with said command signal and/or in accordance with a predetermined procedure, said game system being characterized in that it further comprises: area storing means for storing an area assigned to each said object in addition to the outer shape, said area serving as an area used to detect the contact or overlap between the outer shapes; and hit judgement means for detecting a contact or an overlap between the outer shapes of the objects by detecting an overlap between said areas. In this game system, a plurality of said areas may be provided in each said object; and said hit judgment means may detect a contact or an overlap between the outer shapes of the objects by detecting an overlap between any of the plurality of areas of an object and any of the plurality of areas of another object.

The area of each object is preferably smaller than the outer shape of the corresponding object.

The areas of each object may be defined in accordance with the outer shape of the corresponding object.

The game system may further include area motion control means for moving the area in accordance with the motion of the corresponding object in the game space.

The game system may further include outer shape control means for varying the outer shape of each object in the game space in accordance with a predetermined procedure; and area varying means for varying the size of said area in accordance with the variation in the outer shape of the corresponding object.

According to still another aspect of the invention, there is provided a computer-readable storage medium storing a game program used in a game system in which a plurality of objects each having a predetermined outer shape are provided in a game space, said plurality of objects are moved within the game space in accordance with a command given by a player and/or in accordance with a command given by motion control means, and a contact or an overlap in the game space between at least two objects of the plurality of objects is detected, said computer-readable storage medium being characterized in that: wherein when said game program is read into a computer and executed by the computer, said game program forces the computer to perform the process including the steps of: providing an area in each said object in addition to the outer shape, said area serving as an area used to detect the contact or overlap between the outer shapes; and detecting a contact or an overlap between the outer shapes of the objects by detecting an overlap between said areas.

According to still another aspect of the invention, there is provided a method of representing refraction of light, characterized in that a light ray, which travels along a straight path and/or which can bend, is drawn on a screen in such a manner that bending of the light ray is represented by means of drawing only when the light ray is incident on a particular object of those objects drawn on the screen.

According to still another aspect of the invention, there is provided a computer-readable storage medium storing a game program wherein a light ray, which travels along a straight path and/or which can bend, is drawn on a screen in such a manner that bending of the light ray is represented by means of drawing only when the light ray is incident on a particular object of those objects drawn on the screen. According to still another aspect of the invention, there is provided a method of representing refraction of light, said method being applied to a game system in which predefined objects are displayed in a game scene and a line representing a light ray is also displayed in the game scene, said method comprising the steps of: defining whether each object behaves as a refractor; and when a light ray is drawn in the game scene, if the light ray passes through any of objects defined as refractors, representing the light ray such that it is refracted by said object.

According to another aspect of the invention, there is provided a game system comprising: object displaying means for displaying a predefined object in a game scene; and light ray displaying means for displaying a line representing a light ray in the game scene, said game system being characterized in that it further comprises: refraction display memory means for storing data defining whether each object behaves as a refractor, wherein said light ray displaying means includes refraction displaying means for displaying a light ray in such a manner that when the light ray is drawn in the game scene, if the light ray passes through any of objects defined as refractors, the light ray is represented such that it is refracted by said object. According to another aspect of the invention, there is provided a computer-readable storage medium storing a game program used in a game system in which predefined objects are displayed in a game scene and a line representing a light ray is also displayed in the game scene, wherein when said game program is loaded into a computer and executed by the computer, said game program forces the computer to perform the process including the steps of: defining whether each object behaves as a refractor; and when a light ray is drawn in the game scene, if the light ray passes through any of objects defined as refractors, representing the light ray such that it is refracted by said object. According to still another aspect of the invention, there is provided a method of representing the motion of an object for use in a game system in which a character is moved in a fixed direction on a screen in response to the operation performed by a player with a controller, and a background image displayed on the screen is successively varied by means of scrolling, said method being characterized in that: an object is displayed such that said object extends in a direction parallel to the scrolling direction and the shape of said object is varied at fixed or varying intervals of time. According to still another aspect of the invention, there is provided a computer-readable storage medium storing a game program in which a character is moved in a fixed direction on a screen in response to the operation performed by a player with a controller, and a background image displayed on the screen is successively varied by means of scrolling, wherein an object is displayed such that said object extends in a direction parallel to the scrolling direction and the shape of said object is varied at fixed or varying intervals of time. According still another aspect of the invention, there is provided a method of displaying an object having a predefined contour on a game screen, said method including the steps of: defining a sequence of points along the contour of said object, connection among said points being defined; and displaying the sequence of points on the game screen in such a manner that the respective points constituting said sequence of points are displayed at arbitrary locations.

According to still another aspect of the invention, there is provided a game system including object displaying means for displaying an object having a predefined contour on a game screen, said game system further including storage means for storing a sequence of points disposed along the contour of said object, connection among said points being defined, wherein said object displaying means displays the sequence of points on the game screen in such a manner that the respective points constituting said sequence of points are displayed at arbitrary locations. According to still another aspect of the invention, there is provided a computer-readable storage medium storing a game program in which an object having a predefined contour is displayed on a game screen, said storage medium being characterized in that: wherein when said game program is read into a computer and executed by the computer, said game program forces the computer to perform the process including the steps of: defining a sequence of points along the contour of said object, connection among said points being defined; and displaying the sequence of points on the game screen in such a manner that the respective points constituting said sequence of points are displayed at arbitrary locations.

According to still another aspect of the invention, there is provided a method of representing a gravitational force for use in a game system in which a character is moved in a fixed direction on a screen in response to the operation performed by a player with a controller, and a background image displayed on the screen is successively varied by means of scrolling, said method being characterized in that: a pseudo gravitational force is predefined and the effects of said gravitational force are displayed on the game screen.

According to still another aspect of the invention, there is provided a computer-readable storage medium storing a game program for use in a game system in which a character is moved in a fixed direction on a screen in response to the operation performed by a player with a controller, and a background image displayed on the screen is successively varied by means of scrolling, wherein a pseudo gravitational force is predefined and the effects of said gravitational force are displayed on the game screen.

According to still another aspect of the invention, there is provided a game system including: operating means for receiving a command given by a player and outputting a command signal corresponding to the command given by the player; and display control means for displaying a character on the game screen in such a manner that said character moves in a virtual game space in accordance with said command signal and/or in accordance with a predetermined procedure, said game system further including:
attractive force location storing means for storing the location in the game space at which a virtual attractive force is generated, wherein
said display control means displays the character on the game screen in such a manner that the character is affected by the attractive force generated at said attractive force generating location.

According to still another aspect of the invention, there is provided a computer-readable storage medium storing a game program in which a character is displayed on a game screen in such a manner that said character moves in a virtual gave space in response to a command given by a player and/or in accordance with a predetermined procedure, wherein when said game program is read into a computer and executed by the computer, said game program forces the computer to perform the process including the steps of: defining an attractive force generating location in the game space at which a virtual attractive force is generated; displaying said character on the game screen so that said character is affected by the attractive force generated at said attractive force generating location.

According to still another aspect of the invention, there is provided a method of displaying a selected icon, characterized in that when an icon is selected with a pointing device, said icon is moved to a predetermined location on the screen at a visually perceptive speed and said icon is displayed with a higher priority than that assigned to other icons present at said predetermined location.

According to still another aspect of the invention, there is provided a computer-readable storage medium storing a game program in which when player obtains a particular item in a game space by operating a player character with a controller, the ability of the character in the game space is increased depending on the number of particular items obtained, wherein there is provided an edit screen on which the relationship between the number of particular items and the ability obtained can be modified, and the modified relationship between the number of particular items and the ability obtained is reflected in the game.

According to still another aspect of the invention, there is provided a game system including: operating means for receiving a command given by a player and outputting a command signal corresponding to the command given by the player; display control means for displaying a player character in such a manner that the player character moves in accordance with said command signal; and item processing means for making the player character obtain an item depending on the location of the player character on the game screen and changing the ability of said player character depending on the number of said items obtained, said game system further including: item-and-ability display control means for displaying the relationship between the number of items obtained and the ability added to the player character in such a manner that the player can visually recognize the relationship. and item-ability setting means for modifying the relationship between the number of items obtained and the ability added to the player character in accordance with the command signal given by the player, said relationship being displayed by said item-and-ability display control means.

BRIEF DESCRIPTION OF THE DRAWINGS

FIG. 23 is a flow chart illustrating the horizontal gravitational force reprentating routine;

DESCRIPTION OF THE PREFERRED EMBODIMENTS

Preferred embodiments of the present invention are described below referring to FIGS. 1 to 38. The outline of the description is shown below:

A. Construction of Game System (FIG. 1)
B. Functions of CPU 51 shown in FIG. 1
C. Process in Main Routine (FIG. 3)
* Hit Judgement
D. Concept of Hit Judgement (FIG. 4)
E. Process in Hit Judgement Routine
* Refraction Process
F. Concept of Refraction Process
G. Refraction Processing Routine (FIG. 12–14)
* Change of Ground Shape
H. Concept of Changing Ground Shape
I. Process in Ground Shape Changing Routine (FIGS. 16–21)
* Representation of Gravitational Force in a Horizontal Direction
J. Concept of Representation of Gravitational Force in the Horizontal Direction (FIG. 22)
K. Process in Horizontal Gravitational Representation Routine
* Gauge Edit
L. Concept of Gauge Edit (FIGS. 27–29)
M. Process ion Gauge Edit Routine (FIGS. 30–38)
A. Construction of Game System (FIG. 1)

Figure 1:
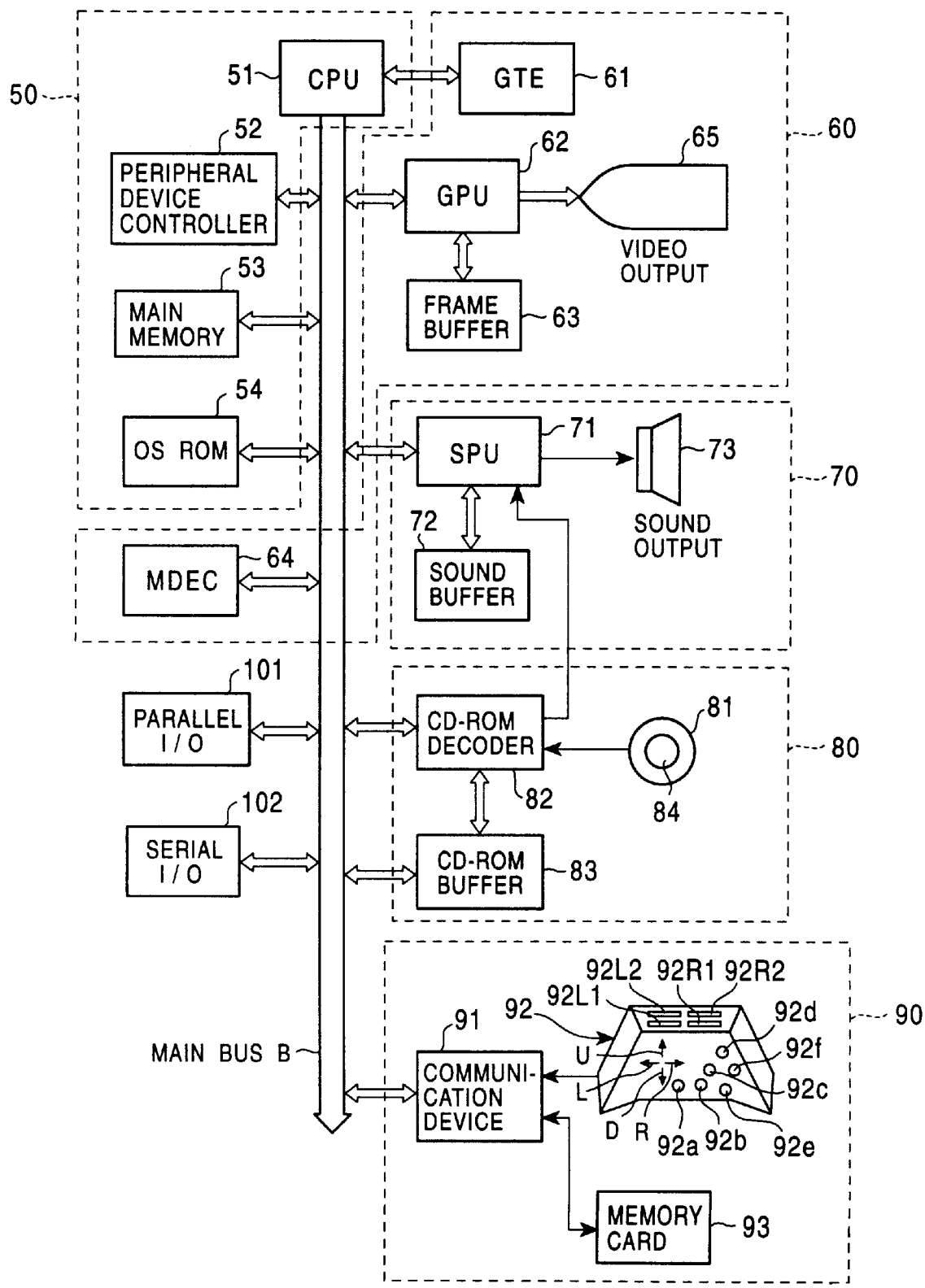
FIG. 1 is a schematic diagram illustrating the construction of a game system according to an embodiment of the invention.

FIG. 1 is a schematic diagram illustrating the construction of a game system according to an embodiment of the invention.

In the game system according to this embodiment, like the game system disclosed in Japanese Patent Laid-Open No. 8-212377, game program data is read from an optical disk such as a CD-ROM and is executed. An example of the construction of the game system is shown in FIG. 1.

As shown in FIG. 1, the game system of the preset embodiment includes: a main memory 5 for storing 3-dimensional image data read from a CD-ROM 84; a frame buffer 63 for storing a color information table, texture pattern information, and semi-transparency designating data, which are designated for each polygon; a geometry transfer engine (GTE) 61 serving as coordinate conversion means for performing perspective conversion on 3-dimensional image data read from the CD-ROM 84 via a disk drive 81 thereby converting the 3-dimensional image data to 2-dimensional image data ; a CPU 51 serving as drawing command generating means for generating drawing a command by combining the 2-dimensional image data and the data designating the characteristic of the polygon into the packet form for each polygon; a graphics processing unit (GPU) 62 for drawing 2-dimensional image in the memory space of the frame buffer 63 in accordance with the characteristic data designated by the drawing command; and video output means 65 for reading 2-dimensional image data from the frame buffer 63 in synchronization with the TV sync signal.

More specifically, the image processing system of the embodiment includes a main controller module 50 composed of a central processing unit (CPU) 51 and its peripheral devices (including a peripheral device controller 52), a graphic module 60 composed substantially of a graphic processing unit (GPU) 62 for drawing an image on a frame buffer 63, a sound module 70 composed of a sound processing unit (SPU) 71 and other devices for generating a music or effect sound, an optical disk controller module 80 for controlling an optical (CD-ROM) disk drive 81 serving as auxiliary storage means and decoding of reproduced data, a communications controller module 90 for controlling the operation of inputting a command given by a user via a controller 92 and also controlling the operation of inputting and outputting data representing a game setting parameter from an auxiliary memory (memory card) 93, and a main bus B for connecting the above-described elements such as the main control module 50 and the communications controller module 90.

The main controller module 50 comprises: the CPU 51; the peripheral device controller 52 for controlling an interrupt, timing, memory operations, and data transferring operation by means of direct memory access; main memory 53 including for example a 2-Mbyte RAM; and a ROM 54 with the memory capacity of for example 512 Kbytes storing a program such as an operating system for managing the main memory 53, the graphic module 60, and the sound module 70.

The CPU 51 may be a 32-bit reduced instruction set computer (RISC) for controlling the entire system by executing the operating system stored in the ROM 54. The CPU 51 also includes a command cache and a scratch pad memory for managing real storage spaces.

The graphic module 60 comprises the main memory 53 for temporarily storing the data read from the CD-ROM 84, a GTE 61 consisting of a coordinate calculation coprocessor for performing a coordinate transformation on the data stored in the main memory 53, the GPU 62 for drawing an image in response to a drawing command given by the CPU 51, the frame buffer 63 having the memory capacity of for example 1 Mbytes for storing graphic data generated by the GPU 62, and an image decoder 64 (hereinafter referred to as an MDEC) for decoding image data compressed and encoded by an orthogonal transform process such as discrete cosine transformation.

The GTE 61 has a parallel calculation mechanism for performing a plurality of arithmetic operations in parallel and acts as a coprocessor operating in conjunction with the CPU 51 to perform operations, at a high speed, such as a coordinate transformation, a calculation of light source by means of calculating a scalar product of a normal vector and a light source vector, and a calculation of a vector or a matrix including fixed-point elements.

More specifically, the GTE 61 is capable of calculating the coordinates of up to 1.5 million polygons per second in the flat shading calculation wherein each triangle polygon is drawn in one single color. That is, in this image processing system, the load to the CPU 51 is minimized and thus the system is capable of performing the coordinate calculations at a very high speed. Herein, the term "polygon" refers to a minimum graphical unit in the form of a polygon such as a triangle or a quadrangle used to construct a 3-dimensional object displayed on a screen.

The GPU 62 operates in accordance with a polygon drawing command given by the CPU 51 to draw polygons into the frame buffer 63. The GPU 62 can draw up to 360,000 polygons per second. The GPU 62 has a 2-dimensional address space independent of that of the CPU 51 wherein the frame buffer 63 is mapped into the 2-dimensional address space.

The frame buffer 63 comprises a so-called dual port RAM which can perform at the same time an operation of writing drawing data from the GPU 62 or data transferred from the main memory 53 and an operation of reading data to be displayed. The frame buffer 63 has a memory size of for example 1 Mbytes wherein each frame is dealt with as a matrix including 1024×512 pixels each represented by 16-bit data. Any desired area in the frame buffer 63 can be displayed on video output means such as a display device 65. In addition to the displaying area output as a video output, the frame buffer 63 includes a second area, that is, a CLUT (color lookup table) area for storing a color lookup table which is used by the GPU 62 as a reference in the operation of drawing polygons, and also includes a first storage area serving as a texture area for storing texture data which is interposed (mapped) into an image consisting of polygons generated and converted in coordinates by the GPU 62. Both the CLUT and texture areas can be dynamically varied depending on a change in the display area. That is, the frame buffer 63 can access the area being displayed thereby interposing a texture in the area displayed. The frame buffer 63 also has the capability of performing data transfer to and from the main memory 53 at a high speed by means of a high-speed DMA transfer operation.

The GPU 62 can also perform, in addition to the flat shading, Gouraud shading in which the color of the inside of a polygon is determined by interpolation of colors at vertices. Furthermore, the GPU can perform texture mapping in which a texture stored in the texture area is pasted to a polygon.

In the Gouraud shading or texture mapping, the GTE 61 can calculates coordinates of up to 500,000 polygons per second.

Under the control of the CPU 51, the MDEC 64 decodes a still or motion image data read from the CD-ROM 84 and stored in the main memory 53 and subsequently stores the decoded data again in the main memory 53. More particularly, the MDEC 64 performs an inverse discrete cosine transforming operation (referred to as IDCT) at a high speed thereby expanding compressed data according to the color still image compression standard (known as JPEG) or the motion image according to the motion picture encoding standard (known as MPEG, wherein only intraframe compression is performed in this embodiment).

The image data reproduced can be stored via the GPU 62 in the frame buffer 63 so that the image data can be used by the GPU 62 to draw a background image.

The sound module 70 comprises the sound processor unit (SPU) 71 responsive to a command from the CPU 51 for generating a music or effect sound, a sound buffer 72 having a memory capacity of for example 512 Kbytes for storing audio data of voice or music sound read from the CD-ROM 84, and a loudspeaker 73 acting as sound output means for outputting a music or effect sound generated by the SPU 71.

The SPU 71 has the capability of decoding adaptive differential pulse code modulation (ADPCM) data produced by converting 16-bit sound data into 4-bit difference data, thereby reproducing audio data. The SPU 71 also has the capability of reproducing the sound source data stored in the sound buffer 72 thereby generating a music or effect sound. Furthermore, the SPU 71 has the capability of modulating the audio data stored in the sound buffer 72 in the operation of reproducing the audio data. More specifically, the SPU 71 has an ADPCM sound source with 24 voices in which operating parameters of looping and time coefficients are automatically modified and which operated under the control of the CPU 51. The SPU 71 manages the particular address space in which the sound buffer 72 is mapped and reproduces audio data by transferring ADPCM data including information about key-on/key-off or modulation directly to the sound buffer 72 from the CPU 51. Accordingly, the sound module 70 can be used as a sampling sound source for generating a music or effect sound corresponding to the audio data stored in the sound buffer 72, under the control of the CPU 51.

The optical disk controller module 80 comprises the disk drive 81 for reading a program or data from the optical disk of CD-ROM, a decoder 82 for decoding the program and data including additional data such as an error correction code (ECC), and a buffer 83 having a memory capacity of for example 32 Kbytes for temporarily storing data read via the disk drive 81. That is, the optical disk controller module 80 comprises the disk drive 81, the decoder 82, and other components required for reading data from a disk. In this specific embodiment, the data is stored on the disk in the format such as CD-DA and CD-ROM/XA. The decoder 82 also serves as a member of the sound module 70.

The audio data stored on the disk and reproduced via the disk drive 81 is not limited to data in the ADPCM format (such as CD-ROM/XA) described above, but may be of a PCM data produced by performing analog-to-digital conversion on an audio signal. The ADPCM data generated by converting 16-bit data to 4-bit difference data and stored on the disk is first subjected to error correction and decoding in the decoder 82. The resultant data is then supplied to the SPU 71 and subjected to digital-to-analog conversion. The data is finally supplied to the loud speaker 73 for playback. In the case of PCM data recorded in the 16-bit digital form, the data is first decoded by the decoder 82 and then supplied to the loudspeaker 73. The audio output of the decoder 82 is first applied to the SPU 71 in which it is mixed with the SPU output, and then is passed through a reverberation unit to obtain audio output data in the final form.

The communications controller module 90 comprises a communications controller device 91 for controlling communications over the main bus B with the CPU 51, the controller 92 used by a player to input commands, and the memory card 93 for storing game setting data.

The controller 92 is an interface for transmitting instructions of the player to the application software and includes various command keys pressed by the player to input commands, as described later. Under the control of the communications control device 91, data representing the status of command keys is transmitted to the communications controller device 91 in a synchronous mode at a rate of 60 times per second. The communications controller device 91 then transmits the data representing the status of the command keys to the CPU 51. The controller 92 has two connectors disposed thereon. A great number of controllers may b e connected via the multi-tap ports. Thus, if a command is given by the player, the CPU 51 performs an operation according to the given command and also according to the game program being executed.

The command keys of the controller 92 are described below. The controller 92 comprises cross keys including a left key L, a right key R, an upper key U, and a lower key D; a first left button 92L1, a second left button 92L2, a first right button 92R1, a second right button 92R2, a start button 92a, a select button 92b, a first button 92c, a second button 92d, a third button 92e, and a fourth button 92f. The cross keys are used by the player to enter upper, lower, left, and right commands into the CPU 51. The start button 92a is used to command the CPU 51 to start the game program which has been read from the CD-ROM 84. The select button 92b is used to command the CPU 51 to perform various selection in terms of the game program read from the CD-ROM disk.

When it is desired to store the data in terms of the setting of a game being played, or it is desired to store the result of the game at the end of the game or in the middle of the game, the CPU 51 sends the data to be stored to the communications controller device 91 which in turn stores the data into the memory card 93. The memory card 93 is connected indirectly to the main bus B so that it can freely be installed or removed when the electric power is supplied to the system. This allows the data associated with the game setting to be stored in a plurality of memory cards 93.

The system of this embodiment of the present invention is also provided with a 16-bit parallel input-output (I/O) port 101 and an asynchronous serial input-output (I/O) port 102. The system can be connected via the parallel I/O port 101 to any other peripheral device and via the serial I/O port 102 to another video game machine for the purpose of communications.

Among the main memory 53, the GPU 62, the MDEC 64, and the decoder 82, it is required to transfer at a high speed a great amount of image data in the operation of reading a program and displaying an image. To meet the above requirement, the image processing system of this embodiment is thus adapted to perform direct data transfer or DMA transfer among the main memory 53, the GPU 62, the MOEC 64, and the decoder 82 under the control of the peripheral device controller 52 without using the CPU 51. As a result, the load to the CPU 51 during the data transfer is considerably reduced, thus ensuring high-speed data transfer operations.

In this video game machine of the present invention, when electric power is turned on, the CPU 51 executes the operating system stored in the ROM 54. Through the execution of the operating system, the CPU 51 initializes the entire machine while confirming that each part has no failure. After that, the CPU 51 executes the game program stored on the optical disk via the optical disk controller 80. During the execution of the game program, the CPU 51 controls the graphic module 60 and the sound module 70 in accordance with the command given by the player thereby displaying an image and generating music or effect sounds.

The operation of displaying an image in the image processing system according the present embodiment is described below.

Figure 3:
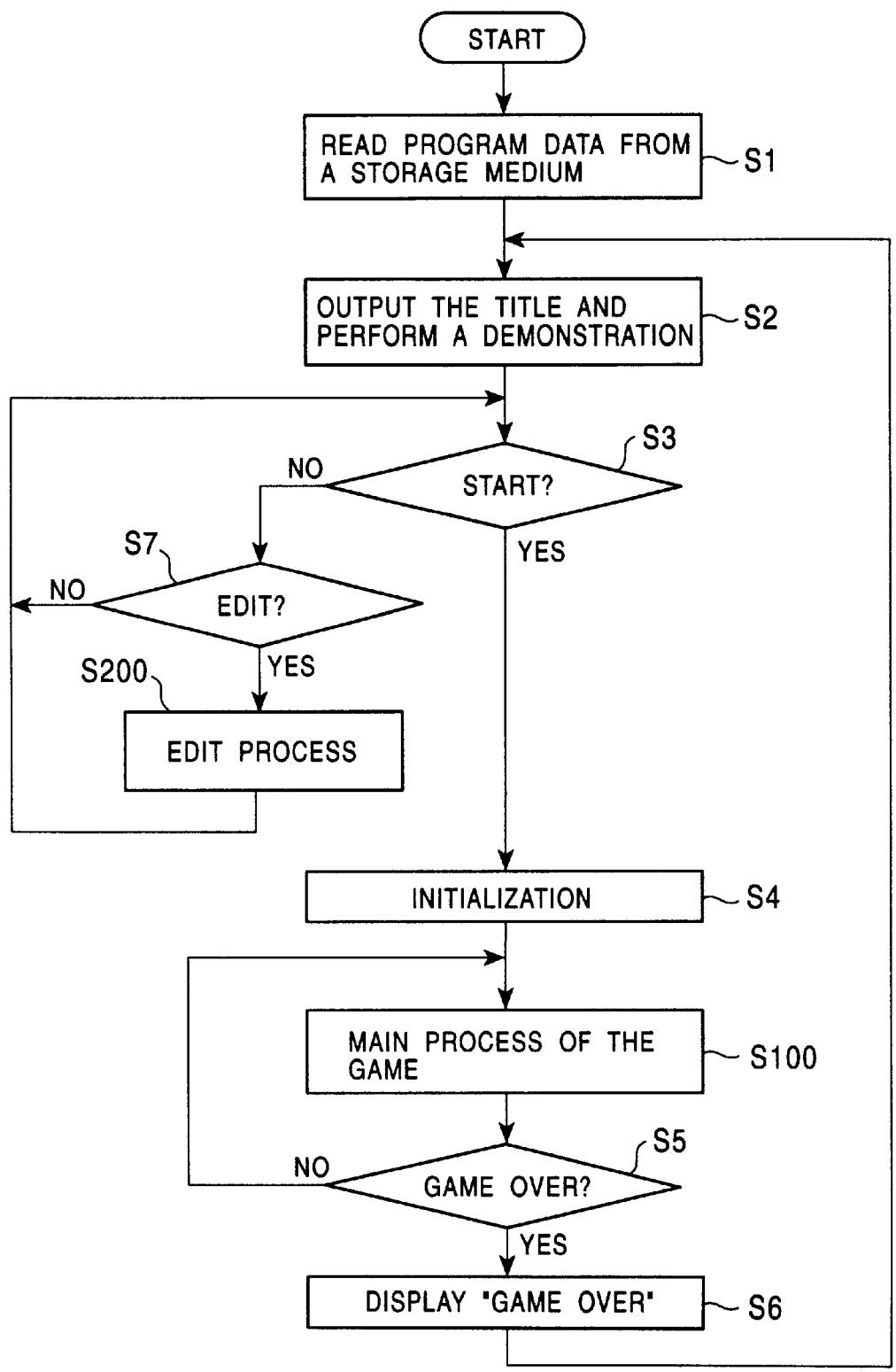
FIG. 3 is a flow chart illustrating the operation in the main routine.

The GPU 62 displays the contents of an arbitrary rectangular area of the frame buffer 63 directly on the display device such as a CRT of the video output means 65/ Hereinafter, such an area is referred to as a display area. The rectangular area can be varied in size in accordance with the operation mode selected. In mode 0, for example, the rectangular area has a size of 256 (H)×240 (V) (non-interlaced). On the other hand, in mode 9, the area has a size of 384 (H)×480 (V) (interlaced). This means that it is possible to designate the display start and end positions independently for both horizontal and vertical directions. The size or the number of pixels of the display screen is variable and both the locations of display starting and end (expressed by (DTX.DTY) and (DBX.DBY) respectively on a coordinate plane) can separately be determined in the horizontal direction and the vertical direction respectively, as shown in FIG. 3. The relation between a range of applicable values in the coordinate and the display mode is as follows. The allowed ranges of the horizontal coordinate are 0 to 276 (the display start position in the horizontal direction) and 4 to 280 (the display end position in the horizontal direction) in modes 0 and 4, and 0 to 396 (the display start position in the horizontal direction) and 4 to 400 (the display end position in the horizontal direction) in modes 8 and 9, respectively. The allowed ranges of the vertical coordinate are 0 to 240 (the display start position in the vertical direction) in modes 0 to 3 and 8, and 4 to 484 (the display end position in the vertical direction) in modes 4 to 7 and 9. It is required to select the display start and end positions in the horizontal direction such that they are multiples of 4. The minimum size of the display screen is 4 pixels×2 pixels (non-interlaced) or 4 pixels×4 pixels (interlaced).

Furthermore, the GPU 62 supports two display color modes: 16-bit direct mode (32758 colors) and 24-bit direct mode (full color). In the 16-bit direct mode (hereinafter referred to as a 16-bit mode), 32768 colors are available. Although the 16-bit mode has a limitation in the number of colors compared with the 24-bit direct mode (hereinafter referred to as a 24-bit mode), it is possible to display pseudo full colors because the calculation by the CPU 62 is performed with 24 bits and because the halftone can be represented by means of dithering. In the 24-bit mode, 16,777, 216 colors (full color) are available. Only the image data transferred into the frame buffer 63 can be displayed, and the drawing capability of CPU 62 cannot be utilized. The maximum data length per pixel is 24 bits. However, to designate the location in the frame buffer, it is required to employ 16-bit data. 24-bit image data of 640×480 is treated as 960×480 in the frame butler 63. Furthermore, the coordinate of the display end position in the horizontal direction should be multiples of 8. Accordingly, the minimum display size in the 24-bit mode is 8 pixels in horizontal by 2 pixels in vertical.

The GPU 62 has the following drawing capabilities: polygon or sprite drawing capability for generating sprites ranging from 1×1 dots to 256×256 dots in a 4-bit CLUT mode (4-bit format with 16 colors per sprite), 8-bit GLUT mode (8-bitformat with 256 colorsper sprite), and 16-bit GLUT mode (16-bit format with 32768 colors per sprite); fllat shading capability for drawing an image by designating the coordinates of each vertex of a polygon or a sprite and filling the inside of the polygon or sprite with the same color; polygon drawing capability for performing texture mapping in such a manner that a 2-dimensional image data is pasted to the surface of the polygon or sprite; line drawing in which gradation is allowed; and image data transfer for transferring image data from the CPU 51 to the frame buffer 63. The GPU 62 also has the capabilities of realizing a semi-transparent representation by taking an average of pixel values; α-blending for mixing the respective pixel data; dithering for superimposing noise on the boundary of colors; clipping for limiting the image to a particular area; and offsetting for changing the origin depending on the drawing area.

Drawing is performed with signed 11-bit data with a value in the range from −1024 to +1023 for both X and Y. The frame buffer 63 has a memory capacity of 1024×512. The portion of the image which cannot be stored on the frame buffer is folded. The origin of a drawing can be arbitrarily determined within the frame buffer 63 by properly setting the offset values of the coordinates. The drawing is performed only for a particular rectangular area in the frame buffer 63 using the clipping capability, The GPU 62 can represent a texture pattern with a size up to 256×256 dots. The horizontal and vertical lengths can be set to desired arbitrary value within the allowable range.

Image data (texture or sprite pattern) to be attached to a polygon or a sprite is allocated to a non-display area of the frame buffer 63. As many pages of texture or sprite pattern as desired can be stored in the frame buffer 63 as long as the buffer memory has an available space, wherein each page includes 256×256 pixels. The location of each texture page is determined by designating the page number in the parameter indicating the location (address) of the texture page of the drawing command.

The texture or sprite pattern can be drawn in a color mode selected from the following three modes: 4-bit CLUT (4-bit mode); 8-bit CLUT (9-bit mode); and 6-bit CLUT (16-bit mode). In the 4-bit CLUT and 8-bit CLUT, CLUT is employed. In CLUT, 16 to 256 values representing three primary colors R, G, and B are put in the frame buffer 63. The R, G, and B values are numbered in a sequence from the left end of the frame butler 63 and the color of a pixel in the sprite pattern is identified by the number. The GLUT can be selected for every sprite and the sprites may be associated with their respective GLUTs. The location of storage of the GLUT in the frame buffer 63 is determined by assigning coordinate values at the left end of the GLUT to be used to the parameter of a drawing command termed GBA for specifying the (address) point of GLUT.

The GPU 62 employs a motion display technique known as frame double buffering in which two rectangular areas are defined in the frame buffer 62 wherein when data is written into one area, data is read from the other area. If all data has been read from one area, the writing and reading operations are switched. In this technique, the reading operation is not interrupted by the writing operation. The switching of the frame buffer 63 is carried out during the vertical retrace interval. In GPU 62, it is possible to freely set the rectangular areas and the origin of the coordinate system. Therefore, it is also possible to realize a plurality of buffers by properly selecting the rectangular areas and the origin of the coordinate system.

The drawing command is realized into a packet form. In the present embodiment, the format is directly designated by the CPU 51 or by the dedicated hardware.

The parameters included in the drawing command are listed below.

CODE: command code and options

R, G, B: luminances common to all vertices

Rn, Gn, Bn: luminances at vertex n

Xn, Yn: two-dimensional coordinates on plane of n

Un, Vn: two-dimensional coordinates of plane of texture source corresponding to vertex n CBA: header address of CLUT (CLUT BASE ADDRESS)

TSB (TEXTURE SOURCE BASE): header address of texture page, and additional data such as texture type.

For example, a triangle drawing command (command code 1h) consists of a command itself and an argument for passing vertex information. The argument and the format vary depending on the option.

The parameters include:

IIP: Type of the Brightens Value

SIZ: Size of the Rectangular Area

CNT: Vertex

TME: Designation as to whether Mapping is performed

ABE: Designation as to whether semi-transparency processing is performed

TGE: Designation as to whether product of the texture pattern and the brightens is taken When IIP in FIG. 15 is 0, a triangle shape is drawn (by flat shading) with the luminances R, G, and B of one type. When CNT is equal to 1, the lumninances of the three vertices are interpolated aid used for Gouraud shading on the triangle shape. When CNT is 1, four vertices following the command code generate two adjoining triangles (a quadrilateral shape). The texture mapping is switched off when TME is 0 and on when 1. The semi- transparency processing is off when ABE is 0 and on when 1. TGE is enabled only in TME. When TGE=0, a mixture of the texture pattern and the luminance is displayed. When TGE=1, the texture pattern only is drawn.

The line drawing command (command code=2h) consist of a command code (including option) and an argument indicating single-point information. The number of arguments and format are varied depending on the type of option involved. When IIP is 0, drawing is performed so that each pixel has a designated brightness. When IIP=1, a line is drawn by means of interpolation between two vertexes. When CNT=0, a line is drawn between two end points following the command code. When CNT=1, a succession of lines is drawn. When ABE=0, the semitransparency processing is disabled. When ABE=1, the semitransparency processing is enabled. To draw a succession of lines, a termination code is needed.

A sprite drawing command (command code=3h) consist of a command code, and arguments indicating brightness information, the location of the vertex of the rectangular area, the location of the texture source space, the width and height of the rectangulare area. The number of the arguments and the format are varied depending on the type of option involved. It should be noted that Un is always an even number because two pixels are processed simultaneously with the sprite command.

When TGE=1, only the texture pattern is drawn. SIZ is used to designate the size of the rectangular area. When SIZ is 00, the size is designated by H. When SIZ=01, 10, and 11, the size is 1×1, 8×8, and 16×16 respectively.

B. Functions of the CPU 51 shown in FIG. 1

Figure 2:
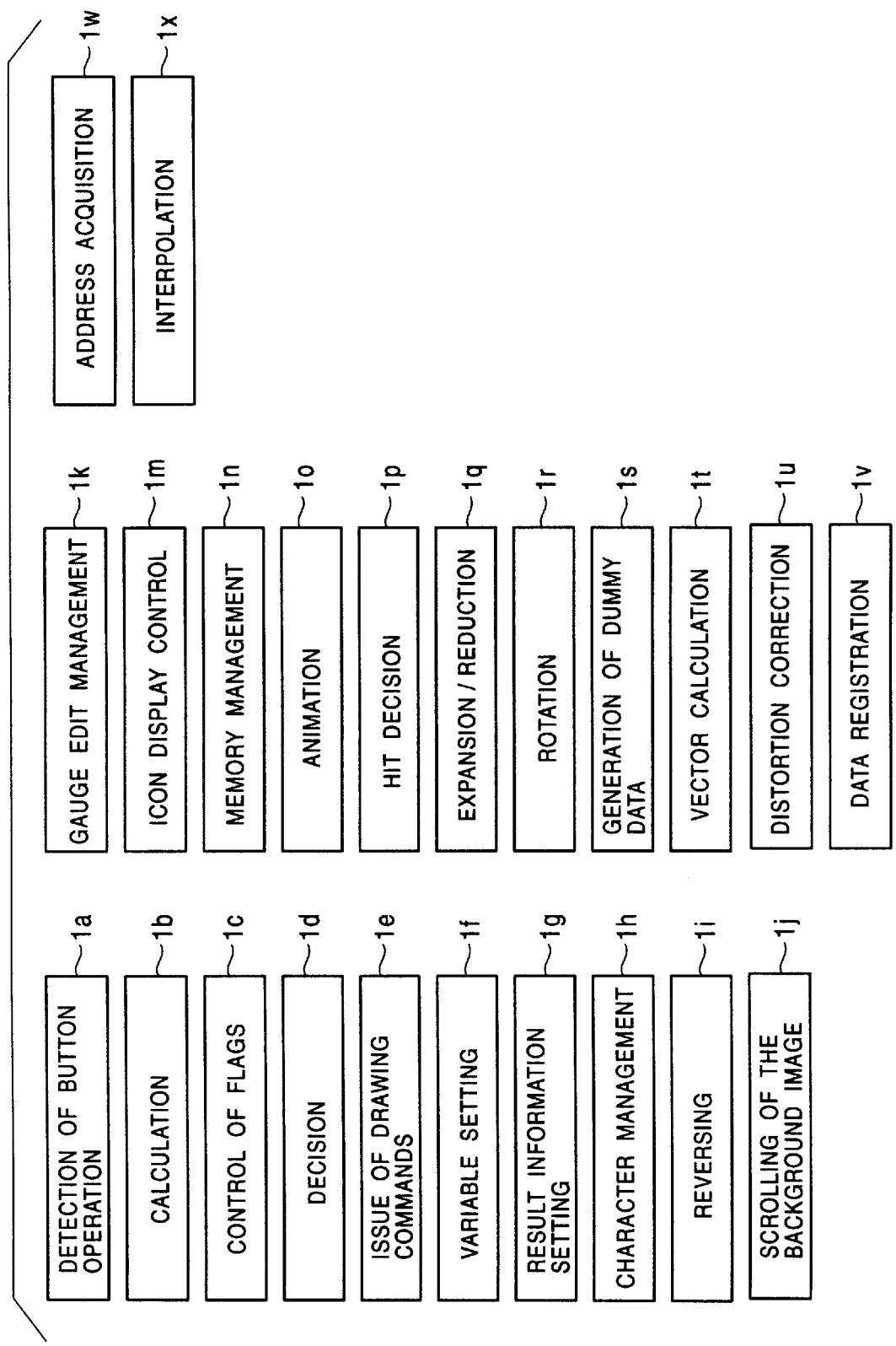
FIG. 2 is a block diagram illustrating the functions of the CPU shown in FIG. 1.

FIG. 2 is a schematic representation of functions of the CPU 51 shown in FIG. 1. The CPU 51 achieves the functions shown in FIG. 2 by reading the program data which is read from the CD-ROM 84 shown in FIG. 1 and now stored in the main memory 53. As shown in FIG. 2, the functions of the CPU 51 includes detection of button operation 1h, calculation 1h, control of flags 1h, decision 1h, issue of drawing commands 1h, variable setting 1h, result information setting 1h, character management 1h, reversing 1h, scrolling of the background image I, gauge edit management 1h, icon display control 1h, memory management 1h, animation processing 1h, hit decision 1h, expansion/reduction 1q, rotation 1r, generation of dummy data 1s, vector calculation 1t, distortion correction 1u, data registration 1v, address acquisition 1w, and interpolation 1x.

C. Process in Main Routine (FIG. 3)

FIG. 3 is a flow chart illustrating a control operation performed in the main routine. In this specific embodiment, the present invention is applied by way of example to a two- or three-dimensional horizontal scrolling type shooting game.

In step S1, the disk drive 81 reads image, voice, and program data from the CD-ROM 84, in accordance with a command given by the operating system. Of the data obtained via the reading operation, the program data is stored in the main memory 53 so that the CPU 51 acquires the functions shown in FIG. 2. In the above process, the image data, that is, texture data, is stored in the frame buffer 63 of the GPU 62, and a texture number is assigned to each texture data. The sound data is stored in the sound buffer 72 of the SPU 71, and a sound data number is assigned to each sound data. Although all image and sound data are not stored in step S1 into the buffers 63 and 72, it is assumed herein for simplicity that all image and sound data is loaded in step S1.

In step S2, drawing command issuing means 1h issues a drawing command, and background scrolling means performs a background scrolling operation as will be described in detail later. As a result of the operation in step S2, a title message including "EDIT" and "START" is displayed and a demonstration process is performed. In the demonstration process, a demonstration game is displayed in the background behind the tile message.

In step S3, button operation detecting means 1h determines whether "START" is selected by operating the cursor key of the controller 92 and whether a third button 92e or a start button 92a is subsequently pressed. If the decision result is "YES", then the process goes to step S4. However, the process goes to step S7 if the decision result is "NO".

In step S4, variable setting means 1h resets the flags and variables stored in the main memory 5.

In step S100, a game main routine is performed. In this game main routine, calculations depending on the operation of the player, displaying, and sound processing are performed. Of these processes, important points will be described in detail later with reference to flow charts.

In step S5, the decision means determines whether the game is over. If the decision result is "YES", then the process goes to step S6. However, the process again goes to step S100 if the decision result is "NO".

In the case where the decision result in step S3 is "NO", the process goes to step S7 in which the button operation detecting means 1h determines whether "EDIT" is selected the user by operating the cursor key and whether the third button 92e is subsequently pressed. If the decision result is "YES", then the process goes to step S200. However, the process again goes to step S3 if the decision result is "NO".

Hit Judgement

C. Concept of Hit Judgement (FIG. 4)

FIG. 4 is a schematic diagram of an image displayed on the screen, provided herein to illustrate the concept of the process of hit judgement. The important point herein is that the hit range is changed in real time by referring to the modification parameter of a character so as to ensure that hit judgement can be performed in a manner that the judgement result is as good as the actual hitting result.

Figure 4A:
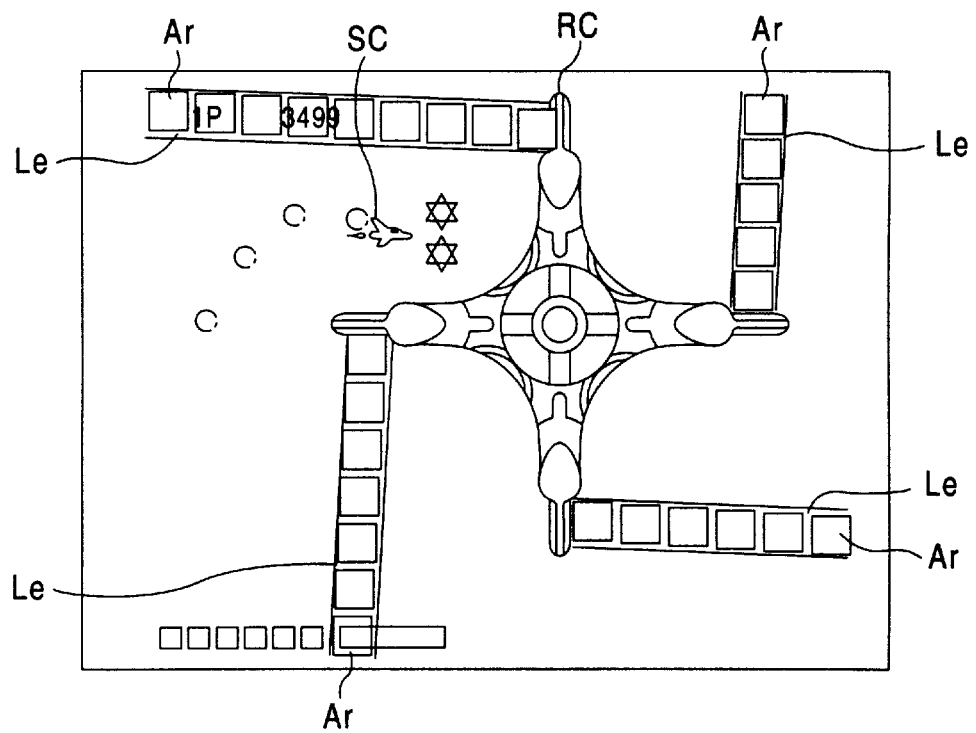
FIG. 4 is a schematic diagram illustrating the concept of the hit judgement.
Figure 4B:
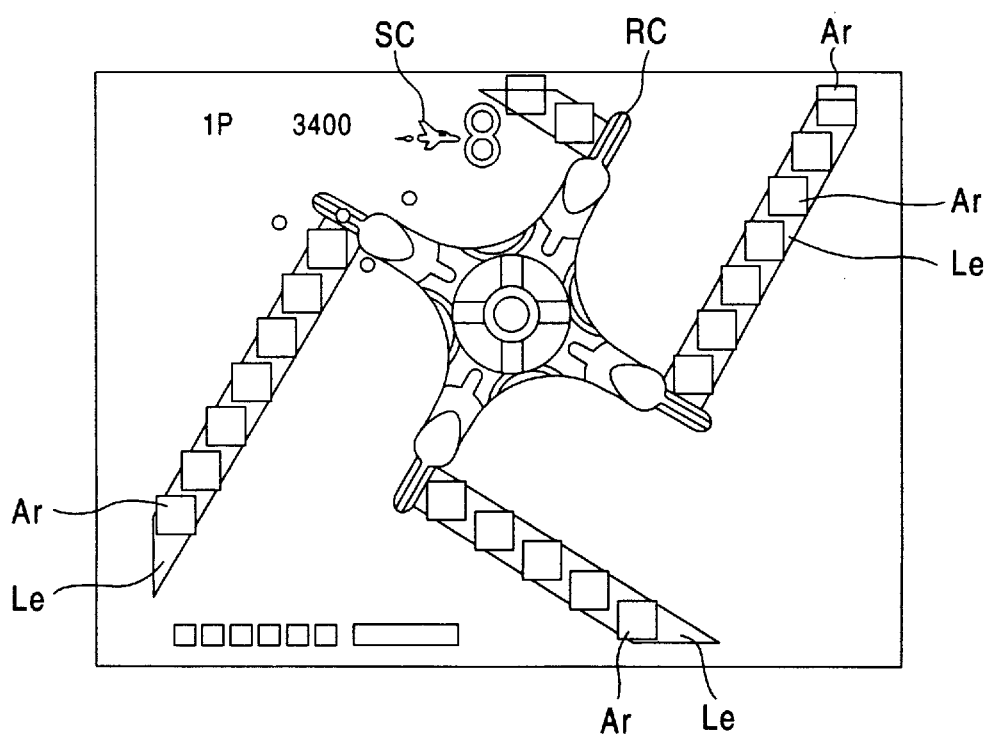

FIG. 4A illustrates an image at a certain point in time, and FIG. 4b illustrates an image following the image shown in FIG. 4A. In these figures, there is shown a rotating object RC occupying the major portion of the display area of the screen. As can be understood when seeing first FIG. 4A and then FIG. 4B, the rotating object is rotating in a clockwise direction. In this specific example, the player is expected to operate the player character SC via the controller 92 such that the player character SC does not come in contact with any of four legs of the rotating object RC. If the player character SC comes into contact with the rotating object RC or with its legs Le, the allowed game length (life value) of the player character is reduced. If all power is consumed, the player has to restart the stage. If all power is consumed N times, the game is over.

Note that although there are shown in FIG. 4 areas Ar having a rectangular shape on each of the four legs Le of the rotating object RC, these areas Ar are not displayed on the screen. These areas Ar are virtual areas provided for use in detecting contact with the player character SC. These areas Ar are rotated in accordance with the rotation angle of the rotating object RC, as can be understood from comparison between FIG. 4A and FIG. 4B. Disposing hit judgment areas Ar, which are equal in shape and size, along the legs Le, makes it possible to simplify the hit judgment process thus improving the judgement speed compared with the case where hit judgement is made using the image information of the legs Le themselves. Furthermore, since the areas Ar are rotated, judgement of a hit of the player character with respect to the legs Le becomes natural when seen by human eyes. In other words, the hit judgement using the areas Ar is a good approximation of detecting the actual hit between the player character and the legs Le.

In the present embodiment, the term "character" is used to describe not only the character described above but a wide variety of characters including player characters, bullets, missiles, and laser beams shot by player characters, enemy characters, and bullets, missiles, and laser beams shot by enemy characters. For each of these characters, areas Ar are provided wherein the size, number, and the locations are determined in accordance with the size of each character. That is, a hit judgement area having a shape similar to the shape of each character is realized using a combination of a plurality of graphic elements such as rectangles thereby making it possible to perform a hit judgement using the hit judgement area which is similar in shape to each character itself. For example, when a character has a triangular shape, the shape of the character is approximated by disposing a plurality of rectangles in a stairs fashion. If only one rectangular hit judgement area is employed for a character, there can be a great difference in shape between the character and the hit judgement area. In this case, the resultant hit judgement becomes poor. More specifically, if a rectangular hit judgement area is employed for a character having a triangular shape, hits detected by such a hit judgment area looks like hits with a rectangular object.

In the present embodiment, as described above, the areas Ar assigned to each character are moved (for example rotated) with the motion of the character during the game. This makes the hit judgement more reliable and more natural. The hit judgment process is described in further detail below with reference to flow charts.

E. Process in the Hit Judgment Routine

Figure 5:
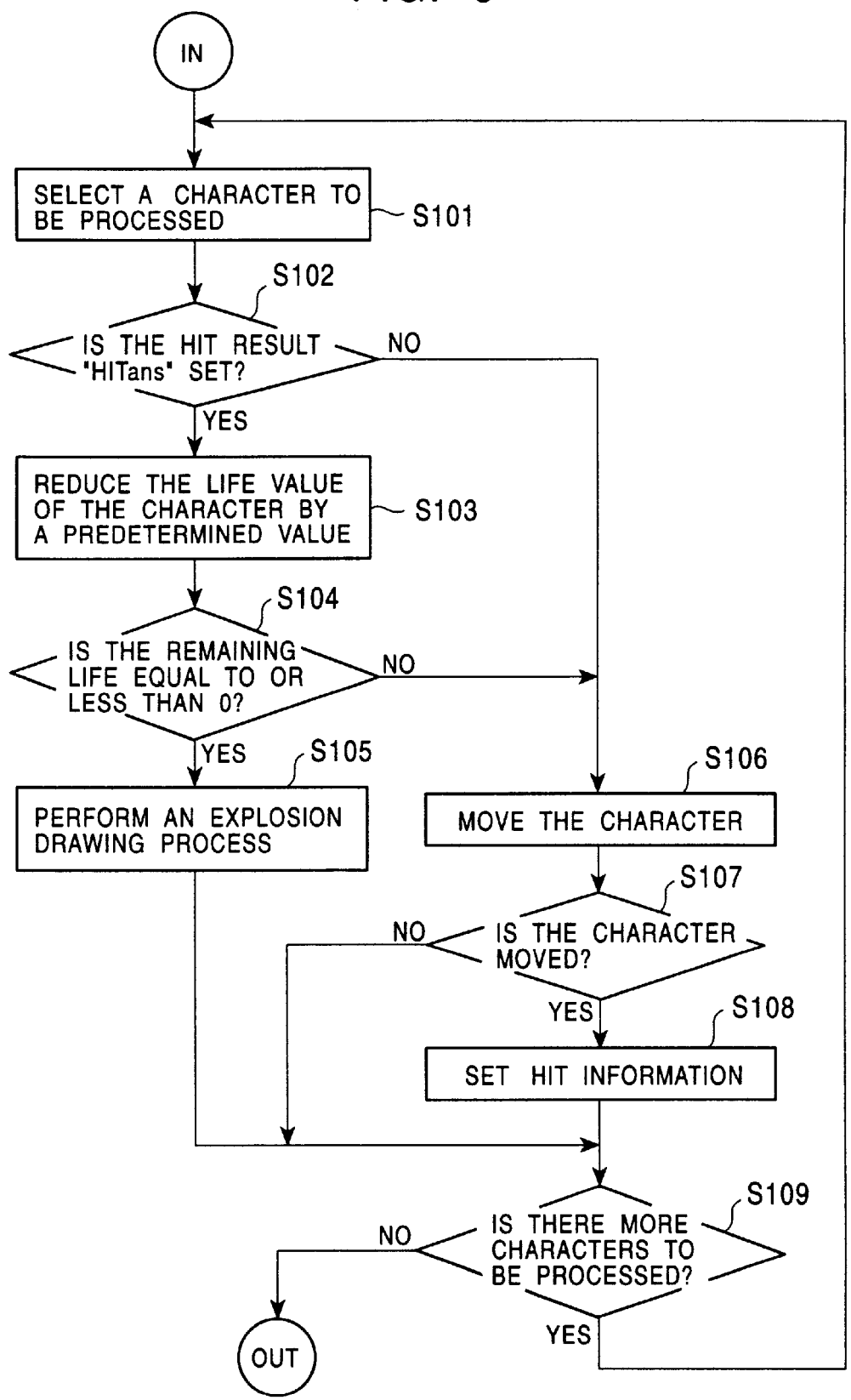
FIG. 5 is a flow chart illustrating the process of a hit judgement routine.
Figure 6:
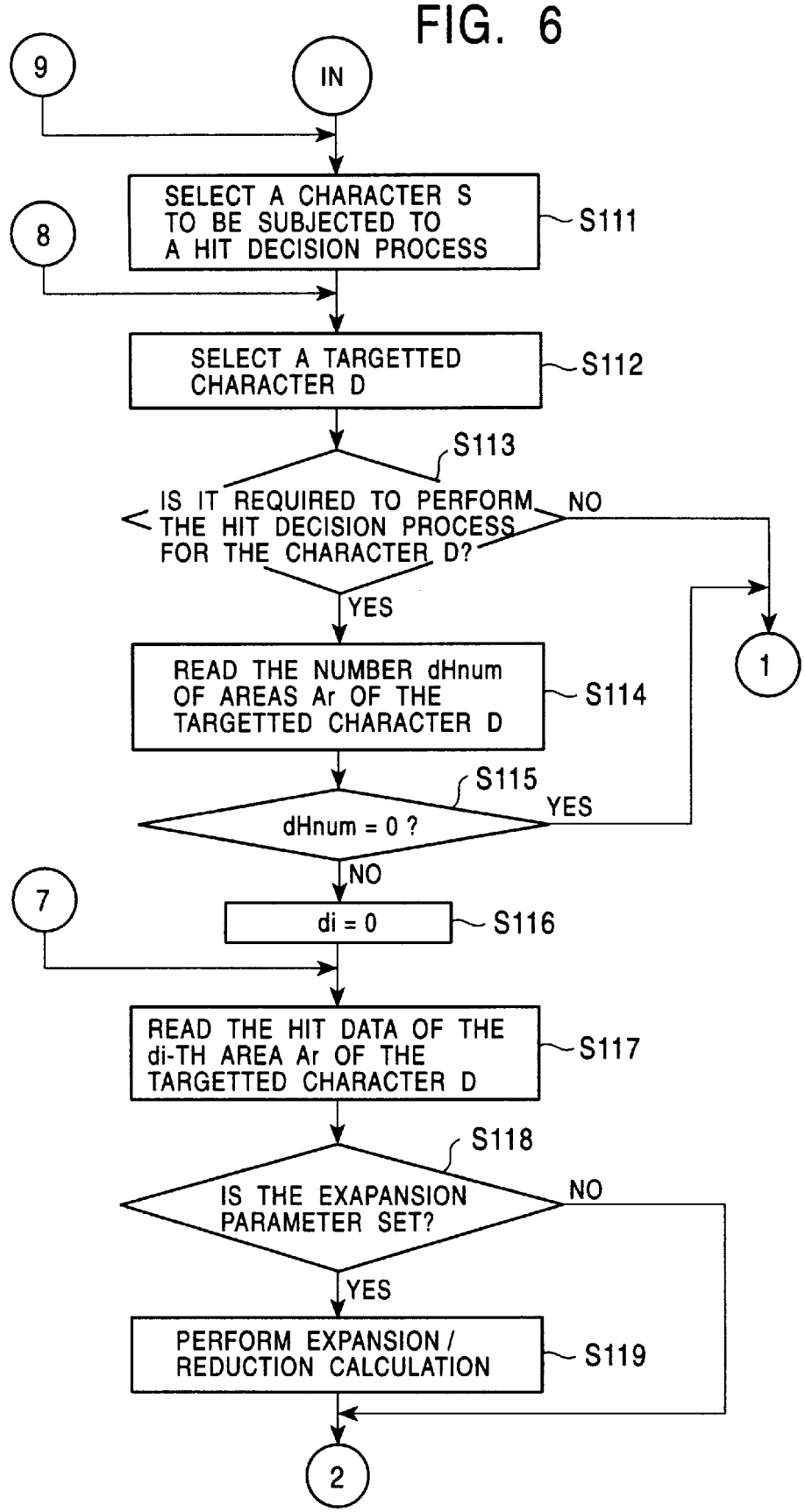
FIG. 6 is a flow chart illustrating the process of the hit judgement routine.
Figure 7:
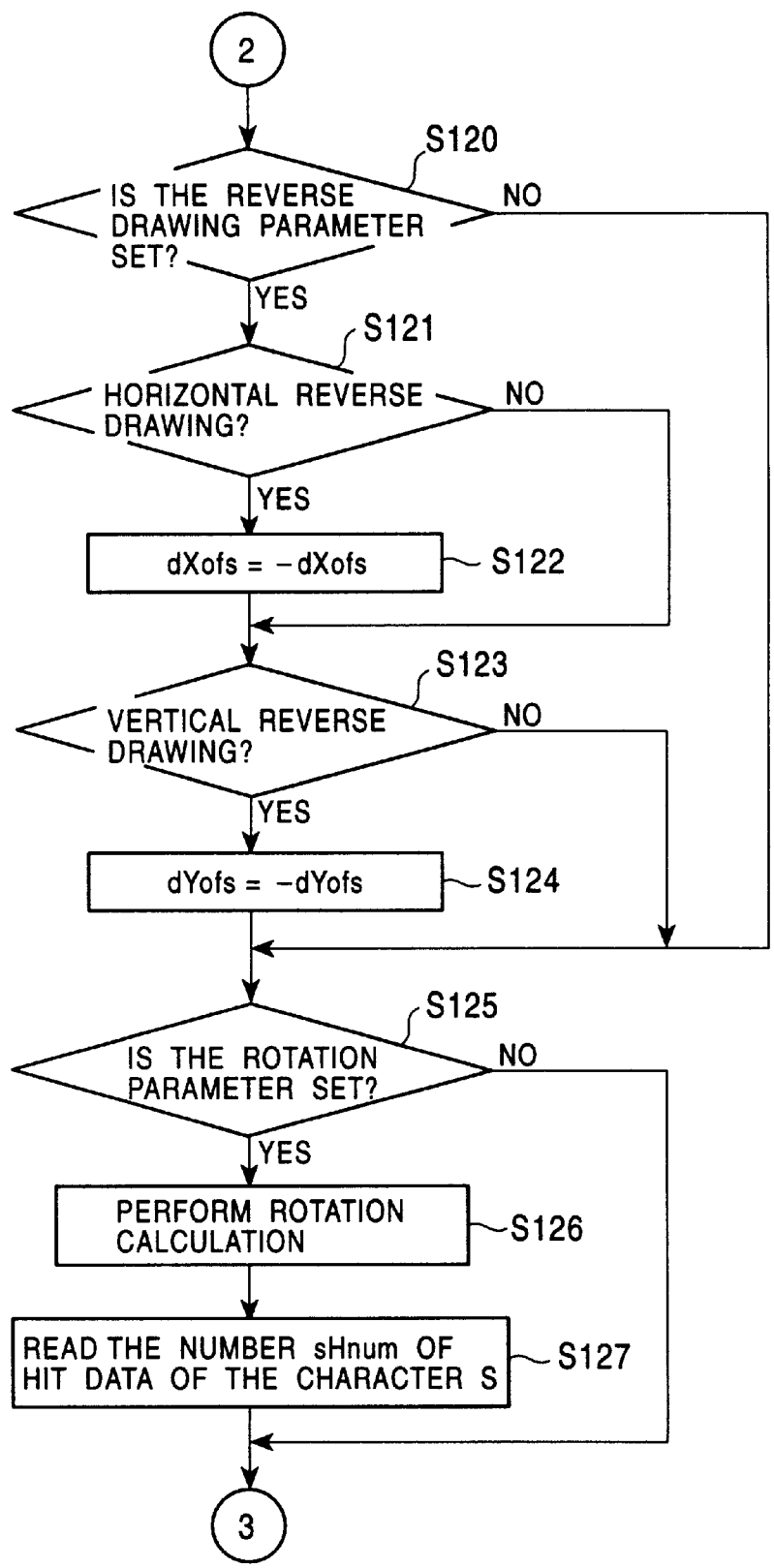
FIG. 7 is a flow chart illustrating the process of the hit judgement routine.
Figure 8:
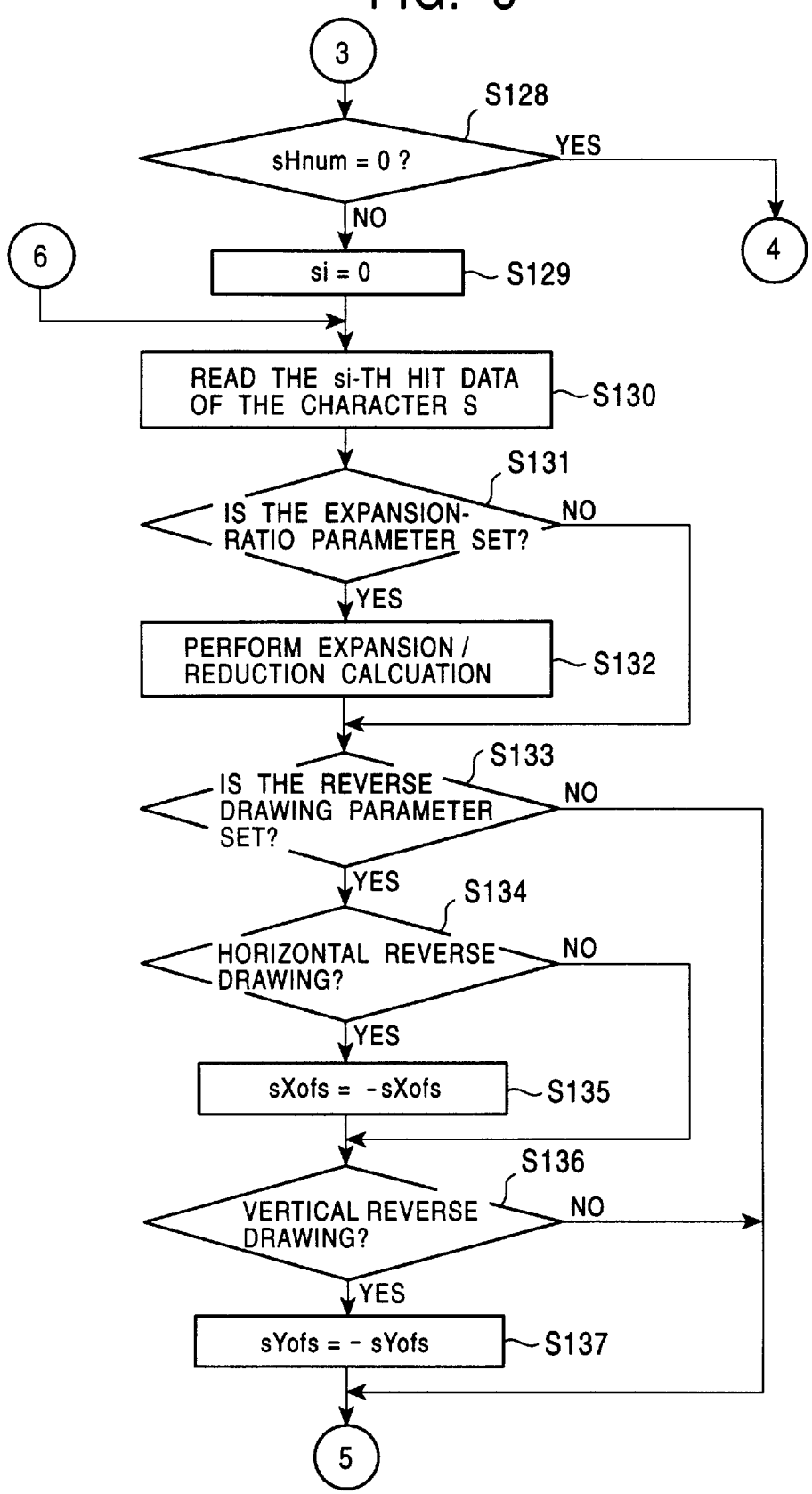
FIG. 8 is a flow chart illustrating the process of the hit judgement routine.
Figure 9:
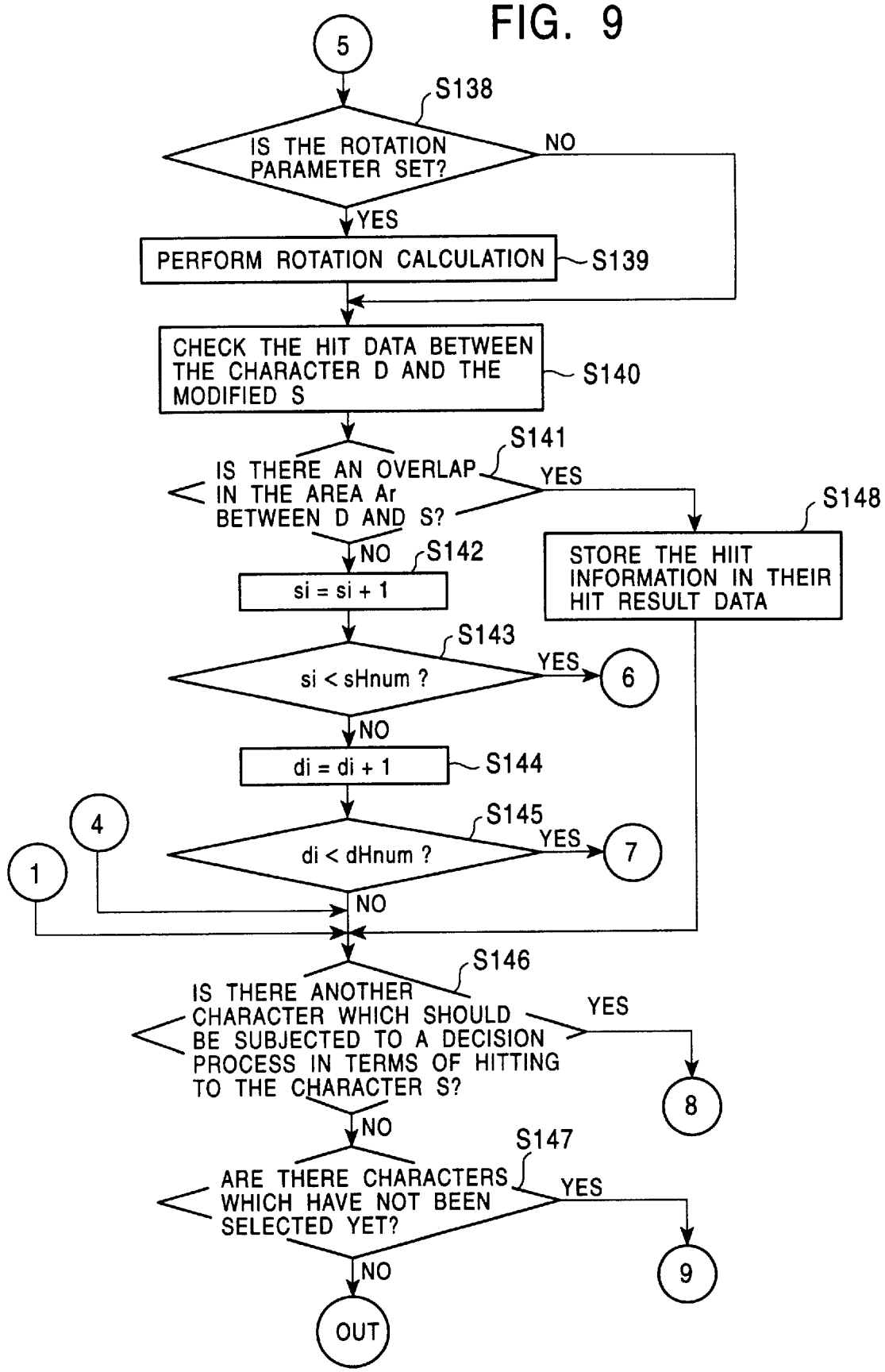
FIG. 9 is a flow chart illustrating the process of the hit judgement routine.

FIG. 5 is a flow chart illustrating the process in a character processing routine in the hit judgment routine. FIGS. 6 to 9 are flow charts illustrating the process of the hit judgement routine. Before starting the description of, various parameters used in the flow charts are described first. Areas Ar are produced so that the shape of the combined areas Ar becomes similar to the shape of a character (the rotating object in the above-described example). More specifically, areas Ar are produced by generating offsets Xofs and Yofs defining the displacement of the center point of the respective hit judgement areas Ar from the center point of the character to which the areas Ar are assigned, and also generating the horizontal sizes Hsize and vertical sizes Vsize of the respective hit judgment areas Ar for each Hnum.

Data used to display characters and data used to make a hit judgement are constructed with the following parameters.

Xposi, Yposi: Coordinates of the center point of the character

Hzoom, Vzoom: Zooming ratio of the character

HVflip: Reversing Parameter

Rot: Rotation parameter

HITset: Hit information.

This parameter HITset includes information about each character. When a hit with the character occurs, the other character hit with this character is informed of the type of the character via the this parameter. Herein the term "character" is used to describe various types of characters including player characters, bullets shot by player characters, missiles shot by player characters, laser beams shot by player characters, barriers for protecting player characters from bullets or the like shot by enemies, enemy characters, bullets shot by enemy characters, missiles shot by enemy characters, and laser beams shot by enemy characters. The hit information HITset having a particular value is assigned to each character.

HITans: Hit result.

When a character hits another character, for example when a player character hits a laser beam shot by an enemy character, the hit information HITset of the enemy character (the laser beam in this example). Depending on the value of the hit information, the damage, that is the value which is to be subtracted from the life value is calculated, and the resultant value is set to HITans.

Hnum: Number of areas Ar assigned to each character.

This parameter represents the number of rectangular areas Ar for use as hit judgement areas assigned to each character. Coordinates (Xofs, Yofs) with respect to the origin taken at the center of the character and size data (Hsize, Vsize) are assigned to each area Ar.

Jking: Hit type.

This parameter is used to avoid a hit between characters on the same sides. Jkind is assigned to each character such that it represents the type of the character itself and the types of the target character. That is, Jkind assigned to each player character includes information indicating that the character is a player character, and also includes information indicating that a hit judgement should be performed for hit enemy characters, bullets, missiles, and laser beams shot by enemy characters. When a hit occurs between two characters, if and only if Jkind assigned to one character (for example a player character) includes information indicating the target character, hit judgement is performed.

First, the operation of the character processing routine is described referring to FIG. 5. In step S101, the character management means 1h selects a character to be processed.

In step S102, the decision means 1h determines whether the hit result HITans for the selected character is defined on the main memory 5. If the decision result is "YES", then the process goes to step S103. However, the process goes to step S106 if the decision result is "NO".

In step S103, the calculation means 1h decrements the life value of the character by a predetermined amount.

In step S104, the decision means 1h determines whether the remaining life value is equal to 0. If the decision result is "YES", then the process goes to step S105. However, the process goes to step S106 if the decision result is "NO".

In step S105, the drawing command issuing means 1h issues an explosion drawing command to the drawing processor 10.

In step S106, the drawing command issuing means 1h issues a character drawing command to the drawing processor 10. In response to the character drawing command, the drawing processor 10 draws the character at an advanced location. This results in a shift of location on the screen for the character.

In step S107, the decision means 1h determines whether the character is changed in location. If the decision result is "YES", then the process goes to step S108. However, the process goes to step S109 if the decision result is "NO".

In step S108, the variable setting means 1h defines the hit data. Herein the hit data includes Jkind, HITset, Hnum, (Xofs, Yofs), and (Hsize, Vsize) described above.

In step S109, the decision means 1h determines whether there is a character which has not been processed yet. If the decision result is "YES", then the process goes to step S101. However, the process exits from this routine if the decision result is "NO".

The process of the hit judgement routine is described below referring to FIGS. 6 to 9. In the following description, it is assumed that the "character" is different process by process. That is, the character changes from a player character SC, to a bullet shot by the player character SC, a missile shot by the player character SC, a laser beam shot by the player character SC, an enemy character DC, a bullet shot by the enemy character DC, a missile shot by the enemy character DC, and finally a laser beam shot by the enemy character DC.

In step S111, the character management means 1h selects a character S whose hit is to be examined.

In step S112, the character management means 1h selects a character to be examined in terms of a hit with the character S.

In step S113, on the basis of the contents of Jkind received from the character management means 1h, that is on the basis of information indicating whether the character D is of the type which should be examined in terms of hit with the character S, the decision means 1h determines whether a hit judgement should be performed between the character S of interest and the character D. If the decision result is "YES", then the process goes to step S114. However, the process goes to step S146 if the decision result is "NO".

In step S114, the character management means 1h reads the number dHnum of areas Ar of the character D.

In step S115, the decision means 1h determines whether the number dHnum of areas Ar of the character D is equal to 0. If the decision result is "YES", then the process goes to step S146. However, the process goes to step S116 if the decision result is "NO".

In step S116, the variable setting means 1h substitutes 0 into di.

In step S117, the character management means 1h reads the hit data associated with the di-th area Ar of the character D.

In step S118, the decision means 1h determines whether the zooming ratio parameters dHzoom and dVzoom are defined in the hit data. If the decision result is "YES", then the process goes to step S119. However, the process goes to step S120 if the decision result is "NO".

In step S119, the expansion/reduction means 19 performs expansion/reduction calculation in accordance with the zooming ratio parameters dHzoom and dVzoom. For example, this calculation is performed as follows.

dxofs=dxofs×dHzoom dYofs=dYofs×dvzoom dHsize=dHsize×dHzoom dVsize=dVsize×dvzoom.

In step S120, the decision means 1h determines whether the reversing parameter dHVflip is defined in the hit data. If the decision result is "YES", then the process goes to step S121. However, the process goes to step S125 if the decision result is "NO".

In step S121, the decision means 1h determines whether the value of the reversing display parameter dHVflip indicates that the flip should be performed in the horizontal direction. If the decision result is "YES", then the process goes to step S122. However, the process goes to step S123 if the decision result is "NO".

In step S122, the reversing means 1h substitutes-dxofs into dxofs. This makes the area Ar flipped in the horizontal direction in accordance with the flip of the character.

In step S123, the decision means 1h determines whether the value of the reversing display parameter dHVflip indicates that the flip should be performed in the vertical direction. If the decision result is "YES", then the process goes to step S124. However, the process goes to step S125 if the decision result is "NO".

In step S124, the reversing means 1h substitute s-dYofs into dyofs. This makes the area Ar flipped in the vertical direction in accordance with the flip of the character.

In step S125, the decision means 1h determined whether the rotation parameter dRot is defined in the hit data. If the decision result is "YES", then the process goes to step S126. However, the process goes to step S127 if the decision result is "NO".

In step S126, the rotation means 1r performs rotation calculation. For example, this calculation is performed as described below so as to determine the location of the area Ar relative to the center of the character.

dXofs'=dXofs dYofs'=dYofs dXofs=cos(dRot)×dXofs'−sin(dRot)×dYofs' dYofs=sin(dRot)×dXofs'+cos(dRot)×dYofs'.

In step S127, the character management means 1h reads the number dHnum of areas Ar of the character S.

In step S128, the decision means 1h determines whether the number dHnum of areas Ar of the character S is equal to 0. If the decision result is "YES", then the process goes to step S146. However, the process goes to step S129 if the decision result is "NO".

In step S129, the variable setting means 1h substitutes 0 into si.

In step S130, the character management means 1h reads the hit data associated with the si-th area Ar of the character S.

In step S131, the decision means 1h determines whether the zooming ratio parameters sHzoom and sVzoom are defined in the hit data. If the decision result is "YES", then the process goes to step S132. However, the process goes to step S133 if the decision result is "NO".

In step S132, the expansion/reduction means 19 performs expansion/reduction calculation in accordance with the zooming ratio parameters sHzoom and sVzoom. For example, this calculation is performed as follows.

sXofs=sXofs×sHzoom sYofs=sYofs×sVzoom sHsize=sHsize×sHzoom sVsize=svsize×sVzoom.

In step S133, the decision means 1h determines whether the reversing display parameter sHVflip is defined in the hit data. If the decision result is "YES", then the process goes to step S134. However, the process goes to step S138 if the decision result is "NO".

In step S134, the decision means 1h determines whether the value of the reversing display parameter sHVflip indicates that the flip should be performed in the horizontal direction. If the decision result is "YES", then the process goes to step S135. However, the process goes to step S136 if the decision result is "NO".

In step S135, the reversing means 1h substitutes-sxofs into sXofs. This makes the area Ar flipped in the horizontal direction in accordance with the flip of the character.

In step S136, the decision means 1h determines whether the value of the reversing display parameter sHVflip indicates that the flip should be performed in the vertical direction. If the decision result is "YES", then the process goes to step S137. However, the process goes to step S138 if the decision result is "NO".

In step S137, the reversing means 1h substitutes-sYofs into syofs. This makes the area Ar flipped in the vertical direction in accordance with the flip of the character.

In step S138, the decision means 1h determined whether the rotation parameter sRot is defined in the hit data. If the decision result is "YES", then the process goes to step S139. However, the process goes to step S140 if the decision result is "NO".

In step S139, the rotation means 1r performs rotation calculation. For example, this calculation is performed as described below so as to determine the location of the area Ar relative to the center of the character.

sXofs'=sXofs sYofs'=sYofs sXofs=cos(sRot)×sXofs'−sin(sRot)×sYofs' sYofs=sin(sRot)×sXofs'+cos(sRot)×sYofs'.

In step 140 the hit judgment means 1h performs a judgment of hit between the character S and the character D on the basis of the hit data associated with each area Ar after the modification.

In step S141, the hit judgement means 1h determines whether there is an overlap between an area Ar of the character S and an area Ar of the character D. If the decision result is "YES", then the process goes to step S148. However, the process goes to step S142 if the decision result is "NO". This judgement is performed for example by determining whether the following conditions are satisfied.

1 (dXposi+dXofs)−(sXposi+sXofs)1<(dHsize+sHsize) and 1 (dYposi+dYofs)−(sYposi+sYofs)1<(dVsize+sVsize).

If the above conditions are satisfied, there is an overlap between areas Ar.

In step S142, the calculation means 1*h* increases the variable si assigned to the character S by 1.

In step S143, the decision means 1*h* determines whether the variable si is less than the number sHnum of the areas Ar of the character S. If the decision result is "YES", then the process goes to step S130. However, the process goes to step S144 if the decision result is "NO".

In step S144, the calculation means 1*h* increases the variable di assigned to the character D by 1.

In step S145, the decision means determines whether the value of the variable di is smaller than the number dHnum of areas Ar of the character D. If the decision result is "YES", then the process goes to step S117. However, the process goes to step S146 if the decision result is "NO".

In step S146, the decision means 1*h* determines whether there is another character different from the character S which should be subjected to the hit examination. If the decision result is "YES", then the process goes to step S112. However, the process goes to step S147 if the decision result is "NO".

In step S147, the decision means 1*h* determines whether there is a character which has not been selected yet. If the decision result is "YES", then the process goes to step S111. However, if the decision result is "NO", then the process exits from the decision routine.

In the case where the decision result in step S141 is "YES", that is if it is determined that there is an overlap between the areas Ar of the character S and the areas Ar of the character D, the process goes to step S148. In step S148 the character management means 1*h* sets the hit information HITset of the respective characters into the corresponding hit results HITans. This setting process is performed for example by substituting the hit information dHITset associated with the character D into the hit result sHITset associated with the character D and further substituting the hit information dHITset associated with the character D into the hit result dHITset associated with the character D, as shown below.

sHITans=dHITset dHITans=sHITset.

As described above, the present embodiment can be applied to a shooting game or another action game in which a laser beam is shot by a player character operated by a player toward a character operated by an enemy player or a CPU. If the laser beam hits the enemy character, the enemy character is deleted. In this game system according to the present embodiment, a plurality of rectangular elements are combined to produce a hit judgement area having a shape similar to that of the character thereby ensuring that the judgment result is as good as the actual hitting result. Furthermore, during the game, the areas Ar assigned to the respective characters are moved in accordance with the motion of the respective characters so that the result of the hit judgement becomes as good as the actual hitting result.

Refraction Processing

F. Concept of the Refraction Processing (FIGS. 10 and 11)

FIGS. 10 and 11 are schematic diagrams illustrating the concept of the refraction processing.

Figure 10A:
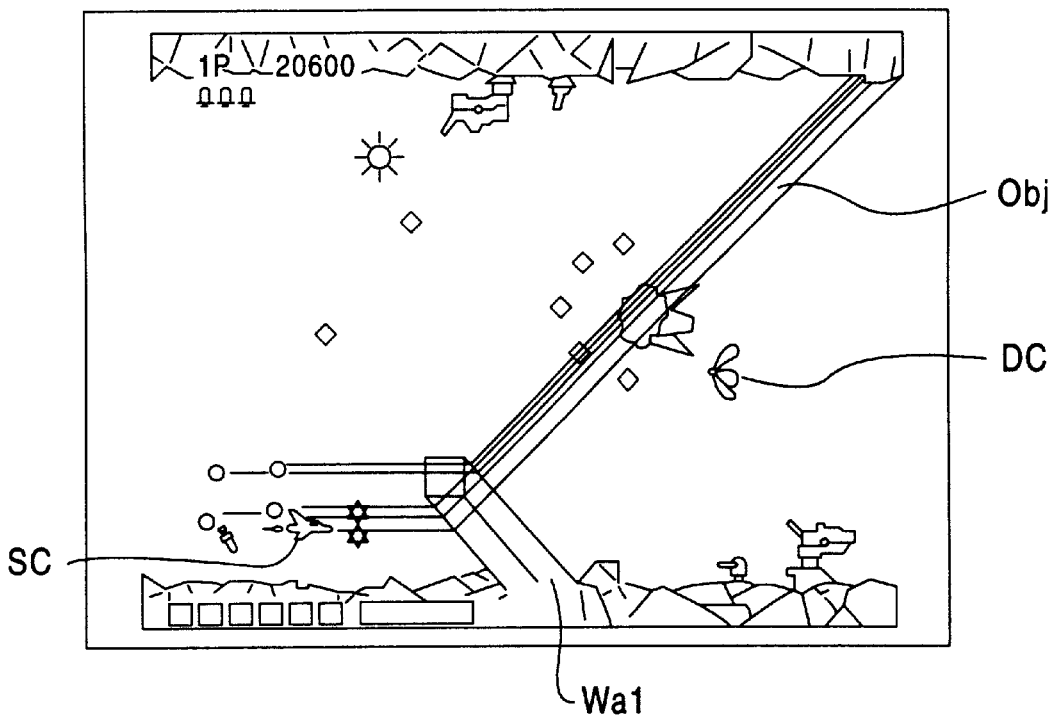
FIG. 10 is a schematic diagram illustrating the concept of the refraction process.
Figure 10B:
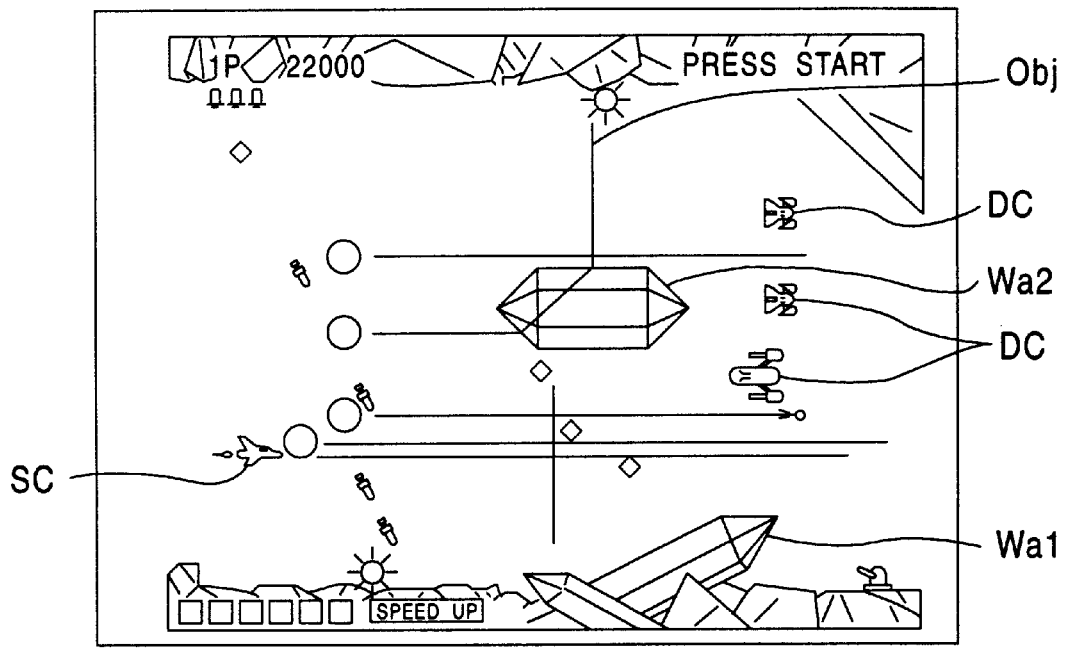

As shown in FIGS. 10A and 10B, when a player is pressing a particular button of the controller 92, a laser beam object obj is shot by a player character SC. When the laser beam object obj is incident on refractor Wa1 or Wa2, the laser beam object obj is refracted in the refractor Wa1 or Wa2. After that, the laser beam object obj emerges from the refractor. Wa1 or Wa2.

In FIG. 10A, the refractor Wa1 is located at a fixed position, while the refractor Wa2 moves downward.

Furthermore, as shown in FIGS. 10A and 10B, if the laser beam obj emerging from the refractor Wa1 or Wa2 hits an enemy character DC, the life of the enemy character DC is reduced.

Referring to FIG. 11, the refraction processing is described in further detail below. In the present embodiment, as shown in FIG. 11A, an image of laser beams in the form of a straight or refracted line comprises a plurality of laser beam objects obj wherein each laser beam object obj can have a length up to 32-dots. In FIG. 11A, a laser beam object obje is shot to right.

Each laser beam object obj has center point coordinates (X, Y), a head portion length L0, a tail portion length L1, the current direction D0, the direction D1 before being refracted, and the traveling velocity V. The sum L0+L1 can have a value equal to or less than 32 dots. In the present embodiment, D0 and D1 can have a value from 0 to n. When D0 or D1 is equal to 0, the traveling direction of the laser beam object is along the horizontal direction (to right in this specific embodiment). The angle increases by 360/n in the clockwise direction when D0 or D1 increases by 1.

The laser beam object obj can be in either of two states: straight state and refracted state. These two states are drawn on the screen as follows.

Figure 11A:
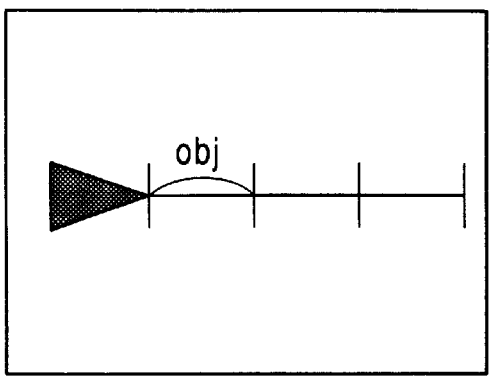
FIG. 11 is a schematic diagram illustrating the concept of the refraction process.
Figure 11B:
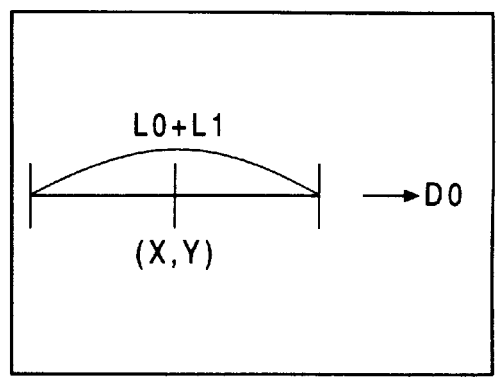
Figure 11C:
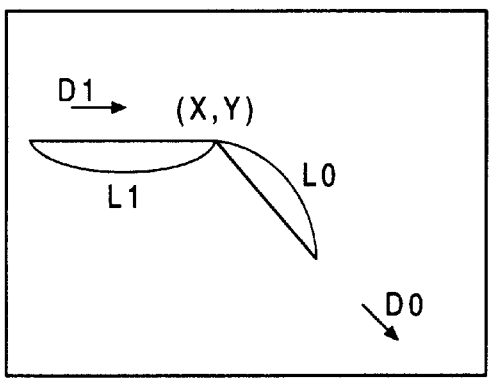

A laser beam object obj in the straight state is drawn as a character having a length equal to L0+L1 and an angle D0, as shown in FIG. 11B. In this case, the center point (X, Y) is coincident with the apparent center point. On the other hand, a laser beam object obj in the refracted state is drawn as a combination of a character with a length L0 and an angle D0 and a character with a length L1 and an angle D1 which are connected to each other at the center point (X, Y) of the object. In this case, each timer the image is rewritten, the traveling velocity V is added to the length L0 and the traveling velocity V is subtracted from the length L1. When the length L1 becomes 0, that is when the refraction is completed, the state of the laser beam object obj changes into the straight state with the length L0.

The refractors are now described below. Each refractor is composed of a great number of dots wherein a ground hitting code J is assigned to each dot. The ground hitting code J is defined for all areas which are displayed on the screen. The ground hitting code J consists of a value indicating whether the dot is on a refractor or in a space where there is nothing, and also a refraction angle indicating the angle at which a laser beam object obj is refracted when it is incident on the refractor from the space where there is nothing. Herein, the refraction angle d1 is defined as the angle perpendicular to the refractor and directed toward the inside of the refractor.

Figure 11D:
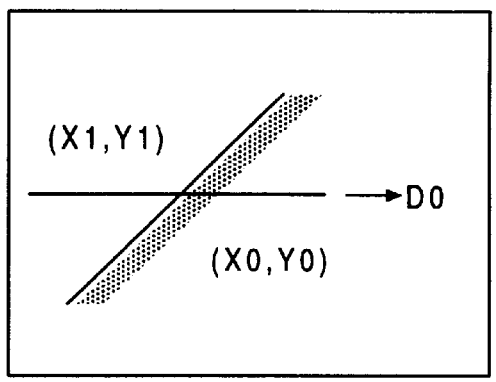
Figure 11E:
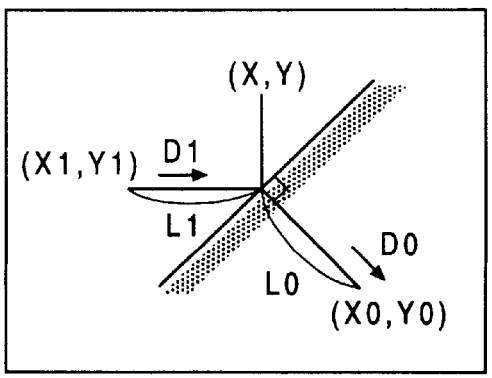

Now the refraction process is described below referring to FIGS. 11D and 11E. As described above, when a laser beam object obj in the straight state is incident on a refractor or when it emerges from a refractor, the traveling direction is changed in accordance with the refraction angle in the ground hitting code J defined for the respective dots constituting the refractor, and thus the laser beam object is changed into the refracted state. The traveling direction in the refracted state does not depend on the traveling direction before entering or emerging from the refractor but it is determined only by the ground hitting code J defined at each dot.

The coordinates of both end points of the laser beam object obj in the straight state are denoted by (X0, Y0) and (X1, Y1), respectively. Of the dots constituting the refractor, if the dot the laser beam object obj passes through has a refraction angle equal to 0 defined in the ground hitting code J, then the laser beam object obj further travels along the straight line and passes through the refractor along the same straight line as shown in FIG. 11D. On the other hand, if the refraction angle of the ground hitting code J assigned to the dot where the laser beam object obj passes is defined as described above, that is, if the refraction angle is perpendicular to the refractor and directed to the inside of the refractor, then the laser beam object is refracted as shown in FIG. 11E, and then travels along a straight line. The refraction process is described in further detail below referring to FIGS. 12 to 14.

G. Process in the Refraction Routine

Figure 12:
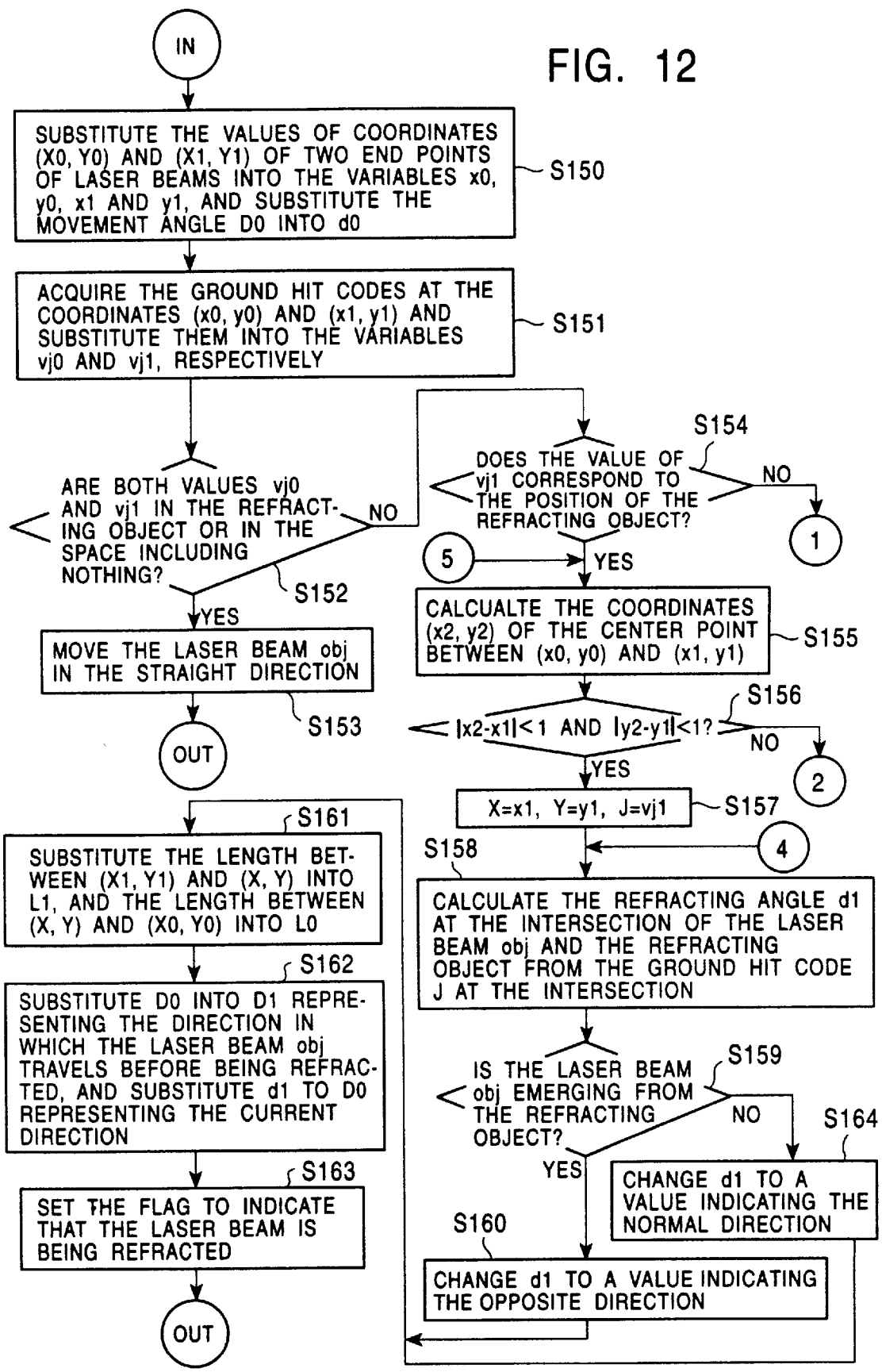
FIG. 12 is a flow chart illustrating the refraction routine.
Figure 13:
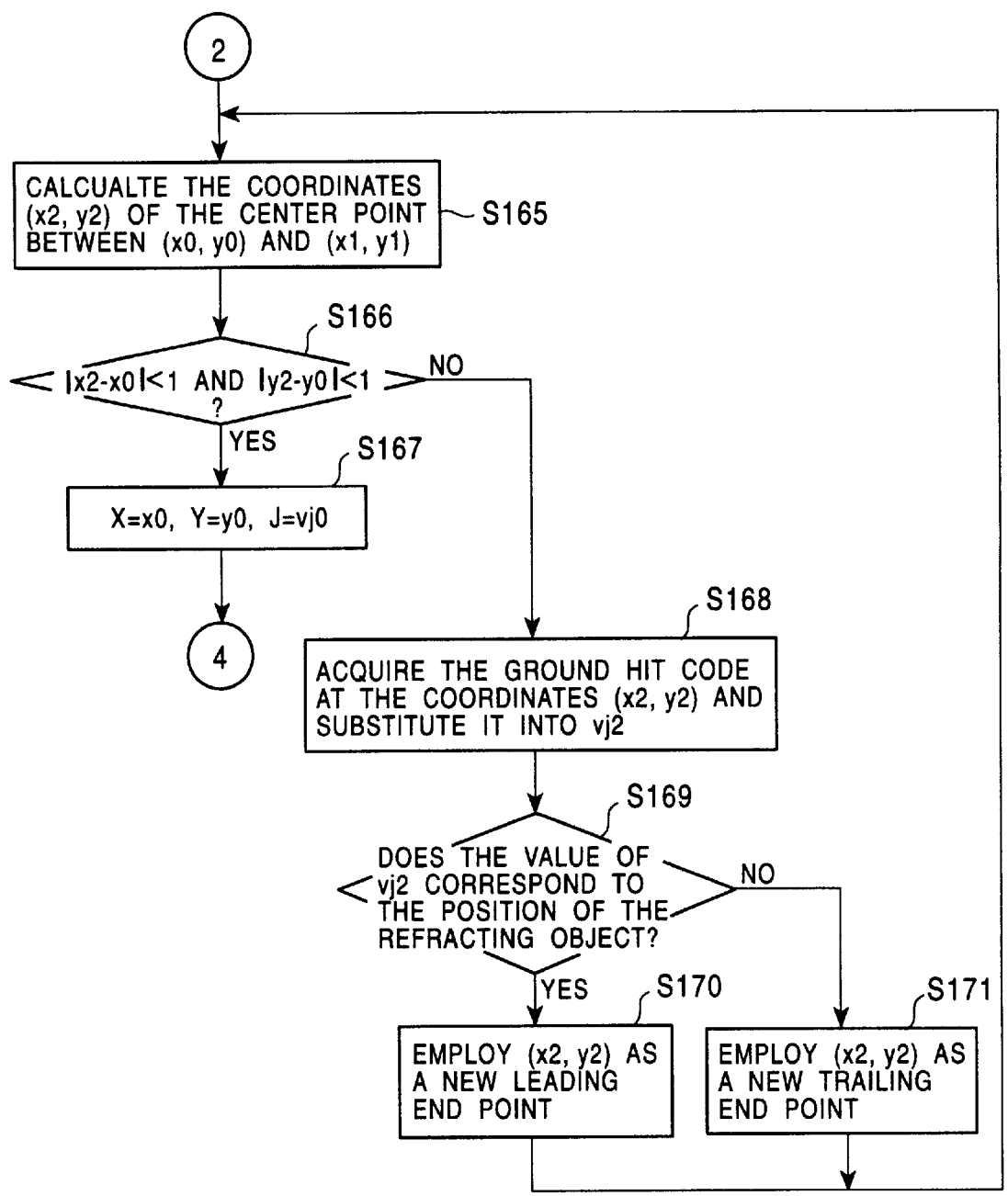
FIG. 13 is a flow chart illustrating the refraction routine.
Figure 14:
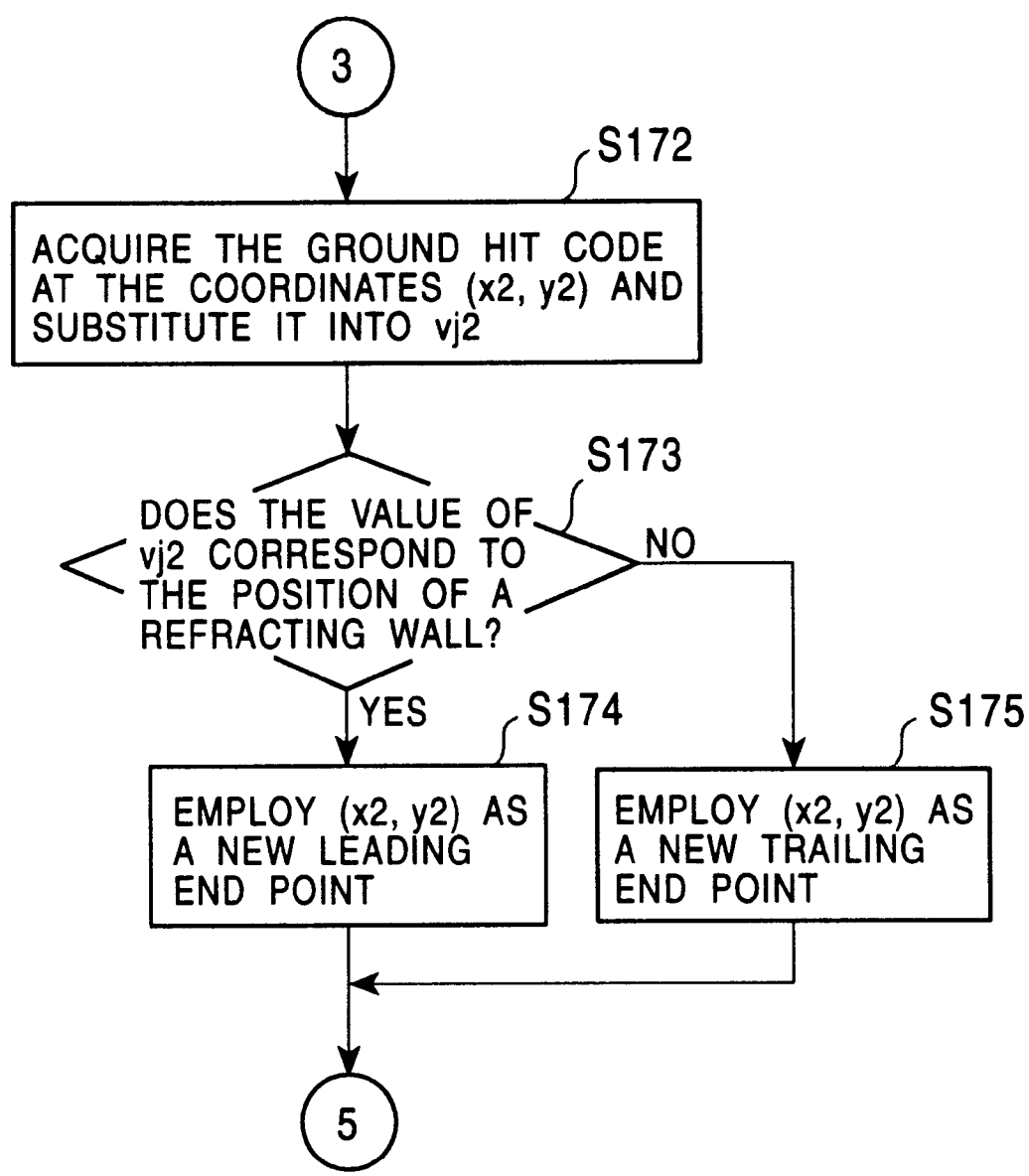
FIG. 14 is a flow chart illustrating the refraction routine.

FIGS. 12 to 14 are flow charts illustrating the process in the refraction routine.

In step S150, the variable setting means $1h$ substitutes the traveling angle D0 and the coordinates (X0, Y0) and (X1, Y1) of both end points of the laser beam object in the straight state into variables d0, (x0, y0), and (x1, y1), respectively.

In step S151, the ground hitting codes assigned to the coordinates (x0, y0) and (x1, y1) are read from the table, and substituted into variables vj0 and vj1, respectively.

In step S152, the decision means $1h$ determines whether the variables vj0 and vj1 both have values indicating that both points are either in the inside of the refractor or in the space where there is nothing. If the decision result is "YES", then the process goes to step S151. However, the process goes to step S154 if the decision result is "NO". Herein "both points are in the inside of the refractor" refers to a status in which the entire laser beam object obj is located within the refractor. On the other hand, when both end points are in the space where there is nothing, the entire laser beam object obj is located outside the refractor.

In step S153, the drawing command issuing means $1h$ issues a drawing command to the drawing processor 10 to successively shift the location of the laser beam object obj in the horizontal direction.

In step S154, the decision means $1h$ determines whether the variable vj1 indicates that the tailing end of the laser beam object obj is within the refractor and the leading end is outside the refractor. If the decision result is "YES", then the process goes to step S155. However, the process goes to step S165 if the decision result is "NO".

In step S155, the calculation means $1h$ calculates the coordinates (x2, y2) of the center point between the coordinates (x0, y0) and (x1, y1). This calculation is performed as follows.

x2=(x0+x1)/2
y2=(y0+y1)/2.

In step S156, the decision means $1h$ determines whether |x2−x1|<1 and |y2−y1|<1. That is, it is determined whether the distance between the center point and either end point is less than 1. If the decision result is "YES", then the process goes to step S157. However, the process goes to step S172 if the decision result is "NO".

In step S157, the variable setting means $1h$ substitutes x1, y1, and vj1 into X, Y, and J, respectively. Herein (X, Y) is the coordinates of a point where the laser beam object obj intersects the refractor.

In step S158, the calculation means $1h$ calculates the refraction angle d1 to be assigned to the point (X, Y) at which the laser beam object obj intersects the refractor, using the ground hitting code J assigned at that point.

In step S159, the decision means $1h$ determines whether the laser beam object is emerging from the refractor on the basis of the value of the refraction flag. If the decision result is "YES", then the process goes to step S160. However, the process goes to step S164 if the decision result is "NO".

In step S160, the variable setting means $1h$ changes the value of the refraction angle d1 so that the resultant angle is directed in the direction opposite to the normal direction (that is, the angle is rotated by 180°).

In step S161, the variable setting means $1h$ substitutes the distance between the coordinates (X1, Y1) and (X, Y) into L1, and the length between the coordinates (X, Y) and (X0, Y0) into L0.

In step S162, the variable setting means $1h$ substitutes D0 into the traveling direction D1 of the laser beam object obj before being refracted, and d1 into the current traveling direction D0.

In step S163, the flag control means $1h$ sets the refraction flag.

If the decision result in step S159 is "NO", then the process goes to step S164. In step S164, the variable setting means $1h$ gives a value to the refraction angle d1 to indicate that the angle is directed in the normal direction. Then the process exits from this routine.

If the decision result in step S156 is "NO", then the process goes to step S165. In step S165, the calculation means $1h$ calculates the coordinates (x2, y2) of the center point between the points (x0, y0) and (x1, y1).

This calculation can be performed as follows.

x2=(x0+x1)/2
y2=(y0+y1)/2

In step S166, the decision means $1h$ determines whether |x2−x0|<1 and |y2−y0|<1. That is, it is determined whether the distance between the center point and either end point is less than 1. If the decision result is "YES", then the process goes to step S167. However, the process goes to step S168 if the decision result is "NO".

In step S167, the variable setting means $1h$ substitutes x0, y0, and vj0 into X, Y, and J, respectively. Herein (X, Y) is the coordinates of a point where the laser beam object obj intersects the refractor.

In step S168, the variable setting means $1h$ acquires the ground hitting code J at the coordinate (x2, y2) and substitutes it into vj2.

In step S169, the decision means $1h$ determines whether the variable vj2 indicates that the part between the leading end and the center point of the laser beam object obj is within the refractor. If the decision result is "YES", then the process goes to step S170. However, the process goes to step S171 if the decision result is "NO".

In step S170, the variable setting means $1h$ substitutes x2, y2, and vj2 into x0, y0, and vj0, respectively, so that the coordinates (x2, y2) indicate the new location of the leading end of the laser beam object obj.

In step S171, the variable setting means $1h$ substitutes x2, y2, and vj2 into x1, y1, and vj1, respectively, so that the coordinates (x2, y2) indicate the new location of the tailing end of the laser beam object obj.

If the decision result in step S156 is "NO", then the process goes to step S165. In this step S172 the variable setting means $1h$ acquires the ground hitting code J at the coordinates (x2, y2), and substitutes it into vj2.

In step S173, the decision means $1h$ determines whether the variable vj2 indicates that the part between the trailing end and the center point of the laser beam object obj is within the refractor. If the decision result is "YES", then the process goes to step S174. However, the process goes to step S175 if the decision result is "NO".

In step S174, the variable setting means $1h$ substitutes x2, y2, and vj2 into x1, y1, and vj1, respectively, so that the coordinates (x2, y2) indicate the new location of the tailing end of the laser beam object obj.

In step S175, the variable setting means $1h$ substitutes x2, y2, and vj2 into x0, y0, and vj0, respectively, so that the coordinates (x2, y2) indicate the new location of the leading end of the laser beam object obj.

As described above, the present embodiment can be applied to a shooting game or another action game in which a laser beam is shot by a player character operated by a player toward a character operated by an enemy player or a CPU. If the laser beam hits the enemy character, the enemy character is deleted. In this game system according to the present embodiment, when a laser beam is in a special condition, as in the case where it is incident on a refractor, the laser beam is refracted in the representation on the screen thereby providing a greater amount of visual change in the image thus providing a more attractive game.

Change in the Ground Shape

H. Concept of the Change in the Ground Shape

FIG. 15 illustrates the concept of a change in the ground shape.

In the conventional shooting game, the ground shape data and the associated hit data are fixed. Unlike such a conventional system, the present embodiment allows the ground shape data to be changed in real time during the game. Introduction of waving into the ground shape or a change in the ground shape in response to the external force imposed by a player or an enemy character makes the game more attractive and exciting. The ground shape is freely changed in the hardness, waving period, waving width, etc., for each graphical unit, and the angle data is acquired. Depending on the capability of the processor used, the parameters and the set levels may be increased so that the shape is changed more quickly.

Figure 15A:
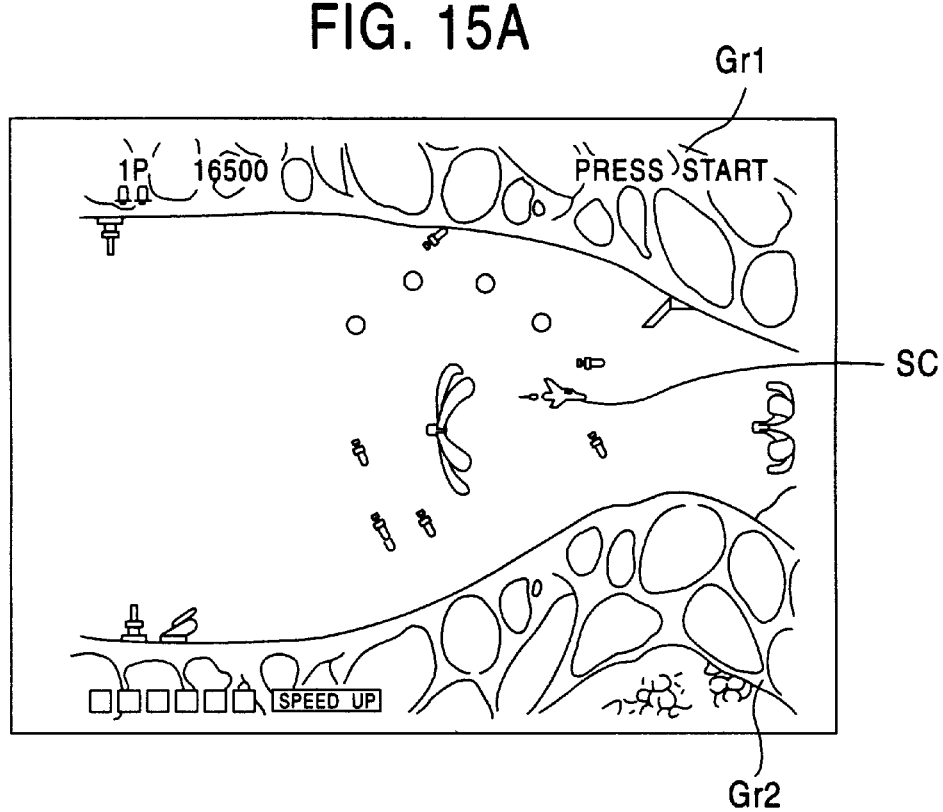
FIG. 15 is a flow chart illustrating the concept of the representation of a change in the ground shape.
Figure 15B:
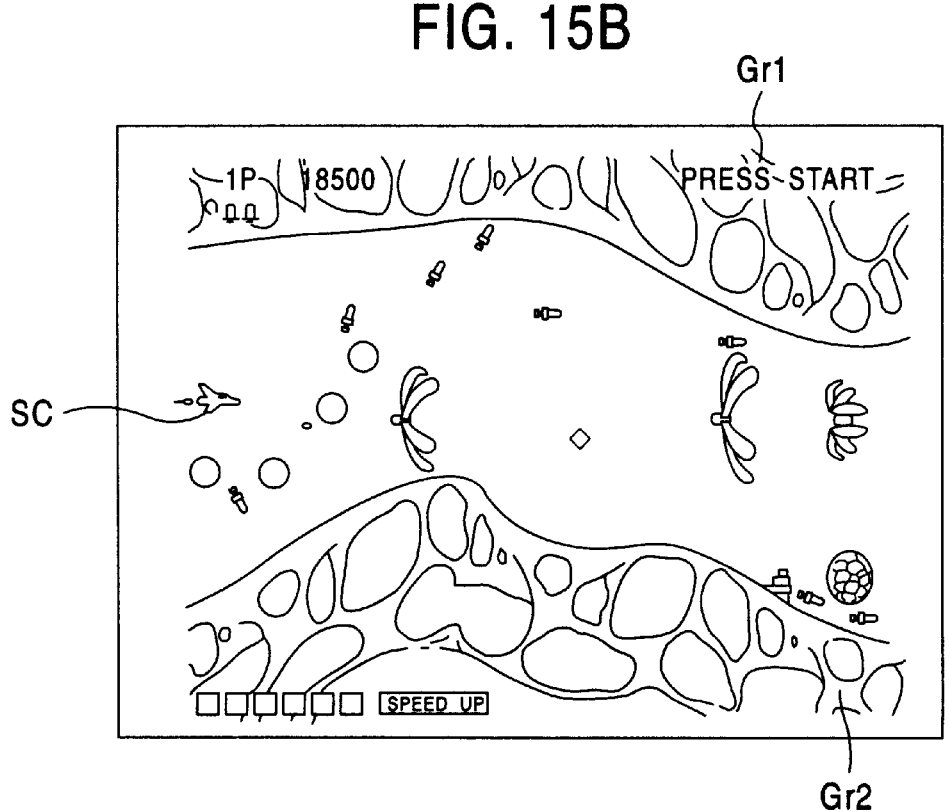
Figure 16:
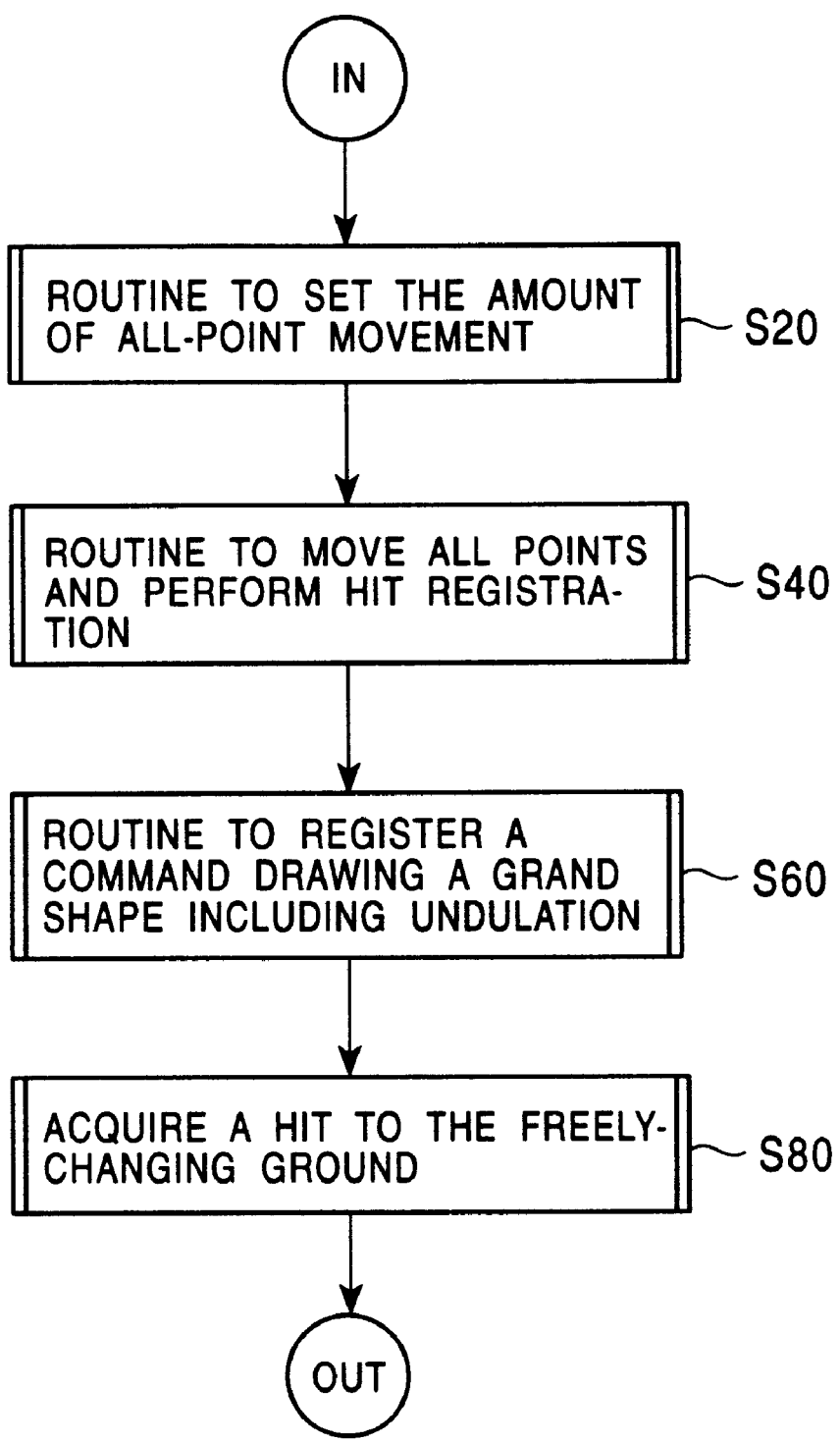
FIG. 16 is a flow chart illustrating the gound shape changing routine.

As shown in FIGS. 15A and 15B, when the player character SC is advanced in the forward direction (to right in this specific example) in response to the operation of the player and the background is also scrolled in the forward direction, wall images Gr1 and Gr2, whose shape changes quickly from a location to another, for example, every N frames, as is the case from FIG. 15A to FIG. 15B, are displayed at the upper and lower positions in the screen. This gives the player the illusion that the walls Gr1 and Gr2 at the upper and lower locations of the screen are waving. If the player character SC comes into contact with the upper or lower wall Gr1 or Gr2, the life of the player character decreases. Thus, the player has to operate the cursor keys of the controller 92 so that the player character SC does not come into contact with the walls Gr1 and Gr2.

In the following description, it is assumed that data used in the calculation and in the displaying process includes N points which are connected to each other in the form of a bidirectional list. The sequence of points are disposed along the boundary face of the upper and lower walls Gr1 and Gr2. In the bidirectional list including for example data A to D, data A consists of data A itself and data pointing to the location of data B, data B consists of data B itself, data pointing to the location of data C, and data pointing to the location of data A, data C consists of data C itself, data pointing to the location of data D, and data pointing to the location of data D, and data D consists of data D itself, data pointing to the location of data C, and data "0" indicating the tail of the list. That is, in the bidirectional list, data is connected in a data-to-data fashion. In the above list, if the data B does not include data indicating the location of data A, data C does not include data indicating the location of data B, and data D does not include data indicating the location of data C, then the result is an one-way list.

Herein, points P connected to each other by means of a list are represented by "root" and "next". At the end of the list, there is a 0. The minimum block used in drawing an image is assumed to have a height H and a width W. Now the ground shape changing process is described below referring to FIGS. 16 to 21.

I. Process in the Ground Shape Changing Routine

FIGS. 16 to 21 are flow charts illustrating the process of the ground shape changing routine.

The ground shape changing routine consists of steps S20, S40, S60, and S80.

In step S20, an all-point moving amount setting routine is performed. Herein, "all points" refers to all points constituting the walls Gr1 and Gr2 shown in FIGS. 15A and 15B.

In step S40, an all-point moving routine and a registration routine are performed.

Step S60 performs a routine in which a drawing command for drawing a waving image is generated on the basis of a sequence of points and the command is registered.

Step S80 performs a routine in which a hit with a freely changing shape is acquired. These routines are described in further detail below.

Figure 17:
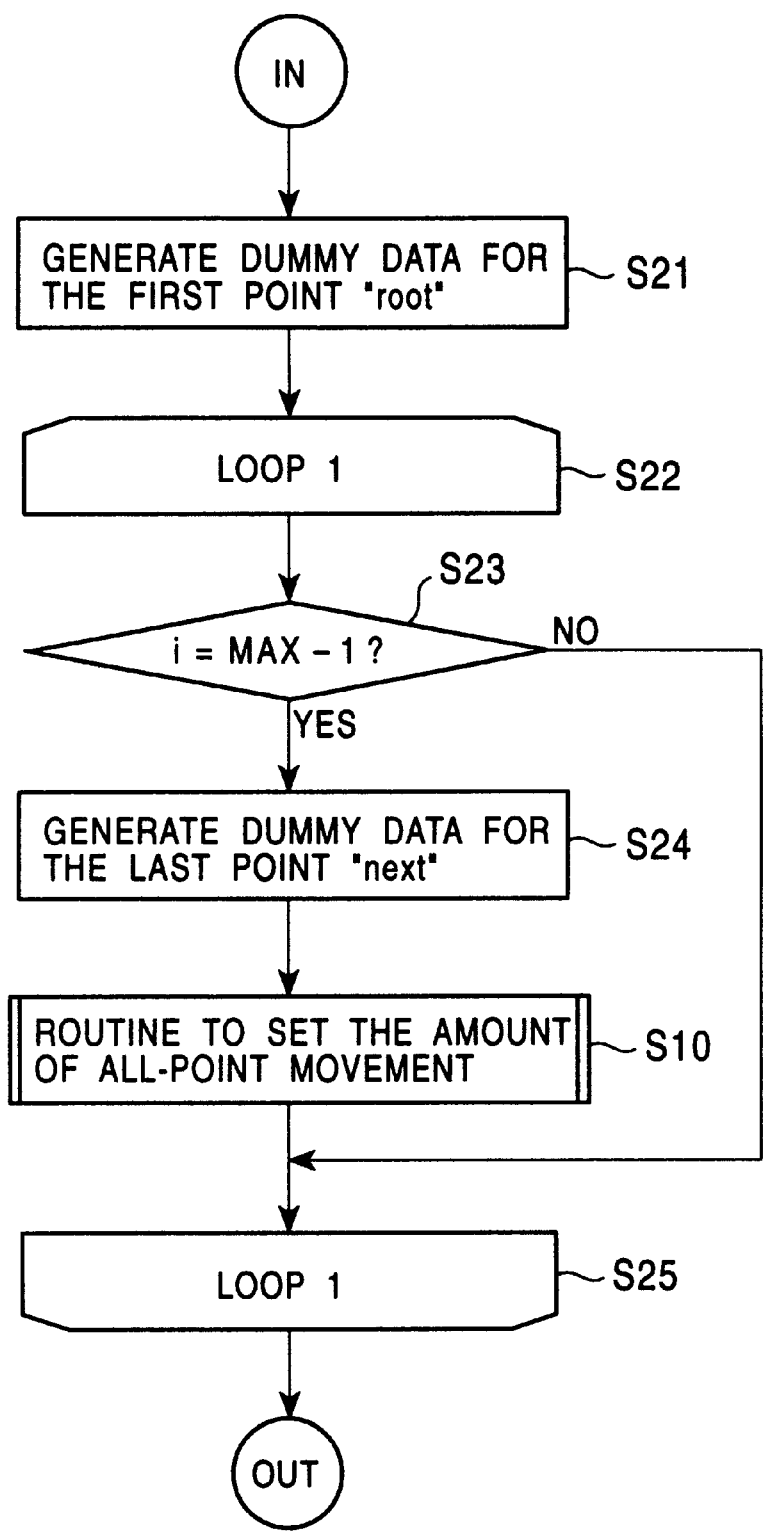
FIG. 17 is a flow chart illustrating the gound shape changing routine.
Figure 18:
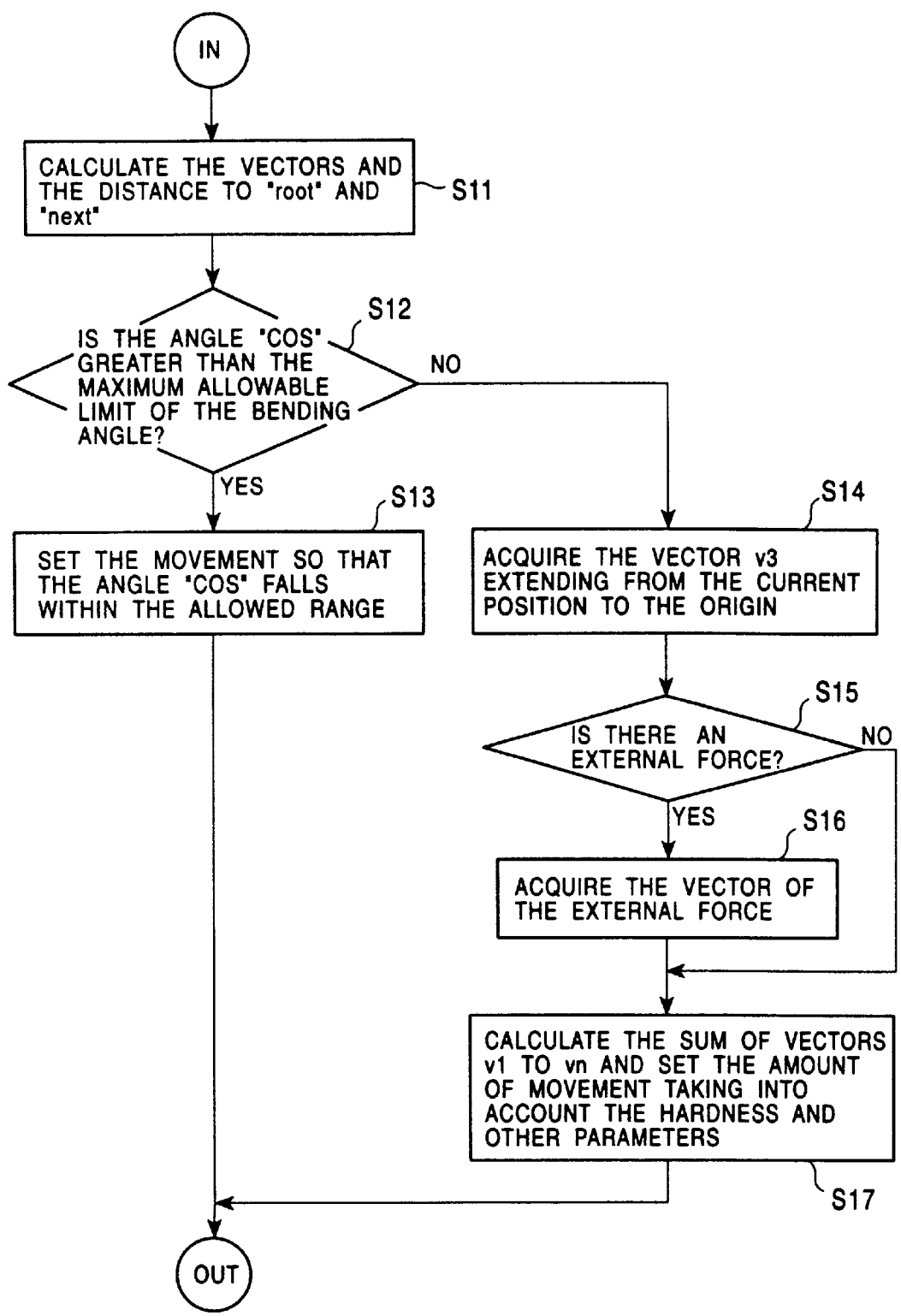
FIG. 18 is a flow chart illustrating the gound shape changing routine.

FIG. 17 is a flow chart illustrating the all-point moving amount setting routine. FIG. 18 is a flow chart illustrating a particular part of the flow chart shown in FIG. 17.

In step S21, dummy data generating means ls generates dummy data associated with the first point "root".

Subsequently, in steps S22 and S25, steps S23, S24, S10, and S25 are performed repeatedly as many times as predetermined (loop 1). For example, each time the sequence of above steps is performed, variable i is incremented by 1, and the sequence is repeated until the variable i becomes equal to the maximum value MAX−1. Herein, the maximum value MAX is the number of sets of points displayed on the screen at that time.

In step S23, the decision means 1h determines whether i=MAX−1. If the decision result is "YES", then the process goes to step S24. However, the process goes to step S10 if the decision result is "NO".

In step S24, the dummy data generating means is generates dummy data associated with the last point "next".

In step S10, each-point moving amount setting routine is performed.

Referring now to FIG. 18, the process of the each-point moving amount setting routine is described.

In step S11, vector acquisition means 1t calculates the vector v1 and distance d1 from point p to point "root" and also the vector v2 and the distance d2 from point p to point "next".

In step S12, the decision means 1h determines whether COS of the angle between the vectors v1 and v2 is greater than the upper allowable limit of the bending angle. If the decision result is "YES", then the process goes to step S13. However, the process goes to step S12 if the decision result is "NO".

In step S13, the variable setting means 1h adjust the amount of shift so that the COS of the above-described angle falls within the allowable range.

In step S14, The vector acquisition means 1t acquires the vector v3 from the current location to the origin in the state including no waving. If this vector v4 is changed with time, then a visual representation of waving can be achieved.

In step S15, the decision means 1h determines whether there is an external force. If the decision result is "YES", then the process goes to step S16. However, the process goes to step S17 if the decision result is "NO". Herein the location of the external force is denoted by a point, and the magnitude of the force is denoted by the distance. The external force refers to a force which originates not from the ground shape but from other factors. An example of the external force is a force generated by a particular character by putting the ground shape. In this example, the ground shape may be deformed by that external force. In this example, if the pulling force is large, then the force has a large distance. In other words, the magnitude of the pulling force is represented by the distance.

In step S16, the vector acquisition means it acquires the vectors v4, v5, . . . , etc., of the external forces.

In step S17, the calculation means 1h calculates the sum of vectors v1 to vn. The calculation means 1h adds other parameters associated with for example the hardness and sets the amount of shift.

The calculation of the sum of the vectors v1 to vn is based on the following concept. For example, when a certain point is drawn by a plurality of elastic braids connected to that point, the direction in which the elastic braids move at a certain time is determined by the vector sum of all forces created by the pulling forces of the elastic braids. This direction is determined by the sum of the vectors v1 to vn.

Figure 19:
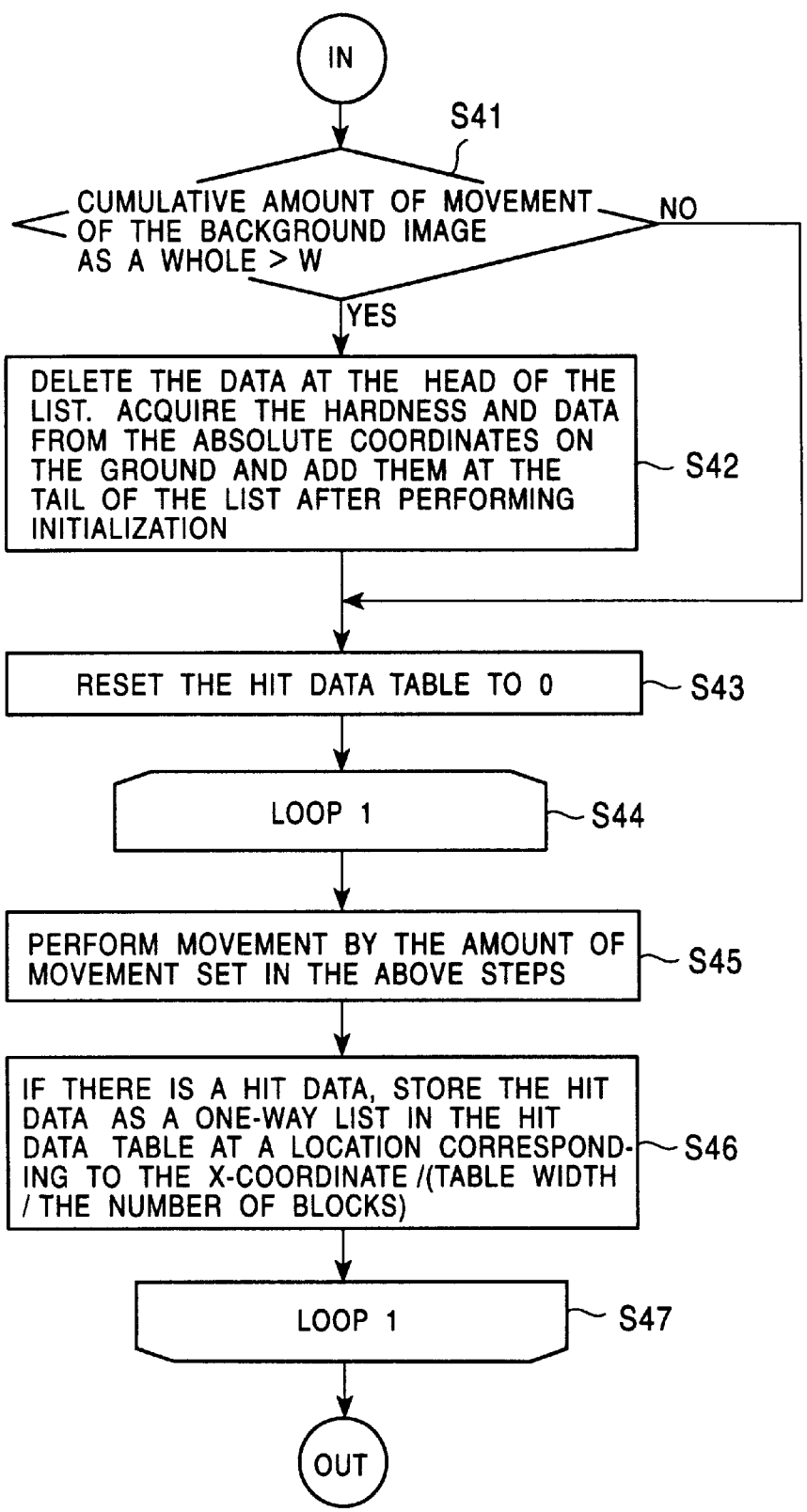
FIG. 19 is a flow chart illustrating the gound shape changing routine.

Now referring to FIG. 19, the all-point moving and hit registration routines are described below.

In step S41, the decision means 1h determines whether the cumulative amount of shift of the background image is greater than the horizontal width W of the minimum units constituting the ground shape. If the decision result is "YES", then the process goes to step S42. However, the process goes to step S43, if the decision result is "NO".

In step S42, the data registration means 1v removes the data at the head of the list. The data registration means 1v then acquires the data associated with the hardness or the like from the absolute co-ordinates of the ground shape and registers it at the tail of the list after making initialization.

In step S43, the data registration means 1v resets the hit data table to 0.

Steps S44 and S47 cause steps S44, S45, S46, and S47 to be performed repeatedly as many times as predetermined (loop 1). For example, each time the above sequence of steps is executed, the variable i is incremented by 1 and the sequence is repeated until the variable i becomes equal to the maximum value MAX−1.

In step S45, the drawing command issuing means 1h issues a drawing command to the drawing processor 10 to draw an image in accordance with the designated amount of shift. In response to the drawing command, the drawing processor 10 writes ground shape data at a new location of the buffer 11 so that the ground shape image is displayed at the new location on the screen of the television monitor 12. Herein, the visually perceptive direction of the motion is coincident with the direction of the sum of vectors v1 to vn calculated in step S17.

In step S46, if the data registration means 1v includes hit data, the data registration means 1v registers the hit data in the form of an one-way list at the location given by (X coordinate of the hit table)/(width of the table/number of blocks). In the case where point "root" and point p are located across a block, the hit data is registered at both locations.

The block is described below. The blocks are produced for the purpose of judging a hit between the player character SC and the walls Gr1 and Gr2. Blocks are created by dividing the screen into two equal regions located on the left and right sides of the screen. For example, an area from 0 to 5 in distance is taken as a block A, and an area from 6 to 10 in distance is taken as a block B. Furthermore, let us create an area C on the blocks A and B. If the left end of the area C is apart from the left end of the block A by a distance of 1, then the right end of the area C comes to the location apart from the left end of the block A by a distance of 4. In this case, both ends of the area C are within the same block A, thus the area C is registered in the block A. On the other hand, in the case where the left end of the area C is apart from the left end of the block A by a distance 3, the right end of the area C is apart from the left end of the block A by a distance of 6, that is, apart from the left end of the block B by a distance of 1. In this case, the area C is located across the boundary of two blocks A and B. In this case, thus, the area C is registered in both blocks A and B.

Figure 20:
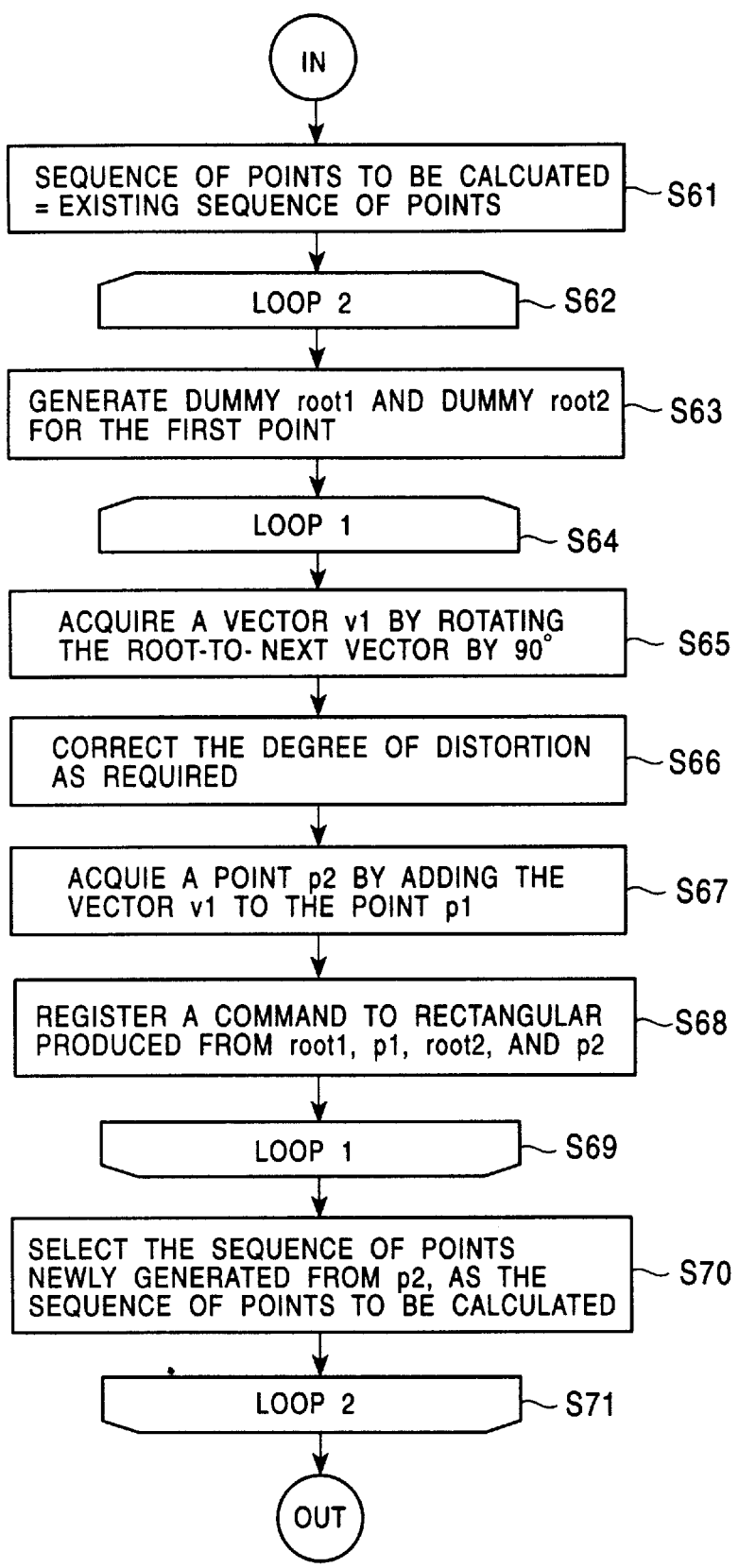
FIG. 20 is a flow chart illustrating the gound shape changing routine.

Referring to FIG. 20, the routine of registering a drawing command for drawing a waving image.

In step S61, the variable setting means 1h takes a sequence of points, which is used in another routine, as a calculation sequence of points.

Steps S62 and S71 cause steps S62 to S70 to be performed repeatedly as many times as predetermined (loop 2). For example, each time the above sequence of steps is executed, the variable i is incremented by 1 and the sequence is repeated until the variable i becomes equal to the maximum value MAX−1. Steps S64 and S69 cause steps S65 to S68 to be performed repeatedly as many times as predetermined (loop 1). For example, each time the above sequence of steps is executed, the variable i is incremented by 1 and the sequence is repeated until the variable i becomes equal to the maximum value MAX−1.

In step S63, the dummy data generating means 1s generates dummy root1 and root2 for the first point.

In step S65, the vector acquisition means 1t acquires a vector v1 by performing 90° rotation on the vector from point "root" to point "next". The starting point of the vector v1 is point p1 defined by the variable i.

In step S66, distortion correcting means 1u corrects distortion as required. If the vector v1 is directly used to draw a ground shape, there is a possibility that the resultant ground shape includes a cross due to a great amount of distortion. To avoid introduction of such a cross into the ground shape, the vector v1 is corrected.

In step S67, the variable setting means 1h creates point p2 by adding the vector v1 to point p1.

In step S68, the data registration means 1v registers a drawing command used to draw a quadrangle defined by root1, p1, root2, and p2.

In step S70, the variable setting means 1h takes a sequence of points newly generated from p2 and other points as the calculation sequence of points.

Figure 21:
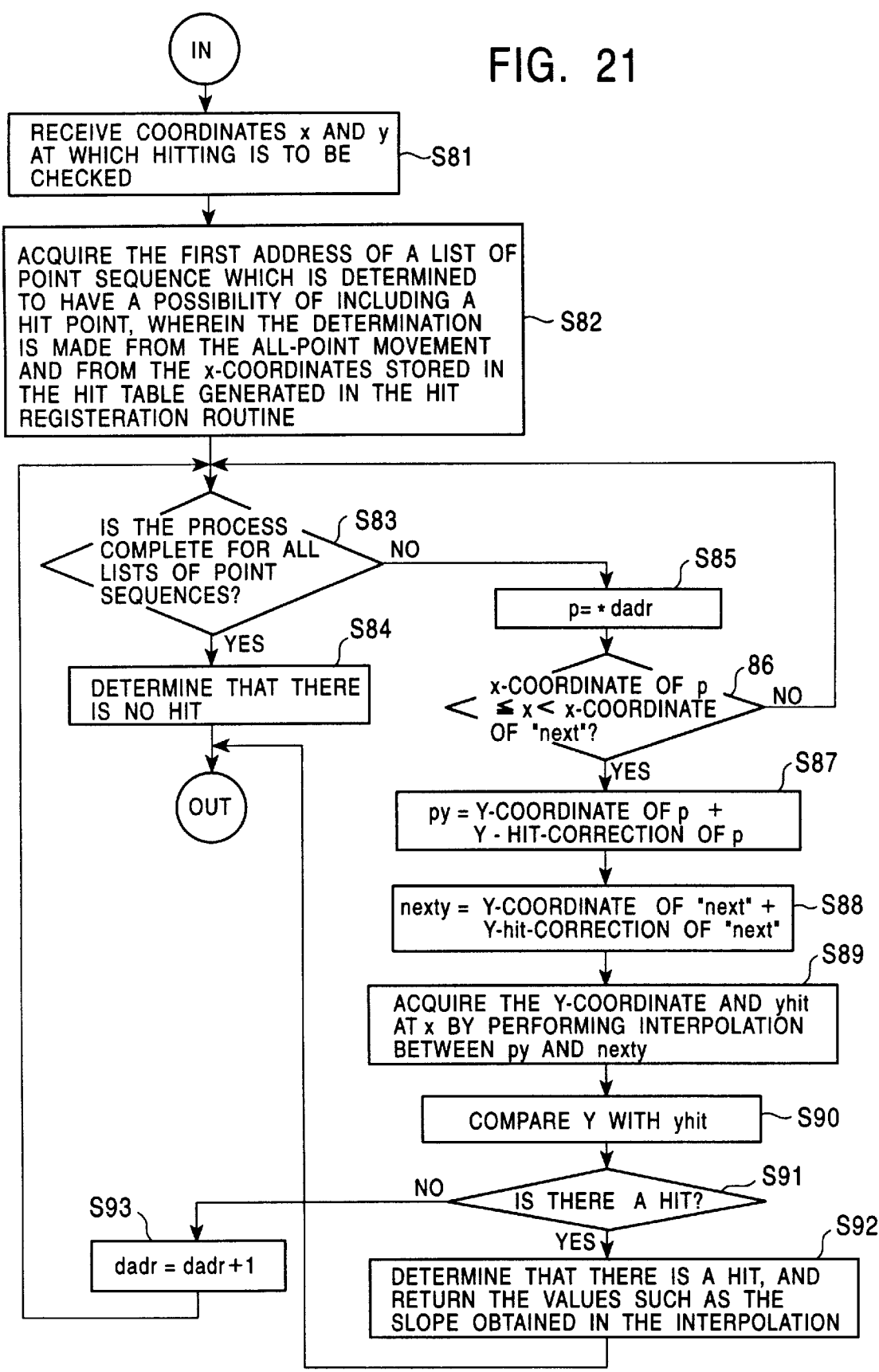
FIG. 21 is a flow chart illustrating the gound shape changing routine.

Referring now to FIG. 21, the routine for acquiring a hit with a freely changing ground shape.

In step S81, the address acquisition means 1w acquires the x and y coordinates of the point which is to be examined in terms of hitting.

In step S82, the address acquisition means 1w acquires the address dadr of the head of the list of the point sequence which has a possibility of hitting on the basis of the X coordinate indicated in the hit table in which the data was registered in the all-point moving and registration routines.

In step S83, the decision means 1h determines whether the process is completed for all lists of point sequences. If the decision result is "YES", then the process goes to step S84, while the process goes to step S85 if the result is "NO".

In step S84, the variable setting means 1h sets data indicating there is no hit into the variable indicating whether there is a hit or not.

In step S85, the variable setting means 1h substitutes *dadr acquired into the variable p. Herein *dadr is data of information dadr indicating the location of data of the point.

In step S86, the decision means 1h determines whether x is equal to or greater than the xcoordinate of p and less than the x coordinate of "next". If "YES", then the process goes to step S87, while the process again goes to step S83 if the decision result is "NO".

In step S87, the calculation means 1h adds the Y coordinate of p to the hitting Y-correction value of p, and substitutes the result into py. Herein the Y-correction value is used to define irregularities of the ground image.

In step S88, the calculation means 1h adds the Y coordinate of "next" to the hitting Y-correction value of "next", and substitutes the result into nexty.

In step S89, the interpolation means 1x performs linear interpolation in terms of the segment between py and nexty, and determine the Y coordinate yhit of the point at x.

In step S90, the calculation means 1h compared y and yhit.

In step S91, the decision means 1h determines whether there is a hit on the basis of the result of comparison between y and yhit. If the decision result is "YES", then the process goes to step S92, while process goes to step S93 if the decision result is "NO".

In step S92, the variable setting means 1h returns the result of the hit judgement, the type, and the gradient obtained in the interpolation process, which is performed as required, to the caller of the hit routine. In the above process, the linear interpolation refers to the process of calculating the coordinates of points between two given points on the assumption that the two points are connected by a straight line.

In the shooting game or action game of the horizontal scrolling type according to the present embodiment, as described above, the shape of the upper and lower ground is varied for example frame by frame thereby realizing the motion of the grand on the screen, thus providing a more exciting game.

Representation of Gravitational Force in the Horizontal Direction

Figure 22A:
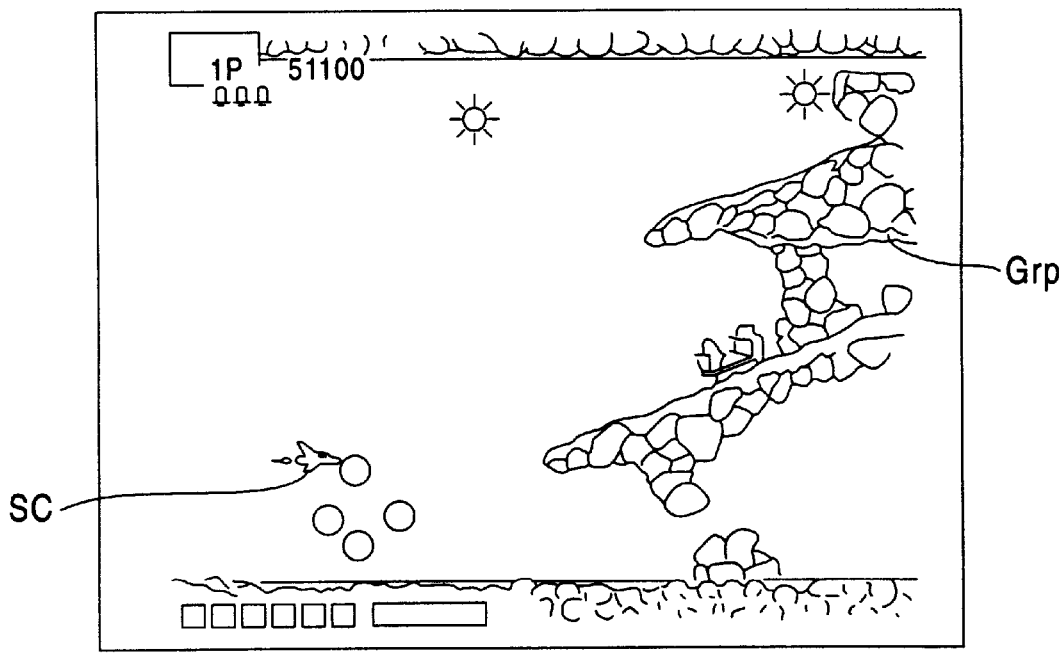
FIG. 22 is a schematic diagram illustrating the representation of a horizontal gravitational force.
Figure 22B:
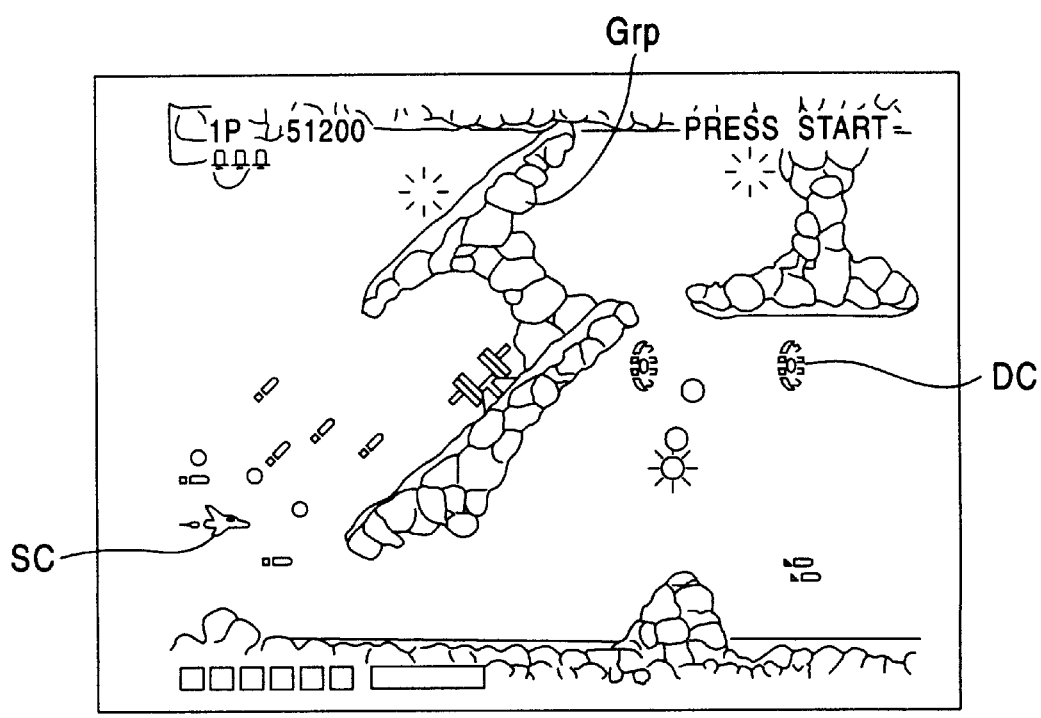
Figure 24:
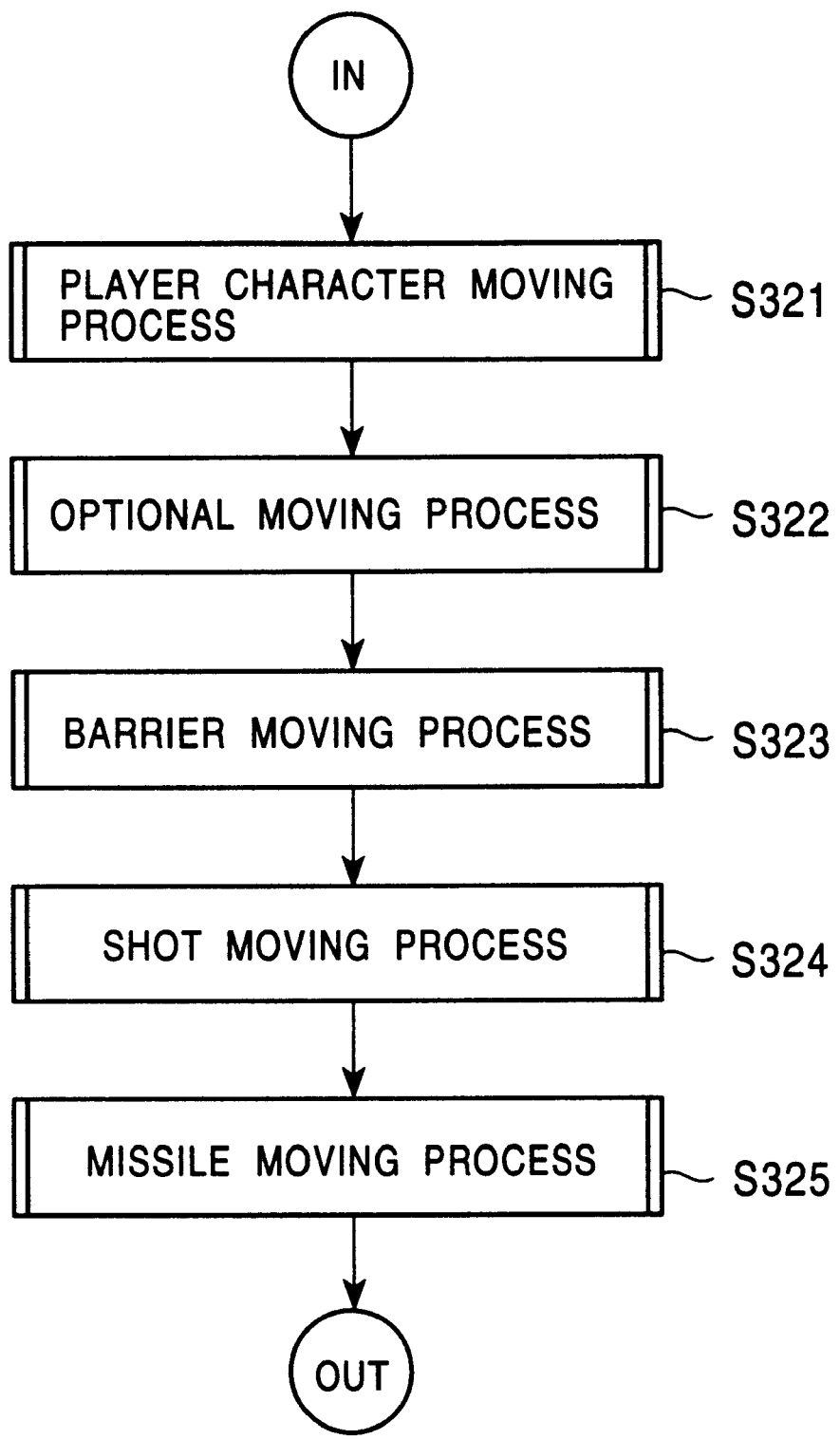
FIG. 24 is a flow chart illustrating the horizontal gravitational force reprentating routine.

J. Concept of the Representation of Gravitational Force in the Horizontal Direction FIG. 22 is a schematic diagram illustrating the representation of a gravitational force in the horizontal direction.

For example in a shooting game in which horizontal scrolling is employed, a player character SC is moved to right on the screen and shooting is performed in response to the operation of the controller 92 performed by the player. The present embodiment may be used to introduce a gravitational force into such a game so that the player character is attracted by the force in a direction opposite to the scrolling direction. In the game in which such a force is introduced, the player has to operate the controller 92 so that the player character SC is not attracted in the backward direction and so that the player character SC does not collide with other objects such as pieces of collapsed wall and enemy characters DC which are moving in the backward direction due to the attracting force. Compared to the conventional game in which the player character SC is simply moved to right while performing shooting, the game according to the present embodiment is much more exciting. In the present embodiment, of a plurality of game stages, a gravitational force due to a black hole is introduced in one or more stages. The black hole is placed at a location outside the screen area in the horizontal direction and at a middle of the screen area in the vertical direction. The black hole causes the velocity of the player character to be reduced by gravitational acceleration GRAVITYx. Because the coordinate system is defined such that the direction from right to left and the direction from down to up are negative and the direction from left to right and the direction from up to down are positive, the black hole located at the above-described position causes the velocity of characters moving from left to right to be reduced by GRAVITYx. As a result, those characters move to right at reduced velocity. On the other hand, characters moving from right to left become higher in velocity by a gravitational acceleration GRAVITYx. Therefore, those characters move to left at increased velocity. Furthermore, because the location of black hole as for the vertical direction is at the center of the screen area, the velocity of characters moving apart from the center line of the screen area is reduced by a gravitational acceleration GRAVITYx, and thus those characters move at reduced velocity. On the other hand, the velocity of characters moving toward the center line is increased by GRAVITYx, and thus those characters move at increased velocity. Referring to FIGS. 23 to 26, representation of gravitational force in the horizontal direction is described below.

K. Process of Horizontal Gravitational Force Representing Routine

FIGS. 23 to 26 are flow charts illustrating the process of the horizontal gravitational force representing routine.

In step S300, the background scrolling means 1j scrolls the background image by successively designating the background image and its location frame by frame. The drawing command issuing means 1h issues a drawing command depending on the type of the background image and its location on the screen and send the command to the drawing processor 10. In accordance with the received drawing command, the drawing processor 10 produces a background image in the memory space of the buffer 11 so that the image on the screen of the television monitor 12 is scrolled.

In step S301 the variable setting means 1h substitutes the current value of the gravitational acceleration into the system variable GRAVITYx in the process of calculating the gravitational force of the black hole.

In step S320, the player character moving routine is performed.

In step S340, the enemy character moving routine is performed.

In step S302, other processes are performed.

In step S303, the next interruption routine is performed. The player character moving routine is described below.

In step S321, the process of moving a player character SC is performed.

In step S322, an optional character moving process is performed.

In step S323, a barrier moving process is performed.

In step S324, a bullet moving process is performed.

In step S325, a missile moving routine is performed.

In the above processes, the optional character, barrier, and bullet are all associated with the player character SC wherein the barrier is used to protect the player character SC from bullets and the bullet is shot by the player character. The moving process in steps S321 to S322 is performed as follows. In response to the operation of the controller 92 performed by the player to move the player character SC on the screen, the drawing command issuing means 1h successively issues drawing commands for example frame by frame to the drawing processor 10 to move the image of the player character SC by the amount designated by the player. Furthermore, the drawing command issuing means 1h also issues drawing commands for example frame by frame to the drawing processor 10 to move the locations of the optical image, the image of the barrier, and the image of the bullet. In response to these drawing commands, the drawing processor 10 produces images in the memory space of the buffer 11 so that the images of the above-described characters are displayed on the screen of the television monitor 12, at locations which are different frame by frame thereby giving the player the illusion that the images of the respective characters move. In the present embodiment, steps S321 to S324 include no effect of gravitational force imposed on the player character SC. As for the motion of missiles, they move independently of other characters in accordance with the velocity data preset for the respective missiles.

Figure 25:
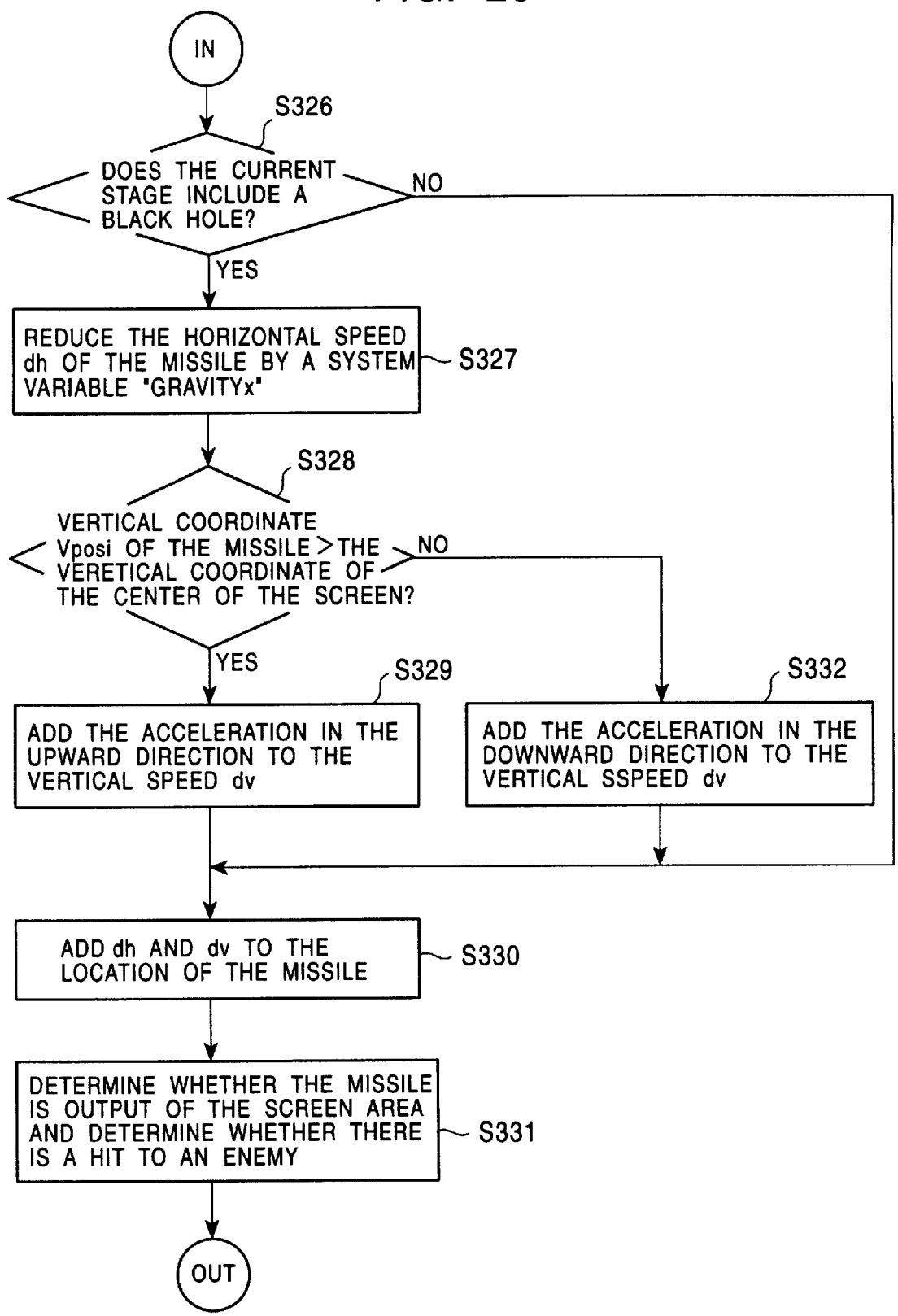
FIG. 25 is a flow chart illustrating the horizontal gravitational force reprentating routine.

Referring to FIG. 25, the process of missile moving routine is described below.

In step S326, the decision means $1h$ determines whether the current stage includes a black hole. If the decision result is "YES", then the process goes to step S327. However, the process goes to step S232 if the decision result is "NO".

In step S327, the calculation means $1h$ decrements the horizontal velocity dh of the missile by an amount equal to the G system variable GRAVITYx. The relationship between the gravitational force and characters (often including a piece of broken wall) is described below. The coordinate system on the screen is defined such that the direction from right to left and the direction from down to up are negative and the direction from left to right and the direction from up to down are positive. The gravitational acceleration GRAVITYx is a variable which can take a value equal to or greater than 0. Therefore, if the gravitational acceleration GRAVITYx is subtracted from the horizontal velocity of the respective characters, then characters moving to right become lower in velocity while characters moving to left become higher in velocity.

As described earlier, the black hole is placed at a location such that its horizontal coordinate is outside the screen area while its vertical coordinate is at the center of the screen. Therefore, the motion of characters whose vertical location moves apart from the center of the screen is affected by the vertical gravitational acceleration (directed toward the horizontal center line of the screen). The effect of the vertical gravitational acceleration becomes greater as the location of characters becomes farther away from the center of the screen.

In step S328, the decision means $1h$ determines whether the vertical coordinate Vposi of the missile is greater than the vertical coordinated of the center point of the screen. If the decision result is "YES", then the process goes to step S329. However, the process goes to step S322 if the decision result is "NO".

In step S329, the calculation means $1h$ adds the upward acceleration to the vertical velocity dv.

In step S330, the calculation means $1h$ adds dh and dv to the missile locations.

In step S331, the decision means $1h$ determines whether the missile is outside the screen area and makes a judgement of a hit with an enemy. The decision as to whether the missile is outside the screen area is described in further detail below (the manner of the decision as to whether an enemy character is outside the screen area is similar). If the location of the player's missile or enemies, which is indicated by the location data, becomes outside the screen area, the image of the missile or enemies disappears from the screen. However, the data associated with such a character still remains in the memory space of the buffer 11. Such data can cause the memory space of the buffer 11 to become full. Such a problem can be avoided by performing the above-described judgement.

In step S332, the calculation means $1h$ adds the downward acceleration to the vertical velocity dv.

Figure 26:
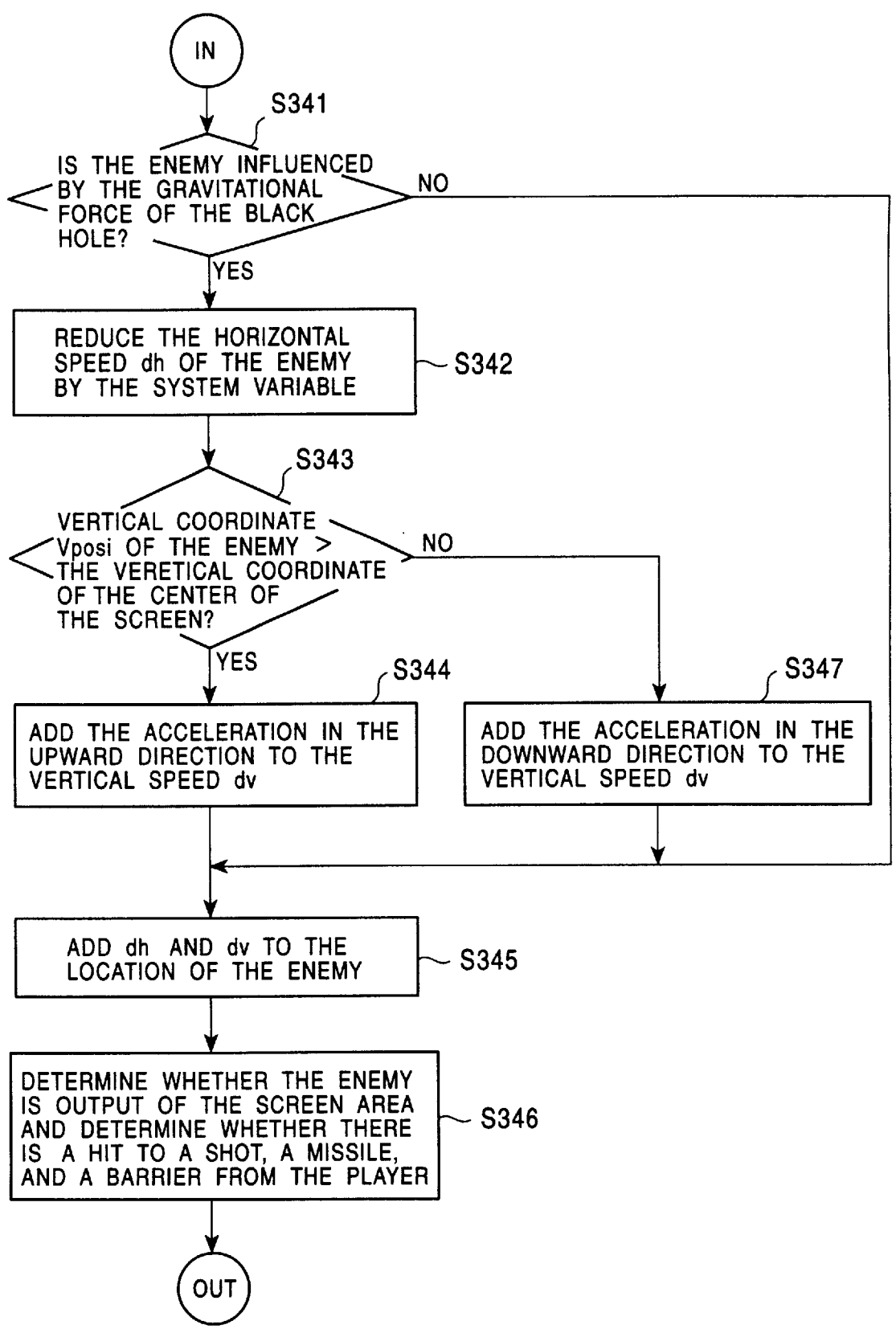
FIG. 26 is a flow chart illustrating the horizontal gravitational force reprentating routine.

Referring now to FIG. 26, the enemy character moving routine is described below.

In step S341, the decision means $1d$ determines whether the enemy character DC is affected by the black hole on the basis of the value of the variable assigned to the particular character. If the decision result is "YES", then the process goes to step S342. However, the process goes to step S345 if the decision result is "NO". In the above decision step, the variable has a value indicating whether the character is affected by the gravitational force. The gravitational force is calculated only when the value indicates that the character is affected by the gravitational force.

In step S342, the calculation means $1h$ subtracts the system variable GRAVITYx from the horizontal velocity dh of the enemy.

In step S343, the decision means $1h$ determines whether the vertical coordinate Vposi of the enemy character DC is greater than the vertical coordinate of the center point of the screen. If the decision result is "YES", then the process goes to step S344. However, the process goes to step S347 if the decision result is "NO".

In step S344, the calculation means $1h$ adds the upward acceleration to the vertical velocity dv.

In step S345, the calculation means $1h$ adds dh and dv to the location of the enemy character DC.

In step S346, the decision means $1h$ determines whether the enemy character is outside the screen area and makes a judgement of hits with bullets and missiles shot by the player character SC and also with the barrier of the player character SC.

In step S347, the calculation means $1h$ adds the downward acceleration to the vertical velocity dv. In the shooting game or action game of the horizontal scrolling type according to the present embodiment, as described above, there is provided a gravitational force imposed in a direction opposite to the traveling direction of the player character SC thereby providing a more exciting game in which the player has to, in addition to the simple operation for deleting enemy characters DC, avoid various objects approaching the player character accelerated by the gravitational force and also has to move the player character such that it is not attracted backward or toward the center of the screen area.

Gauge Edit

L. Concept of Gauge Edit (FIGS. 27–29)

Figure 27A:
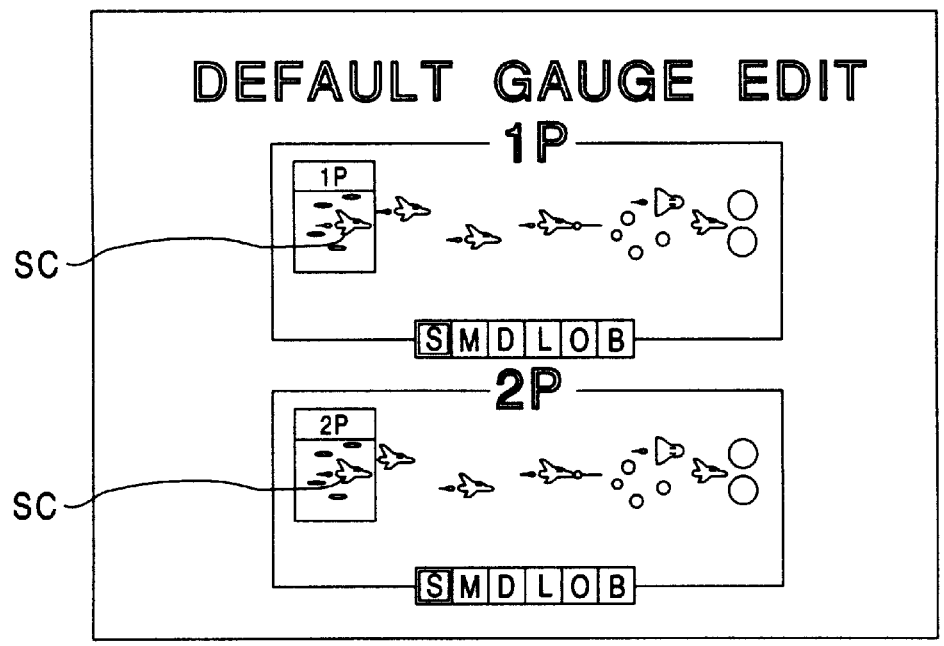
FIG. 27 is a schematic diagrams illustrating the concept of gauge edit.
Figure 27B:
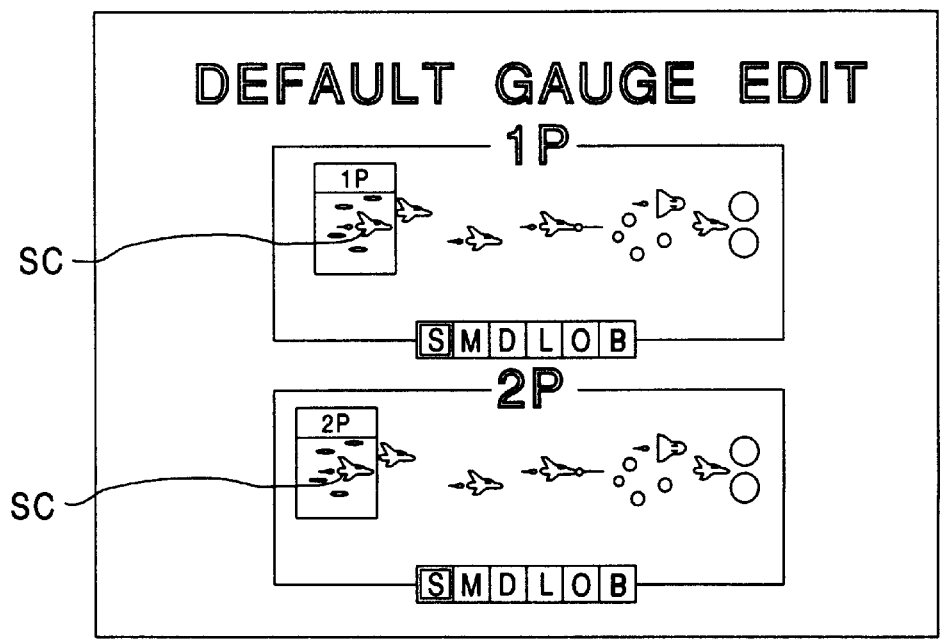
Figure 28A:
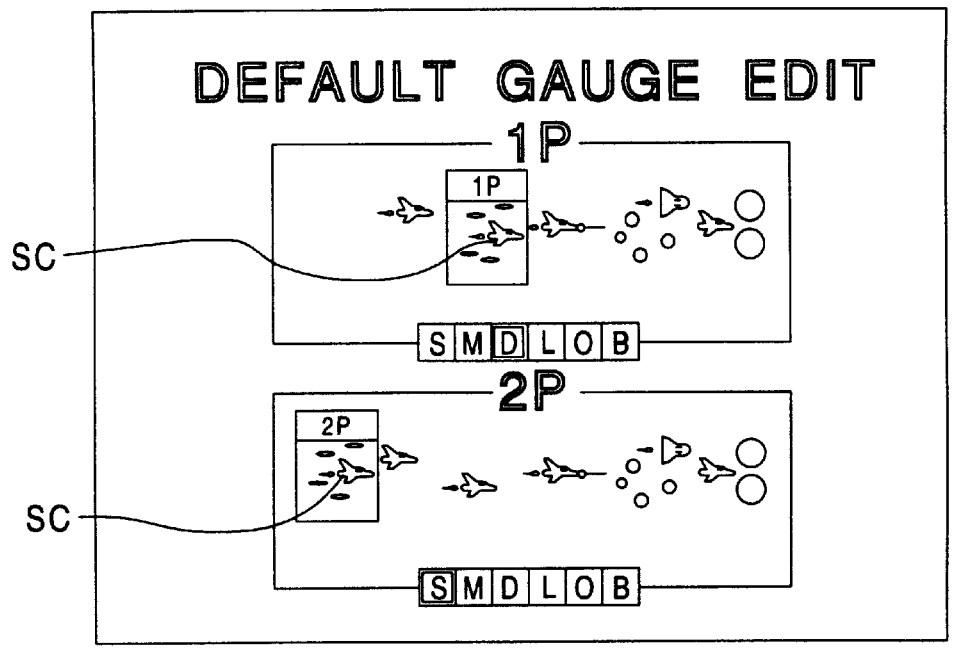
FIG. 28 is a schematic diagrams illustrating the concept of gauge edit.

FIGS. 27 to 29 are schematic diagrams illustrating the concept of gauge edit. Herein the concept of the gauge edit is described by way of example for a shooting game in which in response to the operation of the controller 92 performed by a player, laser beams and missiles are shot by a player character SC toward enemy characters to reduce the life value of the enemy characters thereby finally deleting them. In the game, when a particular enemy character is deleted, a capsule item appears in the game space. When the player gets such a capsule item, the player can increase the power of the player character SC by pressing a particular button of the controller 92 thereby adding a desired power-up item such as a barrier, bullet, etc., assigned depending on the number of obtained capsule items. That is, the power-up item varies depending on the number of obtained capsule items. For example, when the number of obtained capsule items is 3, the power-up item may be a barrier.

For the purpose of adding the power-up items, there is provided a selection menu (hereinafter referred to as a power-up gauge) as shown at the bottom of FIG. 29. The power-up gauge is, as shown in FIG. 29, divided into six areas, wherein numbers of capsule items, such as 1, 2, 3, 4, 5, and 6, are assigned to the respective areas. When the player gets capsule items during the game, the particular area corresponding to the number of obtained capsule items is highlighted. If the player presses a particular button, the power-up item assigned to the highlighted area is added to the player character.

The areas of the power-up gauge have alphabetic labels such as "S", "M", "D", "L", "O", and "B", respectively. On the right side of the gauge, there is an indication area including a string "SPEED UP". The area "S" is surrounded by a double-line frame which indicates that "S" is now selectable. This occurs when the player has obtained a particular number of capsule items corresponding to the area "S". The content of the area "S" is indicated as "SPEED UP" (which refers to increasing the moving velocity of the player character) in the indication area. If the player presses a particular button, this power-up item is added to the player character.

In the present embodiment, the relationship between the number of obtained capsule items and the power-up item can be defined before starting the game so that the new definition is reflected in the power-up gauge displayed during the game.

The process of defining the relationship between the number of obtained capsule items and the power-up item is herein referred to as gauge edit. The gauge edit can be performed either in the screen which is displayed before starting the game, or in the default gauge edit screen which can be opened through an optional screen. These two screens are different in the manner of ending the edit process.

The gauge edit is performed by the player as follows.

If the gauge edit is selected, the image shown in FIG. 27A appears on the screen. As shown in FIG. 27A, the gauge edit screen includes a first-player gauge edit window (labeled "1h" in FIG. 27A) and a second-player gauge edit window (labeled "2P" in FIG. 27A). In each window, images of power-up items to be added to the player character as well as the image of the player character SC are displayed. In this specific example, six power-up items are selectable in each window. A particular power-up item can be selected by moving a cursor with a right or left cursor key provided on the controller 92. One cursor (hereinafter referred to as an icon cursor) is provided in a small frame labeled "1h" in the first-player gauge edit window, and the other cursor is provided in a small frame labeled "2P" in the second-player gauge edit window. The images of the power-up items correspond to the respective areas "S", "M", "D", "L", "O", and "B" displayed at the bottom of each window. In this example, the icon cursors associated with the first and second players are both put on the power-up item on the extreme left side of each window thereby selecting it. The alphabetic mark "S" corresponding to this power-up item is highlighted at the bottom of each window. The operation of selecting the power-up items is described below.

1. In the gauge edit windows described above, if the first player puts the icon cursor on the power-up item on the extreme left side using the controller 92 thereby selecting it, and if the first player further presses a decision button, then the icon of that power-up item first moves upward at a speed which is preset to a value so that the player can recognize the motion of the icon. After that, as shown in FIG. 2B, the icon moves to a location which is shifted to right and down from the original location. Although not shown in the figure, the icon is semi-transparent and has an overlap with an adjacent icon (in this example, the second icon counted from the left). As described above, if the player selects a particular icon, then the icon moves first upward and then to a location shifted to right and down. This allows the player to recognize that the desired icon has been selected. When the icon is in a semi-transparent state and located at a position shifted to right and down, the user can understand that the icon has been selected and that it is possible to replace the icon with another icon. Hereinafter, this state is described as the "icon is held".

Figure 28B:
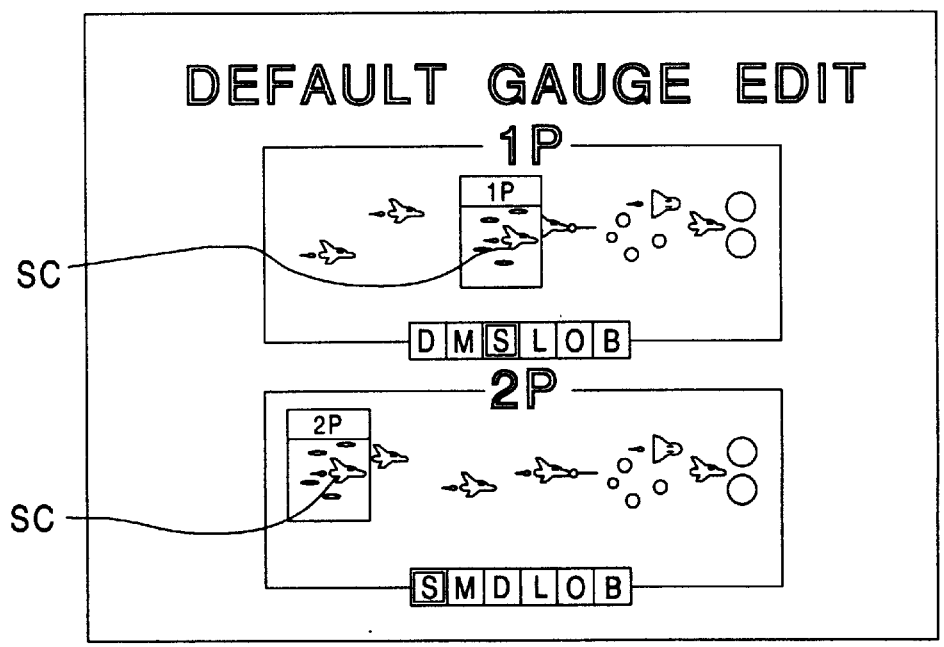

2. After the process described above, if for example the first player moves the currently-selected icon (the icon on the extreme left side in FIG. 27A) to an icon (the third from the left in this example) to be replaced by operating the cursor key of the controller 92, and if the first player presses the decision button, then the icon displayed on the extreme left side of the first-player window in FIG. 27A is replaced with the third icon, as shown in FIG. 28B.

Figure 29A:
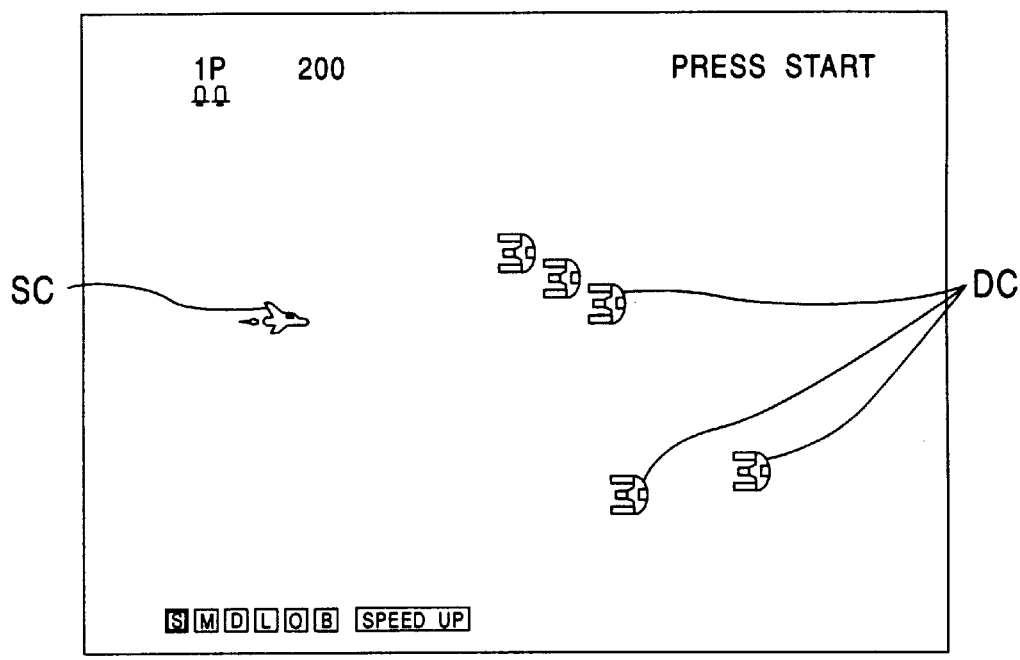
FIG. 29 is a schematic diagram illustrating the game screen image in which the result of the gauge edit is reflected.
Figure 29B:
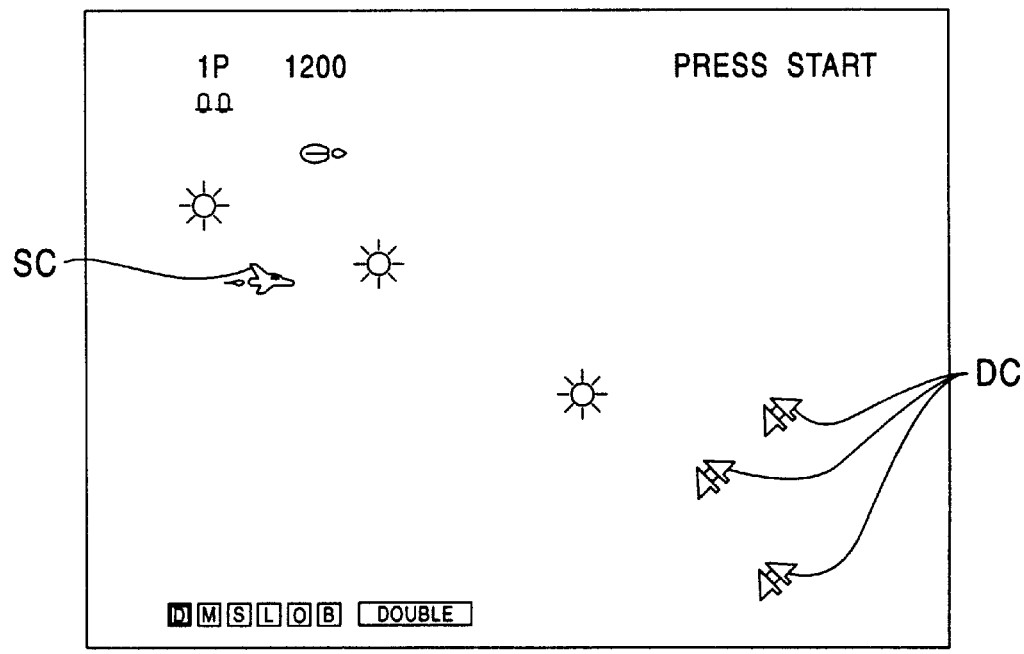
Figure 30:
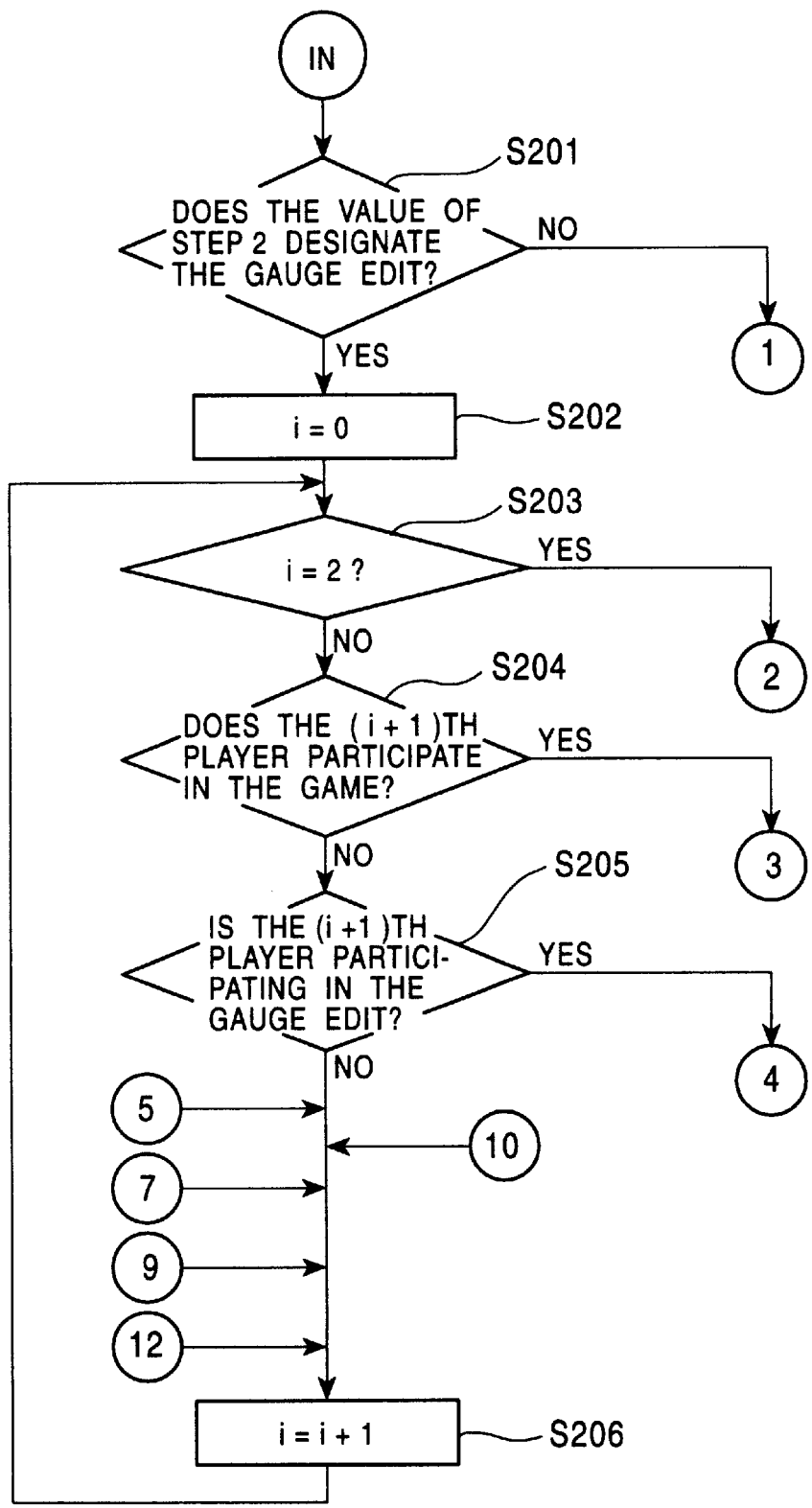
FIG. 30 is a flow charts illustrating the process of the gauge edit routine.
Figure 31:
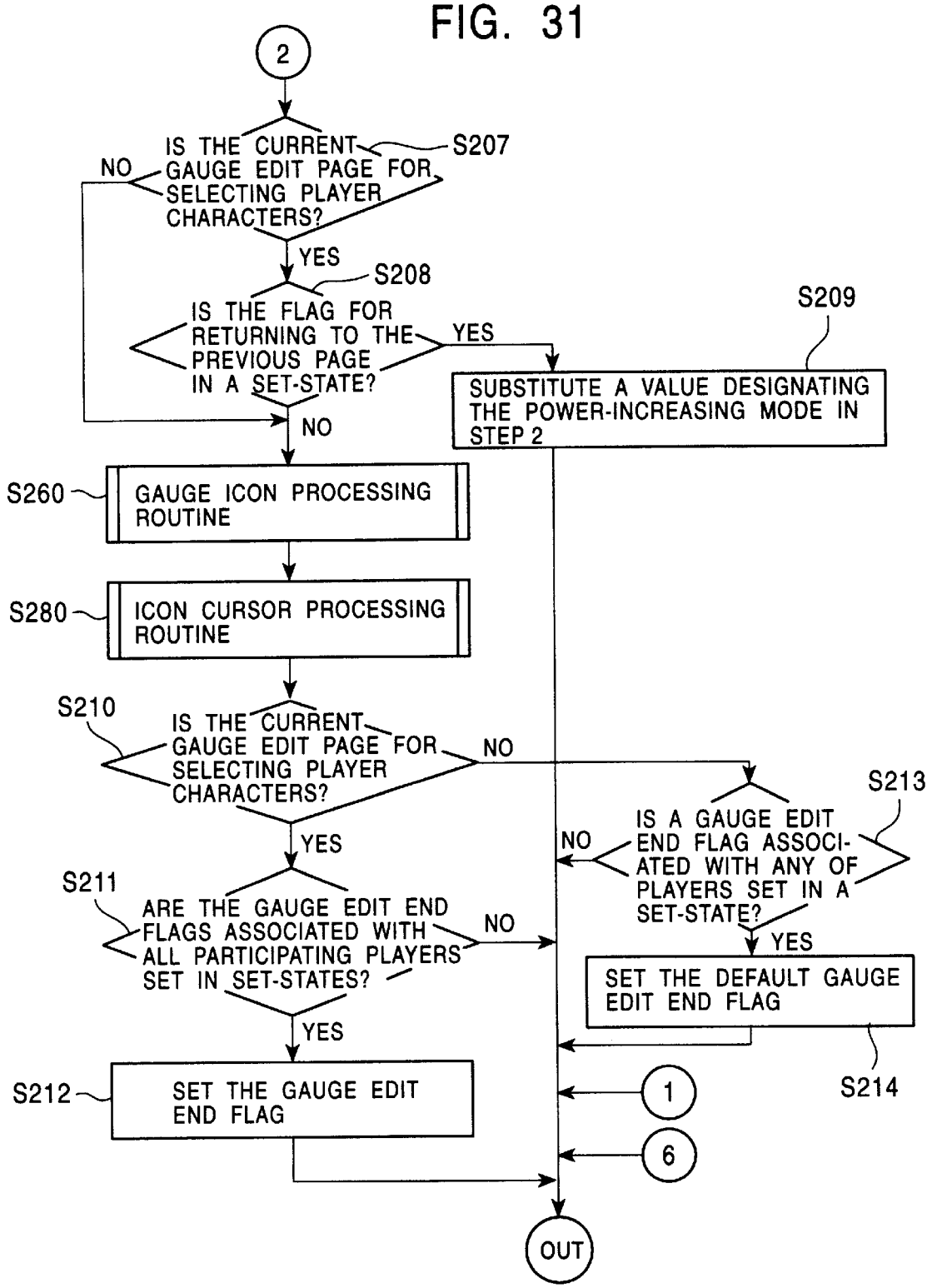
FIG. 31 is a flow charts illustrating the process of the gauge edit routine.
Figure 32:
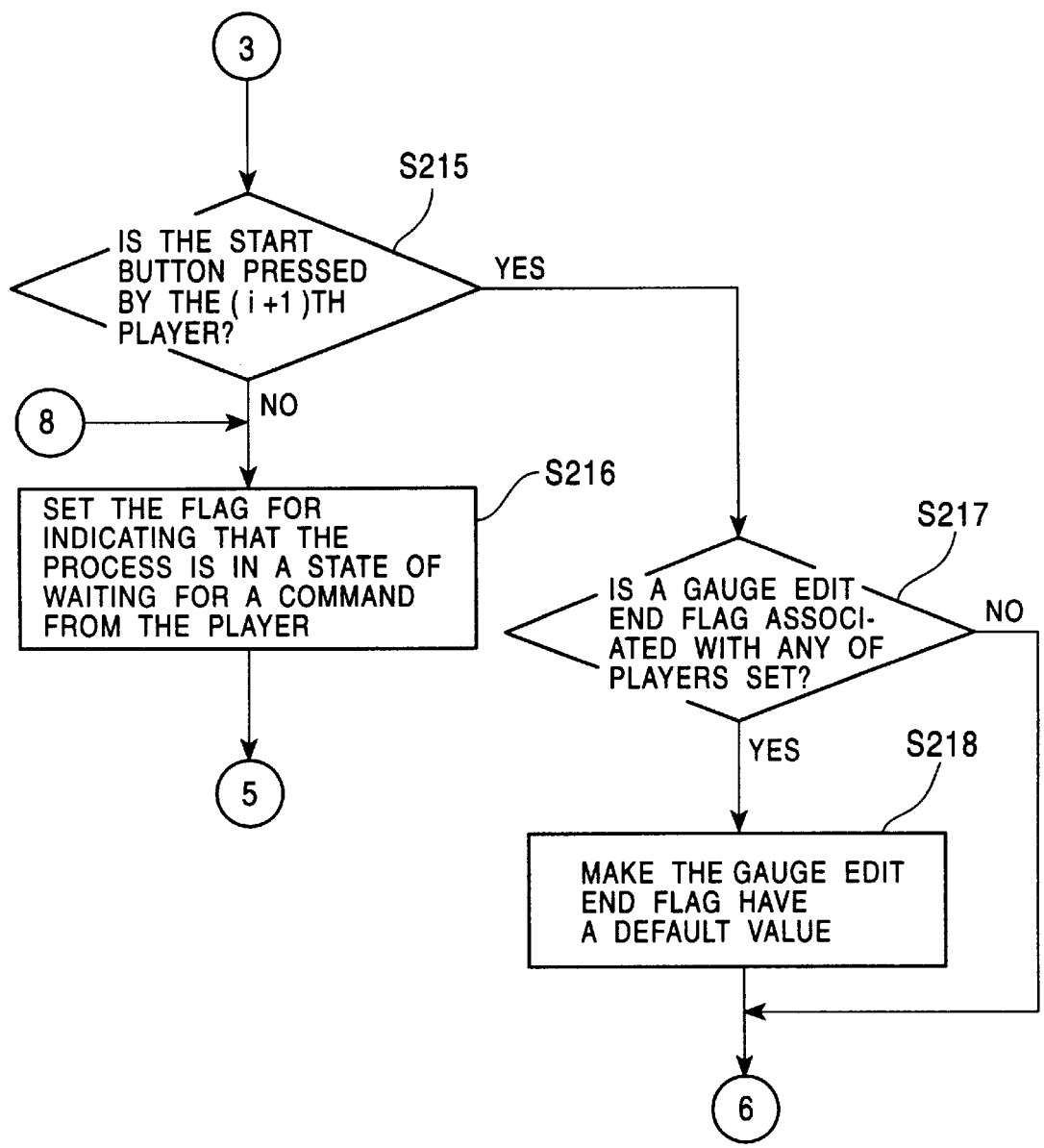
FIG. 32 is a flow charts illustrating the process of the gauge edit routine.
Figure 33:
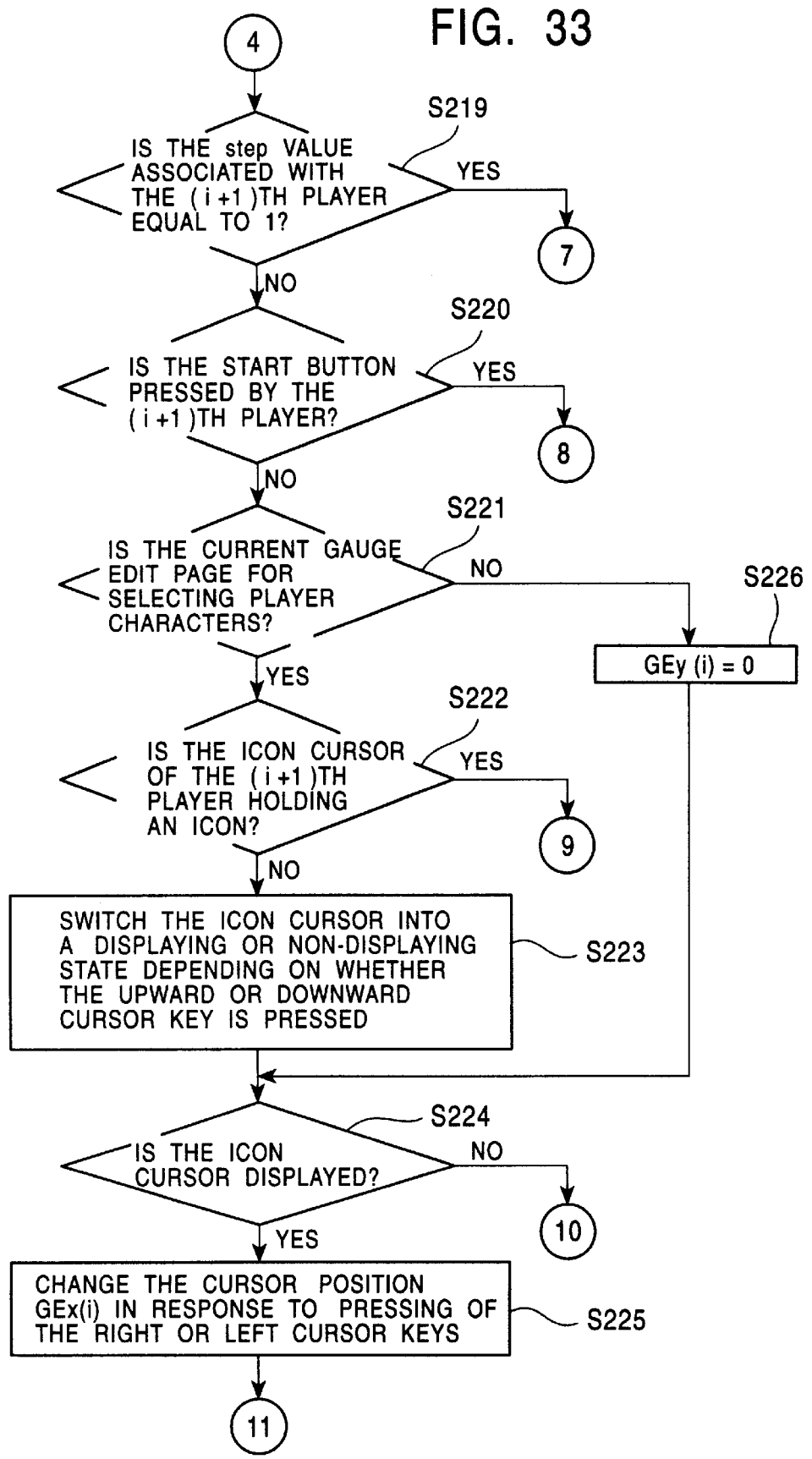
FIG. 33 is a flow charts illustrating the process of the gauge edit routine.
Figure 34:
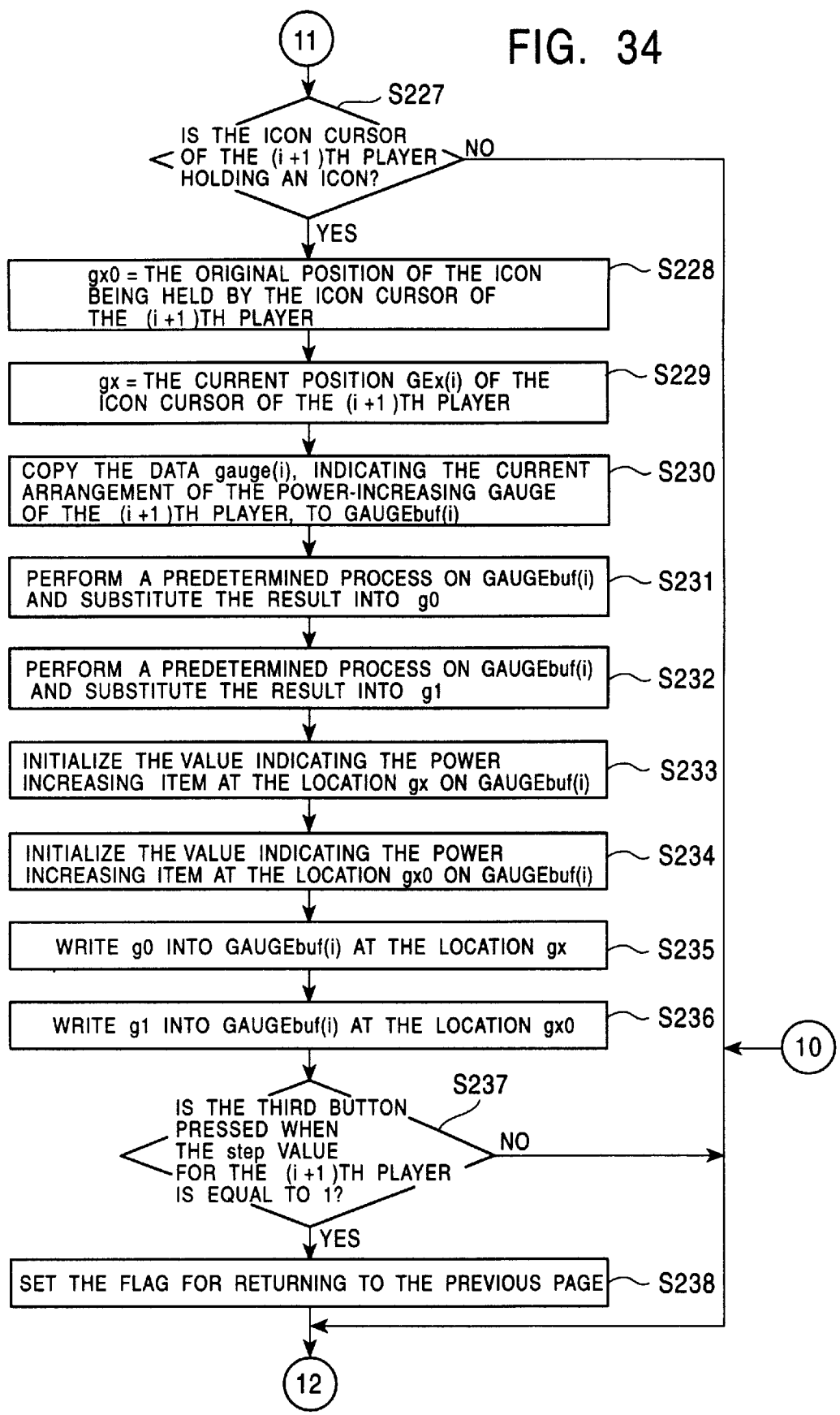
FIG. 34 is a flow charts illustrating the process of the gauge edit routine.

3. After performing the above process, if the player presses a particular button of the controller 92, then the setting is fixed and reflected in the game. FIG. 29A illustrates an example of a game image before modifying the setting by means of the gauge edit. FIG. 29B illustrates an example of a game image after modifying the setting by means of the gauge edit. In the example shown in FIG. 29A, "S" is displayed on the extreme left side of the power-up gauge. If the "S" and "D" are replaced with each other by means of the gauge edit as shown in FIG. 28, then the result is that "S" is displayed at the third position in the power-up gauge and "D" is displayed at the left end in the power-up gauge, as shown in FIG. 29B. When the selection of an icon is not fixed, that is, when the icon is in a semi-transparent state and located at a position shifted to right and down, if the player presses a cancel button, then the screen image returns from the gauge edit screen image to the previous screen image. That is, the process exits from the gauge edit. Parameters used in the gauge edit are listed below.

STEP: System Flow Control Variable

GEx(n): Icon Cursor Location (0 to 5, for example)

GEy(n): Icon Cursor Display Flag (displayed when the value is equal to 0 while not displayed when the value is equal to 1)

GAUGE(n): 32-Bit Array Variable Indicating the Current Arrangement of Power-Up Gauge GAUGEbuf(n): 32-Bit Array Variable for Temporarily Storing the Contents of GAUGE(n)

GAUGE(n) and GAUGEbuf(n) both includes data for two players. GAUGE includes six elements GAUGE(0) to GAUGE(5) each having a 3-bit value (0 to 7). The value of each element GAUGE(0) to GAUGE(5) indicates the type of the power-up item corresponding to the number of items. For example, the value of each element is related to the type of the power-up item as follows:

000: Speed Up

001: Missile

010: Double

"Double" refers to power-up by which the normal capability in which bullets can be shot only in the forward direction (to right) is improved such that bullets can also be shot in other directions such as in a direction to right and up or in a backward direction.

011: Laser

100: Option

An optional character refers to a spherical object which follows the motion of the player character and can perform the same attack as that performed by the player character when the player character perform the attack. This power-up item is displayed at the fourth position counted from left in FIG. 27. Up to four spherical objects can be added to the player character. In the present example, there are four spherical objects, and thus each spherical object can shoot a bullet.

M. Process of Gauge Edit Routine (FIGS. 30–38)

FIGS. 30 to 38 are flow charts illustrating the process of the gauge edit routine.

In step S201, the decision means $1h$ determines whether the value of the system flow control variable STEP indicates the gauge edit screen. If the decision result is "YES", then the process goes to step S202. However, the process exits from the gauge edit routine, if the decision result is "NO".

In step S202, the variable setting means $1h$ substitutes 0 into i. the variable setting means $1h$ substitutes 0 into i.

In step S203, the decision means $1h$ determines whether i=2. If the decision result is "YES", then the process goes to step S207. However, the process goes to step S204 if the decision result is "NO".

In step S204, the decision means $1h$ determines whether the (i+1)th player is participating in the game. If the decision result is "YES", then the process goes to step S213. However, the process goes to step S205 if the decision result is "NO".

In step S205, the decision means $1h$ determines whether the (i+1)th player is participating in the gauge edit. If the decision result is "YES", then the process goes to step S217. However, the process goes to step S206 if the decision result is "NO".

In step S206, the calculation means $1h$ increments i by 1.

In step S207, the decision means $1h$ determines whether the gauge edit is for the player character SC. If the decision result is "YES", then the process goes to step S208. However, the process goes to step S260 if the decision result is "NO".

In step S208, the decision means $1h$ determines whether the value of the flag indicates that the screen image should be returned to the previous selection-mode screen image. If the decision result is "YES", then the process goes to step S209. However, the process goes to step S260 if the decision result is "NO".

In step S209, the variable setting means $1h$ substitutes the value indicating the previous selection mode into the system flow control variable STEP.

In step S260, the gauge icon processing routine is performed. In step S280, the icon cursor processing routine is performed.

In step S210, the decision means $1h$ determines whether the gauge edit is for the player character SC. If the decision result is "YES", then the process goes to step S211. However, the process goes to step S213 if the decision result is "NO".

In step S211, the decision means $1h$ determines whether the value of the flag indicates that the gauge edit is completed for all participating players. If the decision result is "YES", then the process goes to step S212. However, if the decision result is "NO", then the process exits from the gauge edit routine. In step S212, the flag control means $1h$ sets the gauge edit end flag.

In step S213, the decision means $1h$ determines whether the gauge edit end flag associated with some player is set. If the decision result is "YES", then the process goes to step S214. However, if the decision result is "NO", the process exits from the gauge edit routine.

In step S214, the flag control means $1h$ sets the default gauge edit end flag.

In step S215, the decision means $1h$ determines whether the start button 92a of the controller 92 is pressed by the (i+1)th player on the basis of the detection result of the button operation detection means $1h$. If the decision result is "YES", then the process goes to step S217. However, the process goes to step S216 if the decision result is "NO".

In step S216, the flag control means $1h$ sets the flag to indicate that process is waiting for a command from the (i+1)th player.

In step S217, the decision means $1h$ determines whether the gauge edit end flag associated with some player is set. If the decision result is "YES", then the process goes to step S218. However, if the decision result is "NO", the process exits from the gauge edit routine.

In step S219, the decision means $1h$ determines whether the step value of the "OK" icon cursor associated with the (i+1)th player is equal to 1. If the decision result is "YES", then the process goes to step S206. However, the process goes to step S220 if the decision result is "NO". Herein, the "OK" icon cursor refers to a cursor which is different from the icon cursor and which is displayed when an "UP" cursor key is pressed. If the decision button 92e is pressed when the "OK" cursor is displayed, then the gauge edit is terminated. On the other hand, the normal icon cursor used in the gauge edit process is displayed when a "DOWN" cursor key is pressed. If the "UP" and "DOWN" cursor keys are pressed alternately, then the "OK" icon cursor and the normal icon cursor are displayed alternately.

The value of the variable "STEP" varies depending on the status of the player operating the "OK" icon. If the player is not participating in the gauge edit, STEP is 0. On the other hand, STET=1, if the player is participating in the gauge edit. Immediately after the completion of the gauge edit, STEP=2. When the player is waiting for another player to finish his/her gauge edit, STEP=3.

In step S220, the decision means $1h$ determines whether the start button 92a of the controller 92 is pressed by the (i+1)th player on the basis of the detection result of the button operation detection means $1h$. If the decision result is "YES", then the process goes to step S216. However, the process goes to step S221 if the decision result is "NO".

In step S221, the decision means $1h$ determines whether the gauge edit is for the player character SC. If the decision result is "YES", then the process goes to step S222. However, the process goes to step S226 if the decision result is "NO".

In step S222, the decision means $1h$ determines whether the (i+1)th icon cursor holds a power-up item icon. If the decision result is "YES", then the process goes to step S206. However, the process goes to step S223 if the decision result is "NO".

In step S223, the gauge edit management means $1h$ changes the information indicating whether the icon cursor is displayed or not, on the basis of the detection result given by the button operation detection means $1h$ as to whether the "UP" or "DOWN" cursor key is pressed. In response, the drawing command issuing means $1h$ issues a drawing command to the drawing processor 10 to indicate whether the icon cursor is displayed or not. The drawing processor 10 rewrites the contents the buffer 11 in accordance with the received drawing command so that the icon cursor is displayed on the screen of the television monitor 12 or deleted.

In step S224, the decision means $1h$ determines whether the icon cursor is displayed or not, on the basis of the information indicating whether the icon cursor is displayed or not. If the decision result is "YES", then the process goes to step S222. However, the process again goes to step S206 if the decision result is "NO".

In step S225, the gauge edit management means $1h$ changes the value of the cursor position GEx(i) of the icon cursor, on the basis of the detection result given by the button operation detection means $1h$ as to whether the "LEFT" or "RIGHT" cursor key is pressed. In step S45, the drawing command issuing means 1h issues a drawing command to the drawing processor 10 to draw an image of the icon cursor in accordance with the cursor location GEx(i) of the icon cursor. The drawing processor 10 rewrites the contents the buffer 11 in accordance with the received drawing command so that the icon cursor is displayed at the designated location on the screen of the television monitor 12.

If the decision result in step S221 is "NO", the process goes to step S226. In step S226, the variable setting means 1h substitutes 1 into GEy(i).

In step S227, the decision means 1h determines whether the icon cursor of the (i+1)th player is holding an icon. If the decision result is "YES", then the process goes to step S228. However, the process again goes to step S206 if the decision result is "NO".

In step S228, the variable setting means 1h substitutes into gx0 the value of the original location of the icon held by the icon cursor of the (i+1)th player.

In step S229, the variable setting means 1h substitutes into gx the value of the current location of the (i+1)th icon cursor.

In step S230, the memory management means 1h copies into GAUGEbuf(i) the data GAUGE(i) indicating the arrangement of the power-up gauge associated with the current (i+1)th player.

In step S231, the gauge edit management means 1h performs a predetermined process on GAUGEbuf(i) and substitutes the result into g0.

In this step, the predetermined process is for example to shift the value of the GAUGEbuf(i) to right by 3 times gx0 and take AND with 07H (hexadecimal).

In step S232, the variable setting means 1h substitutes into g1 the value of GAUGEbuf(i) which has been subjected to a predetermined process in the gauge edit management means 1h. In this step, the predetermined process is for example to shift the value of the GAUGEbuf(i) to right by 3 times gx and calculate AND between the shifted value and 07H (hexadecimal).

In step S233, the gauge edit management means 1h initializes the value which is stored in GAUGEbuf(i) and which indicates the type of the power-up item at the location indicated by the value of gx.

This initialization is performed by shifting 7 to left by 3 times gx, inverting the result, and then taking AND with GAUGEbuf(i).

In step S234, the gauge edit management means 1h initializes the value which is stored in GAUGEbuf(i) and which indicates the type of the power-up item at the location indicated by the value of gx0.

This initialization is performed by shifting 7 to left by 3 times gx0, inverting the result, and then taking AND with GAUGEbuf(i).

In step S235, the memory management means 1h writes g0 in GAUGEbuf(i) at a location designated by gx. This process can be performed for example by shifting g0 to left by 3 times gx and then taking OR with GAUGEbuf(i).

In step S236, the memory management means 1n writes g1 in GAUGEbuf(i) at a location designated by gx0. This process can be performed for example by shifting g1 to left by 3 times gx0 and then taking OR with GAUGEbuf(i).

In step S237, the decision means 1h determines whether the third button 92e of the controller 92 is pressed by the (i+1)th player when STEP associated with the (i+1)th player is equal to 1, on the basis of the detection result of the button operation detection means 1h. If the decision result is "YES", then the process goes to step S238. However, the process again goes to step S206 if the decision result is "NO".

In step S238, the flag management means 1h sets the flag to indicating the previous screen image.

Figure 35:
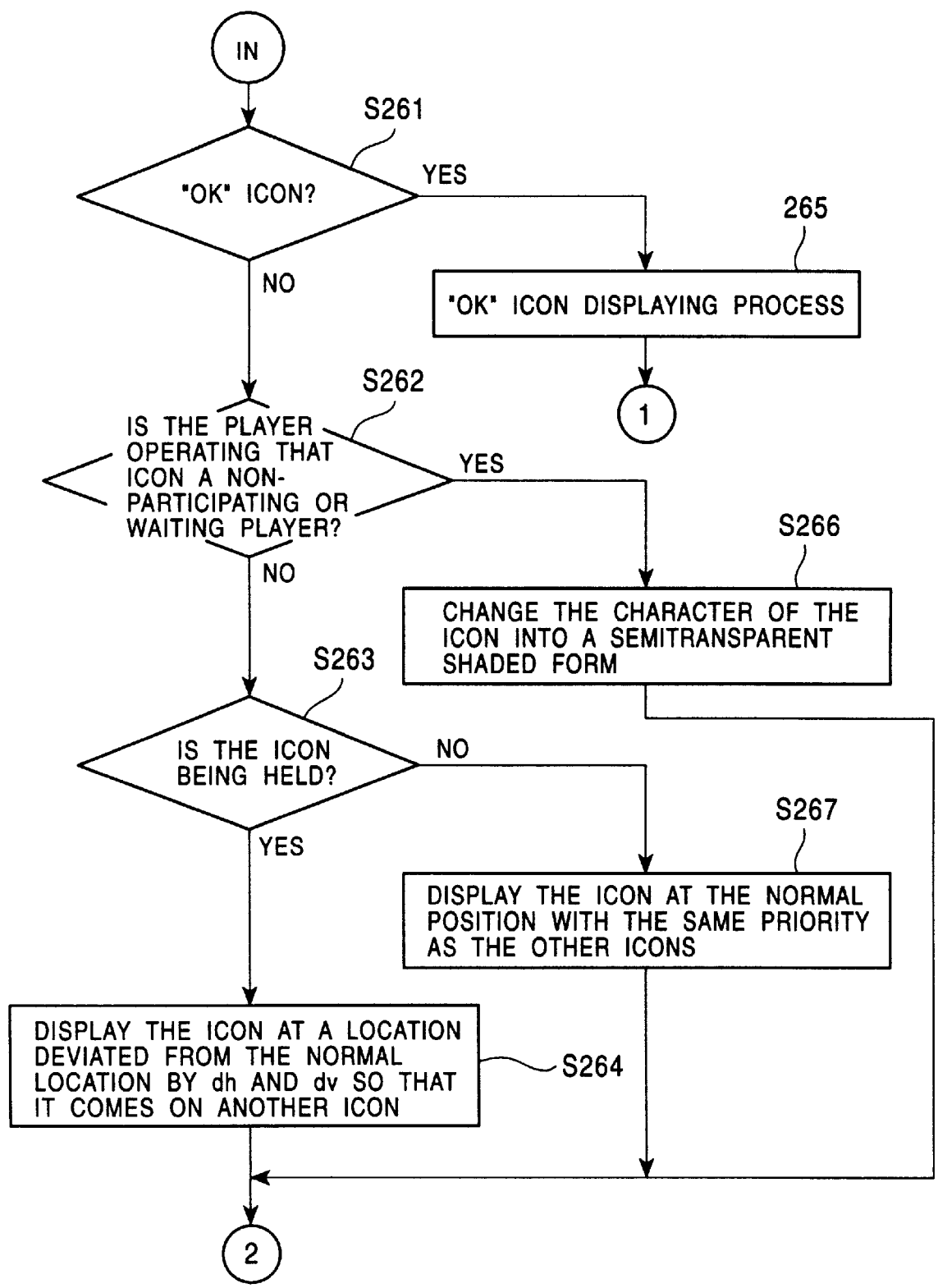
FIG. 35 is a flow charts illustrating the process of the gauge edit routine.
Figure 36:
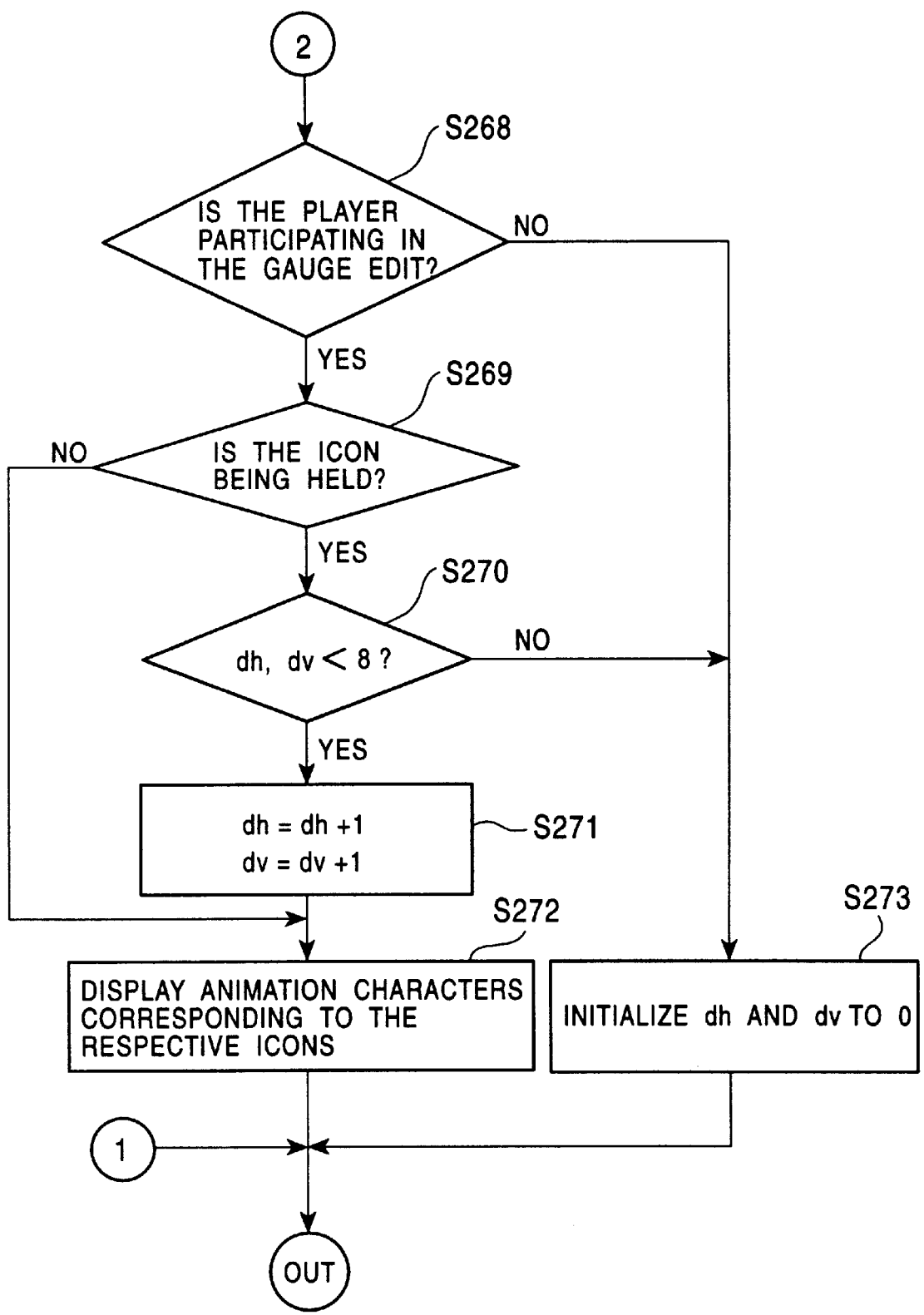
FIG. 36 is a flow charts illustrating the process of the gauge edit routine.

Referring now to FIGS. 35 and 36, the gauge icon processing process is described below. In step S261, the decision means 1h determines whether the selected icon is the "OK" icon. If the decision result is "YES", then the process goes to step S265. However, the process goes to step S262 if the decision result is "NO".

In step S262, the decision means 1h determines whether the player of this icon is not participating or waiting. If the decision result is "NO", then the process goes to step S266. However, the process goes to step S263 if the decision result is "YES".

In step S263, the decision means 1h determines whether the icon is being held. If the decision result is "YES", then the process goes to step S264. However, the process goes to step S267 if the decision result is "NO".

In step S264, in accordance with the information provided by the icon display control means 1h, the drawing command issuing means 1h issues a drawing command to the drawing processor 10 to display the icon at the location shifted by dh dots to right and by dv dots down from the normal displaying location.

In step S265, in accordance with the information provided by the icon display control means 1h, the drawing command issuing means 1h issues a drawing command to the drawing processor 10 to perform an "OK" icon displaying process. Herein the "OK" icon displaying process refers to the process of displaying, flashing, or deleting the "OK" icon depending on the operation performed by the player. In the default gauge edit screen image which is opened through the optional screen image, the "OK" icon is not used to terminate the operation. Therefore, when the player finished the gauge edit process in the gauge edit screen for use in selecting characters, the "OK" icon is flashed. The "OK" icon is displayed in a normal fashion in the other status.

In step S266, in accordance with the information provided by the icon display control means 1h, the drawing command issuing means 1h issues a drawing command to the drawing processor 10 to display the character associated with the icon, into a semi-transparent form.

In step S267, in accordance with the information provided by the icon display control means 1h, the drawing command issuing means 1h issues a drawing command to the drawing processor 10 to display the icon at the normal location in the gauge with the same priority as the other icons.

In step S268, the decision means 1h determines whether the player is participating in the gauge edit. If the decision result is "YES", then the process goes to step S269. However, the process goes to step S273 if the decision result is "NO".

In step S269, the decision means 1h determines whether the icon is now being held. If the decision result is "YES", then the process goes to step S270. However, the process goes to step S273 if the decision result is "NO".

In step S270, the decision means 1h determines whether dh and dv are both less than 8. If the decision result is "YES", then the process goes to step S271. However, if the decision result is "NO", then the process exits from the gauge edit routine. By successively changing the values of dh and dv from to 0 to a maximum value less than 8, the icon selected by the player is moved to right and down at a rather low speed which can be visually recognized.

In step S271, the calculation means 1h increments dh and dv by 1.

In step S272, the animation processing means 1h sends a command to the drawing command issuing means 1h to designate an image which varies frame by frame. In response, the drawing command issuing means 1h issues a drawing command to the drawing processor 10 to display an animation.

In step S273, the gauge edit control means 1h initializes dh and dv.

Figure 37:
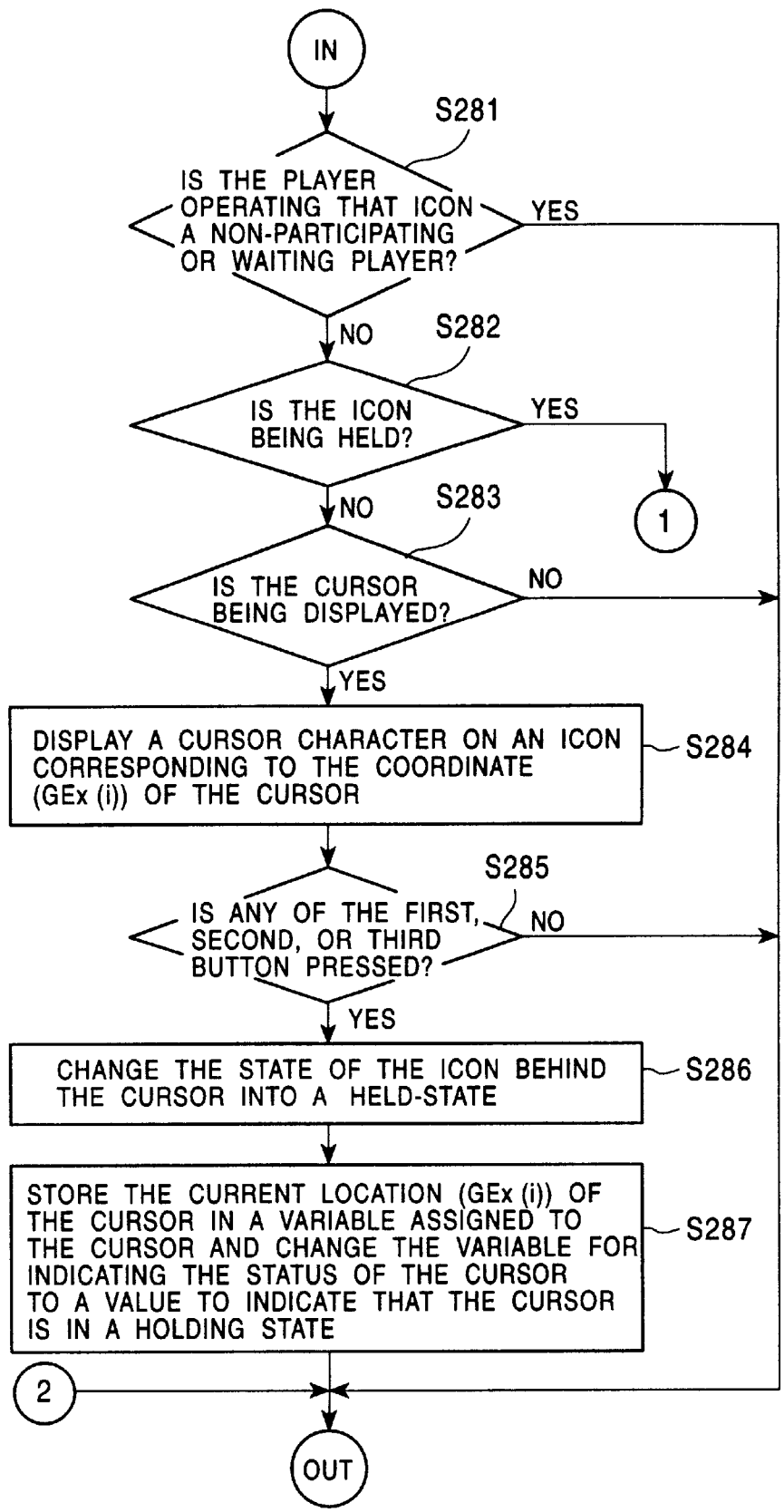
FIG. 37 is a flow charts illustrating the process of the gauge edit routine.
Figure 38:
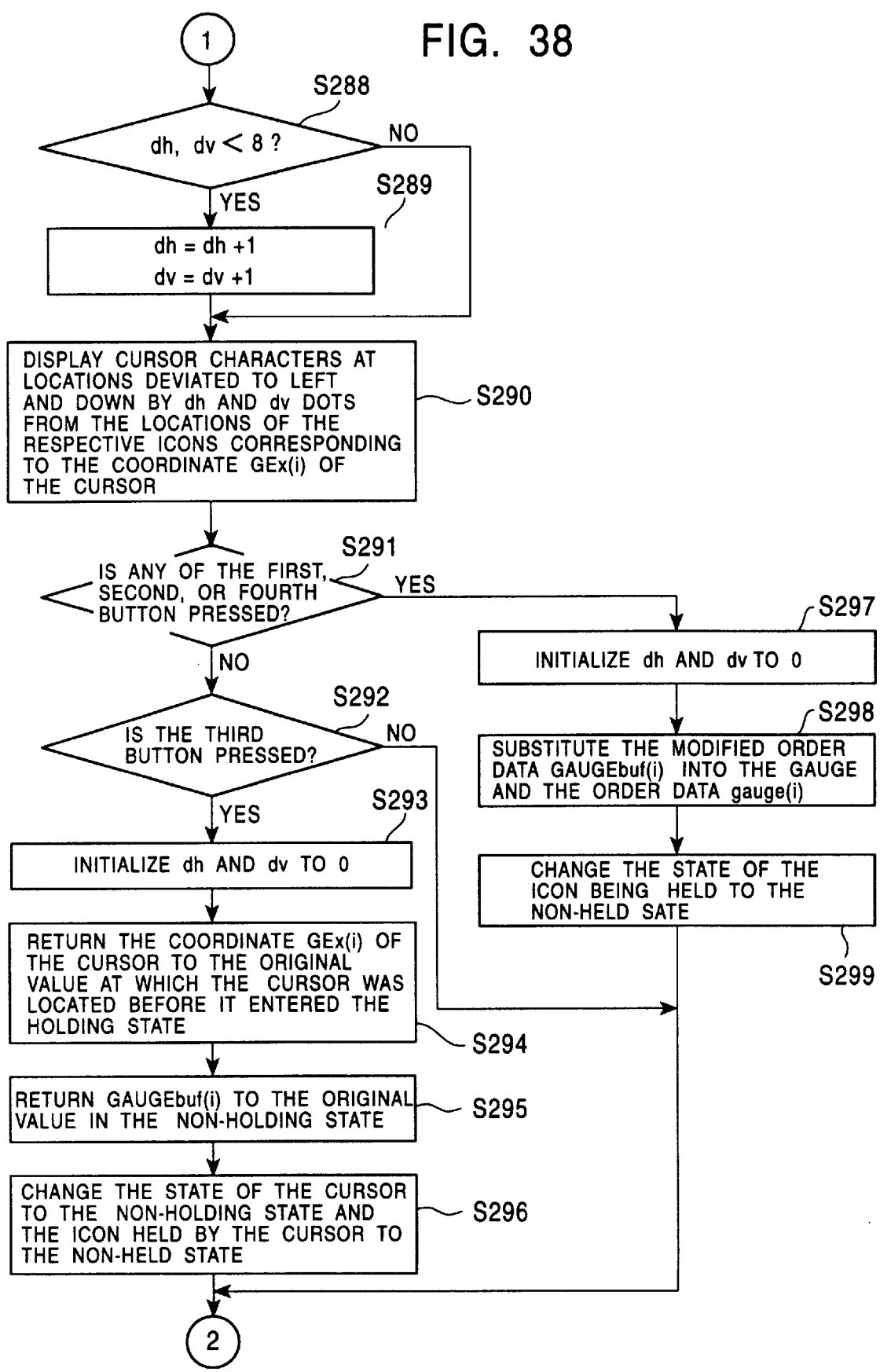
FIG. 38 is a flow charts illustrating the process of the gauge edit routine.

Referring now to FIGS. 37 and 38, the icon cursor processing routine is described below.

In step S281, the decision means 1h determines whether the player of the icon cursor is not participating or waiting. If the decision result is "NO", then the process exits from the icon cursor processing routine. The process goes to step S282 if the decision result is "YES".

In step S282, the decision means 1h determines whether the icon is being held. If the decision result is "YES", then the process goes to step S288. However, the process goes to step S283 if the decision result is "NO".

In step S283, the decision means determines whether the cursor is displayed or not by checking whether the y coordinate GEy(i) is equal to 0. If the decision result is "YES", then the process goes to step S284. However, if the decision result is "NO", then the process exits from the icon cursor processing routine.

In step S284, in accordance with the information provided by the icon display control means 1h, the drawing command issuing means 1h issues a drawing command to the drawing processor 10 to display the icon cursor on the icon corresponding to the coordinate GEx(i) of the icon cursor.

In step S285, in accordance with the detection result information provided by the button operation detection means 1h, the decision means 1h determines whether any of the first, second, or third button 92c, 92d, 92d is pressed by the player. If the decision result is "YES", then the process goes to step S286. However, if the decision result is "NO", then the process exits from the icon cursor processing routine.

In step S286, in accordance with the information provided by the icon display control means 1h, the drawing command issuing means 1h issues a drawing command to the drawing processor to display the icon, which is now behind the icon cursor, in the semi-transparent form and at a location shifted to right and down thereby indicating that the icon is now being held.

In step S287, the variable setting means 1h stores the value indicating the current location GEx(i) of the cursor into a particular variable assigned to the cursor, and substitute a predetermined value indicating that the cursor is holding the icon into a variable assigned to indicate the status of the cursor.

In step S288, the decision means 1h determines whether dh and dv are both less than 8. If the decision result is "YES", then the process goes to step S289. However, the process goes to step S290 if the decision result is "NO".

In step S290, in accordance with the information provided by the icon display control means 1h, the drawing command issuing means 1h issues a drawing command to the drawing processor 10 to display the cursor character at the location shifted by dh dots to right and by dv dots down from the location where the icon corresponding to the coordinate GEx(i) of the cursor is displayed.

In step S291, in accordance with the detection result information provided by the button operation detection means 1h, the decision means 1h determines whether any of the first, second, or fourth button 92c, 92d, 92e is pressed by the player. If the decision result is "YES", then the process goes to step S297. However, the process goes to step S292 if the decision result is "NO".

In step S292, in accordance with the detection result information provided by the button operation detection means 1h, the decision means 1h determines whether the third button 92d is pressed by the player. If the decision result is "YES", then the process goes to step S293. However, if the decision result is "No", then the process exits from the icon cursor processing routine.

In step S293, the gauge edit control means 1h initializes dh and dv.

In step S294, the variable setting means 1h returns the value of the coordinate GEx(i) of the cursor to the value the non-holding state.

In step S295, the variable setting means 1h returns the value of GAUGEbuf(i) to the value in the non-holding state.

In step S296, in accordance with the information provided by the icon display control means 1h, the drawing command issuing means 1h issues a drawing command to the drawing processor 10 to display the cursor character at the location shifted by dh dots to right and by dv dots down from the location where the icon corresponding to the coordinate GEx(i) of the cursor is displayed.

In step S297, the gauge edit control means 1h initializes dh and dv.

In step S298, the variable setting means 1h substitutes the changing order data GAUGEbuf(i) into the gauge and order data GAUGE(i).

In step S299 in accordance with the information provided by the icon display control means 1h, the drawing command issuing means 1h issues a drawing command dto the drawing processor 10 to display the icon in the non-holding fashion.

In the shooting game or action game of the horizontal scrolling type according to the present embodiment, as described above, the user can define conditions such as the displaying order of the optional character to be added to the player character. The defined conditions are reflected in the selection arrangement during the game.

Other Embodiments

Although in the above-described embodiments the present invention is applied to the shooting game, the application of the present invention is not limited to that. The invention may also be applied to various games such as an action gamve in which characters are moved on the screen while fighting against enemies.

As described above, the present invention provides the method of judging a hit between at least two objects in a game system, the game system being adapted to display a plurality of objects on a screen such that at least one or more objects are moved on the screen in accordance with the operation performed by a player with a controller and/or such that at least on or more objects are moved on the screen by a CPU, the method being characterized in that each object comprises image information to be displayed and a plurality of areas used to judge a hit. With this method, it is possible to make an accurate judgement at a very high speed.

In this method, the plurality of areas may be moved in accordance with the motion of each corresponding object. This makes it possible to make an accurate judgement of a hit against a moving object.

What is claimed is:

1. A method of representing a gravitational force for use in a game system, comprising:

moving a character in a fixed direction on a screen in response to an operation performed by a player with a controller;

successively varying a background image displayed on the screen by means of scrolling;

predefining a pseudo gravitational force; and displaying the effects of said gravitational force on the game screen, said gravitational force being defined at a position lying on a straight line locus running codirectionally with a scrolling direction and which passes through an approximate center of the screen.

2. A method according to claim 1, wherein said position of said gravitational force is located outside an area of the screen.

3. A method of representing a gravitational force for use in a game system, comprising:

moving a character in a fixed direction on a screen in response to an operation performed by a player with a controller;

successively varying a background image displayed on the screen by means of scrolling;

predefining a pseudo gravitational force; and displaying the effects of said gravitational force on the game screen, said gravitational force being defined such that the direction of the gravitational force is opposite to a scrolling direction.

4. A computer-readable storage medium storing a game program for use in a game system comprising executable code for execution by a computer processor causing said computer processor to perform the steps of:

moving a character in a fixed direction on a screen in response to an operation performed by a player with a controller;

successively varying a background image displayed on the screen by means of scrolling;

predefining a pseudo gravitational force; and displaying the effects of said gravitational force on the game screen, said gravitational force being defined at a position lying on a straight line locus running codirectionally with a scrolling direction and which passes through an approximate center of the screen.

5. A computer-readable storage medium according to claim 4, wherein said position of said gravitational force is located outside an area of the screen.

6. A computer-readable storage medium storing a game program for use in a game system comprising executable code for execution by a computer processor causing said computer processor to perform the steps of:

moving a character in a fixed direction on a screen in response to an operation performed by a player with a controller;

successively varying a background image displayed on the screen by means of scrolling;

predefining a pseudo gravitational force; and displaying the effects of said gravitational force on the game screen, said gravitational force being defined such that the direction of the gravitational force is opposite to a scrolling direction.

7. A method of displaying a character on a game screen, comprising the steps of:

moving a character in a virtual game space in response to at least one of a command given by a player and a predetermined procedure;

defining a gravitational force generating location in the game space at which a pseudo gravitational force is generated;

defining an attractive force generating location in the game space at which a virtual attractive force is generated, said attractive force generating location being defined at a location different from the location where the gravitational force is generated; and displaying said character on the game screen so that said character is affected by the attractive force generated at said attractive force generating location, said gravitational force generating location and said attractive force generating location both being located apart from said character.

8. A method of displaying a character on a game screen, comprising the steps of:

moving said character in a virtual gave space in response to at least one of a command given by a player and in accordance with a predetermined procedure;

defining an attractive force generating location in the game space at which a virtual attractive force is generated, said attractive force generating location being defined so that said location becomes far from the game screen as said object is scrolled;

displaying said character on the game screen so that said character is affected by the attractive force generated at said attractive force generating location;

defining an object representing a ground shape in the game space; and displaying said object on the game screen in such manner that said object is scrolled in a horizontal direction at a fixed speed.

9. A game system, comprising:

operating means for receiving a command given by a player and outputting a command signal corresponding to the command given by the player;

display control means for displaying a character on the game screen in such a manner that said character moves in a virtual game space in accordance with at least one of said command signal and a predetermined procedure;

attractive force location storing means for storing an attractive force generating location in the game space at which a virtual attractive force is generated, said display control means displaying the character on the game screen in such a manner that the character is affected by the attractive force generated at said attractive force generating location, said attractive force generating location being defined at a location different from the location at which the gravitational force is generated, said gravitational force generating location and said attractive force generating location both being located apart from said character.

10. A game system, comprising:

operating means for receiving a command given by a player and outputting a command signal corresponding to the command given by the player;

display control means for displaying a character on a game screen in such a manner that said character moves in a virtual game space in accordance with at least one of said command signal and a predetermined procedure;

attractive force location storing means for storing an attractive force generating location in the game space at which a virtual attractive force is generated, said attractive force generating location being defined so that said location becomes far from the game screen as said object is scrolled, said display control means displaying the character on the game screen in such a manner that the character is affected by the attractive force generated at said attractive force generating location;

object storing means for storing an object representing a ground shape defined in the game space; and object displaying means for displaying said object on the game screen in such a manner that said object is scrolled in a horizontal direction at a fixed speed.

11. A computer-readable storage medium storing a game program for use in a game system in which a character is displayed on a game screen in such a manner that said character moves in a virtual game space in response to at least one of a command given by a player and in accordance with a predetermined procedure, the game program comprising executable code for execution by a computer processor causing said computer processor to perform the steps of:

defining an attractive force generating location in the game space at which a virtual attractive force is generated;

displaying said character on the game screen so that said character is affected by the attractive force generated at said attractive force generating location, said attractive force generating location being defined at a location different from the location where the gravitational force is generated, said gravitational force generating location and said attractive force generating location both being located apart from said character.

12. A computer-readable storage medium storing a game program for use in a game system in which a character is displayed on a game screen in such a manner that said character moves in a virtual gave space in response to at least one of a command given by a player and a predetermined procedure, the game program comprising executable code for execution by a computer processor causing said computer processor to perform the steps of:

defining an attractive force generating location in the game space at which a virtual attractive force is generated;

displaying said character on the game screen so that said character is affected by the attractive force generated at said attractive force generating location;

defining an object representing a ground shape in the game space;

displaying said object on the game screen in such manner that said object is scrolled in a horizontal direction at a fixed speed; and defining said attractive force generating location so that said location becomes far from the game screen as said object is scrolled.

* * * * *